United States Patent
Sasaki et al.

(10) Patent No.: US 12,003,775 B2
(45) Date of Patent: Jun. 4, 2024

(54) VIDEO DECODING APPARATUS AND VIDEO CODING APPARATUS

(71) Applicant: Sharp Kabushiki Kaisha, Sakai (JP)

(72) Inventors: Eiichi Sasaki, Sakai (JP); Yukinobu Yasugi, Sakai (JP); Takeshi Chujoh, Sakai (JP); Tomoko Aono, Sakai (JP); Tomohiro Ikai, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/264,869

(22) PCT Filed: Aug. 6, 2019

(86) PCT No.: PCT/JP2019/030950
§ 371 (c)(1),
(2) Date: Feb. 1, 2021

(87) PCT Pub. No.: WO2020/032049
PCT Pub. Date: Feb. 13, 2020

(65) Prior Publication Data
US 2021/0227262 A1 Jul. 22, 2021

(30) Foreign Application Priority Data

Aug. 6, 2018 (JP) ................................ 2018-147658
Aug. 7, 2018 (JP) ................................ 2018-148470
Aug. 7, 2018 (JP) ................................ 2018-148471

(51) Int. Cl.
*H04N 19/107* (2014.01)
*H04N 19/105* (2014.01)
(Continued)

(52) U.S. Cl.
CPC ........... *H04N 19/70* (2014.11); *H04N 19/105* (2014.11); *H04N 19/117* (2014.11);
(Continued)

(58) Field of Classification Search
CPC .... H04N 19/70; H04N 19/105; H04N 19/117; H04N 19/176; H04N 19/46; H04N 19/82
(Continued)

(56) References Cited

U.S. PATENT DOCUMENTS 9,100,636 B2 * 8/2015 Tanner ................. H04N 19/154
2007/0110154 A1 5/2007 Wang et al.
(Continued)

FOREIGN PATENT DOCUMENTS

CA 2876567 A1 * 1/2014 ........... H04N 19/117
JP 2013-165340 A 8/2013
(Continued)

OTHER PUBLICATIONS

Kazui, WIPO translation of WO-2012008054-A1, Jan. 2012 (Year: 2012).*

(Continued)

*Primary Examiner* — Albert Kir
(74) *Attorney, Agent, or Firm* — Keating & Bennett, LLP

(57) ABSTRACT

In a scheme in which only a part of one picture is intra-predicted and the rest of the region is inter-predicted, generation of a significant code amount and generation of a delay can be avoided in a specific picture. However, because only a part of the picture is coded by means of the intra prediction, coding efficiency is deteriorated as compared to an I picture in which the entire picture is coded by means of the intra prediction. A picture is split into a restricted region and a non-restricted region. Prediction is performed by using an intra prediction in which only a pixel of the restricted region is referred to or an inter prediction in which a restricted reference region of a reference picture is referred to for a block of the restricted region. Prediction is performed by using the intra prediction in which a decoded pixel in the picture is referred to or the inter prediction in (Continued)

which the reference picture is referred to for the block of the non-restricted region. After decoding of the picture, the restricted region is configured as the restricted reference region.

5 Claims, 36 Drawing Sheets

(51) Int. Cl.
*H04N 19/117* (2014.01)
*H04N 19/176* (2014.01)
*H04N 19/46* (2014.01)
*H04N 19/70* (2014.01)
*H04N 19/82* (2014.01)

(52) U.S. Cl.
CPC ........... *H04N 19/176* (2014.11); *H04N 19/46* (2014.11); *H04N 19/82* (2014.11)

(58) Field of Classification Search
USPC .................................................. 375/240.26
See application file for complete search history.

(56) References Cited

U.S. PATENT DOCUMENTS

| | | | | |
|---|---|---|---|---|
| 2011/0026597 A1* | 2/2011 | Tanaka | ................. | H04N 19/166 375/E7.243 |
| 2013/0128981 A1 | 5/2013 | Kazui et al. | | |
| 2014/0079120 A1* | 3/2014 | Hiraoka | ............... | H04N 19/176 375/240.12 |
| 2014/0092963 A1* | 4/2014 | Wang | .................... | H04N 19/61 375/240.12 |
| 2014/0294072 A1* | 10/2014 | Elkhazin | .............. | H04N 19/157 375/240.12 |
| 2015/0146780 A1* | 5/2015 | Miyoshi | ............... | H04N 19/176 375/240.12 |
| 2021/0203971 A1* | 7/2021 | Chen | .................... | H04N 19/117 |
| 2021/0227262 A1* | 7/2021 | Sasaki | .................... | H04N 19/70 |
| 2022/0014755 A1* | 1/2022 | Hendry | ................ | H04N 19/107 |

FOREIGN PATENT DOCUMENTS

| | | | | | |
|---|---|---|---|---|---|
| WO | 2012/008054 A1 | | 1/2012 | | |
| WO | WO-2012008054 A1 | * | 1/2012 | ........... | H04N 19/105 |
| WO | WO-2014051915 A1 | * | 4/2014 | ....... | H04N 19/00569 |
| WO | WO-2014107723 A1 | * | 7/2014 | ........... | H04N 19/107 |
| WO | WO-2020185962 A1 | * | 9/2020 | ........... | H04N 19/107 |
| WO | WO-2020226992 A1 | * | 11/2020 | ........... | H04N 19/105 |
| WO | WO-2021046096 A1 | * | 3/2021 | ........... | H04N 19/117 |

OTHER PUBLICATIONS

Official Communication issued in International Patent Application No. PCT/JP2019/030950, dated Oct. 21, 2019.

Kazui, "AHG14: Study of methods for progressive intra refresh", Joint Video Experts Team (JVET) of ITU-T SG 16 WP 3 and ISO/IEC JTC 1/SC 29/WG 11, JVET-L0079_r1, Oct. 3-12, 2018, pp. 1-9.

Thiesse et al., "Improved Cyclic Intra Refresh", Joint Video Experts Team (JVET) of ITU-T SG 16 WP 3 and ISO/IEC ITC 1/SC 29/WG 11, JVET-K0212-v2, Jul. 10-18, 2018, pp. 1-7.

Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, JVET-G1001-v1, Jul. 13-21, 2017, 50 pages.

* cited by examiner (a)
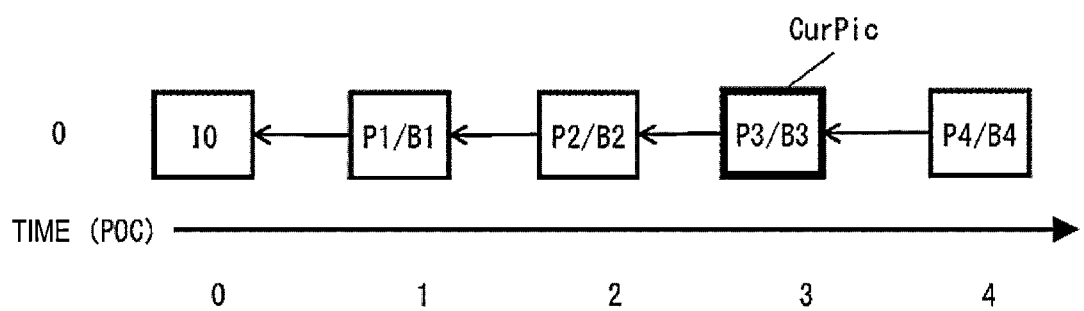
(b)
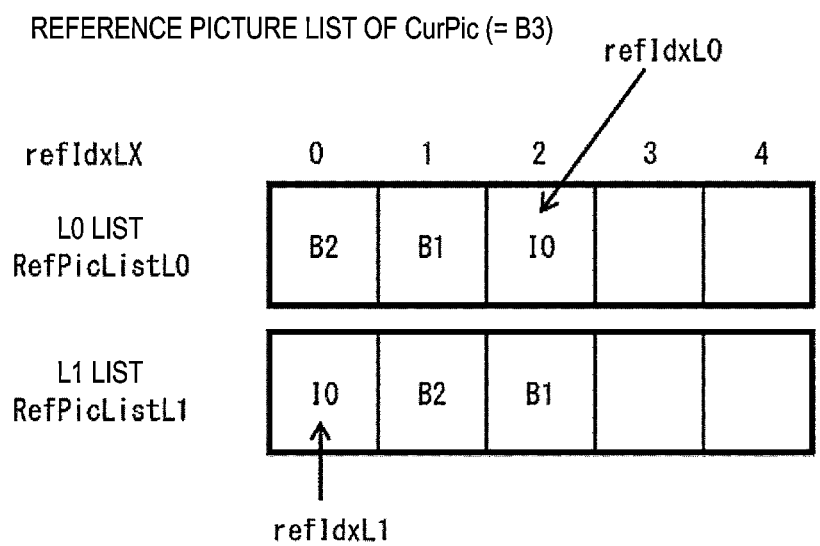
FIG. 4

(a)

| seq_parameter_set_rbsp( ) { | Descriptor |
|---|---|
| sps_video_parameter_set_id | u(4) |
| sps_max_sub_layers_minus1 | u(3) |
| sps_temporal_id_nesting_flag | u(1) |
| profile_tier_level( 1, sps_max_sub_layers_minus1 ) | |
| sps_seq_parameter_set_id | ue(v) |
| chroma_format_idc | ue(v) |
| if( chroma_format_idc == 3 ) | |
|     separate_colour_plane_flag | u(1) |
| pic_width_in_luma_samples | ue(v) |
| pic_height_in_luma_samples | ue(v) |
| ... | ... |
| seq_refresh_enable_flag | u(1) |
| if(seq_refresh_enable_flag) { | |
|     seq_refresh_mode | u(1) |
|     seq_refresh_direction | u(1) |
|     seq_refresh_period | ue(v) |
| } | |
| vui_parameters_present_flag | u(1) |
| if( vui_parameters_present_flag ) | |
|     vui_parameters( ) | |
| ... | |

SEQUENTIAL REFRESH INFORMATION (b)

| pic_parameter_set_rbsp( ) { | Descriptor |
|---|---|
| pps_pic_parameter_set_id | ue(v) |
| pps_seq_parameter_set_id | ue(v) |
| ... | |
| if(seq_refresh_enable_flag) { | |
|     seq_refresh_position | ue(v) |
|     seq_refresh_size | ue(v) |
|     seq_refresh_overlap | ue(v) |
| } | |
| ... | |

SEQUENTIAL REFRESH INFORMATION

FIG. 15

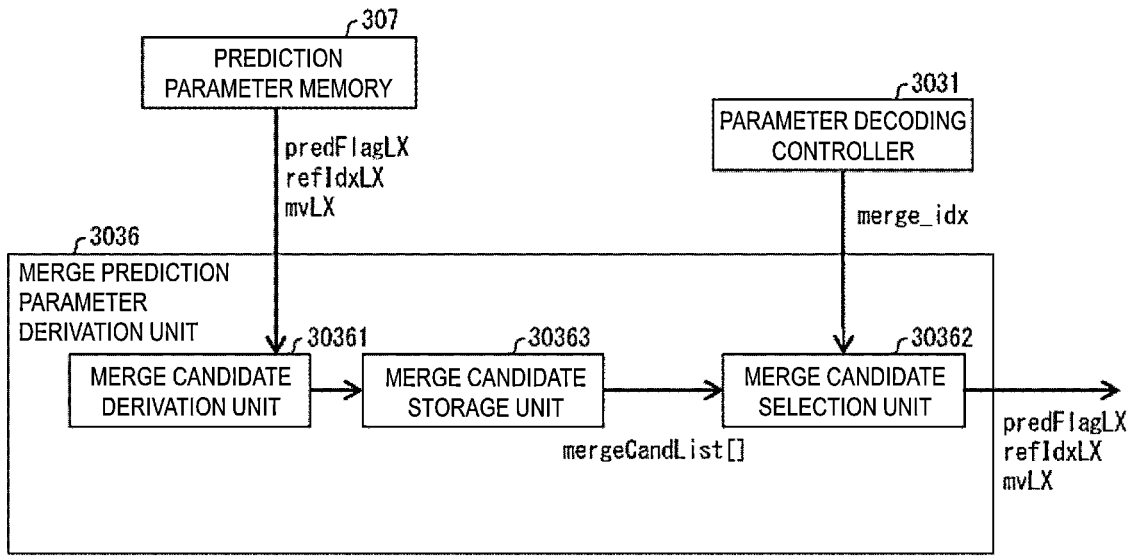
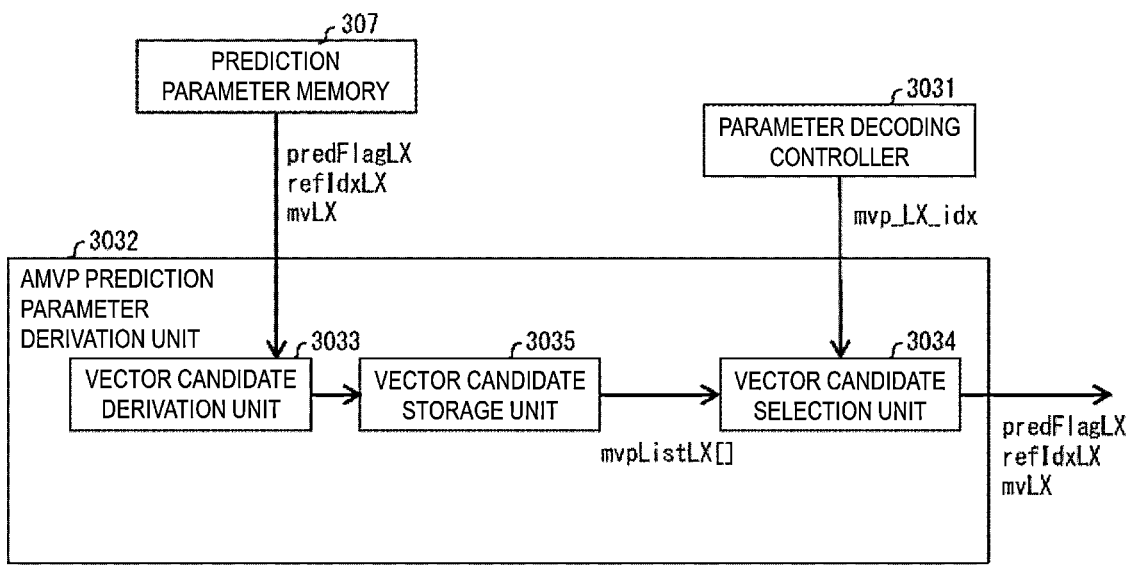
FIG. 20

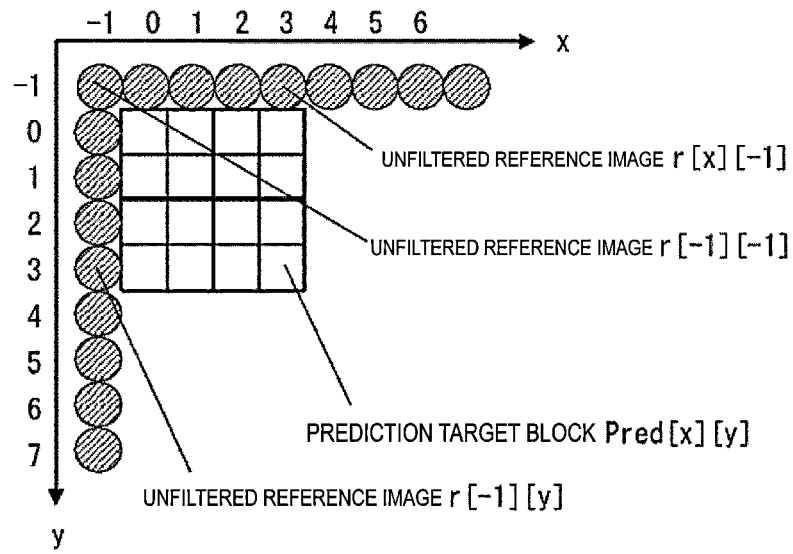
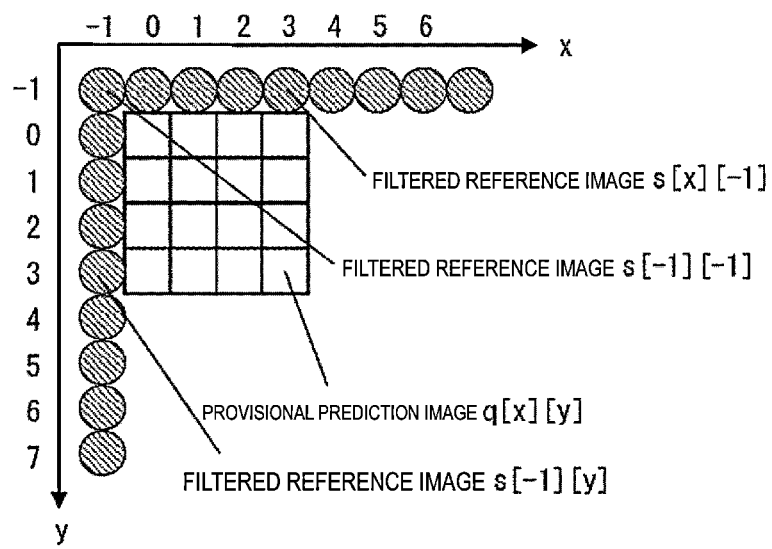
FIG. 24

(a)
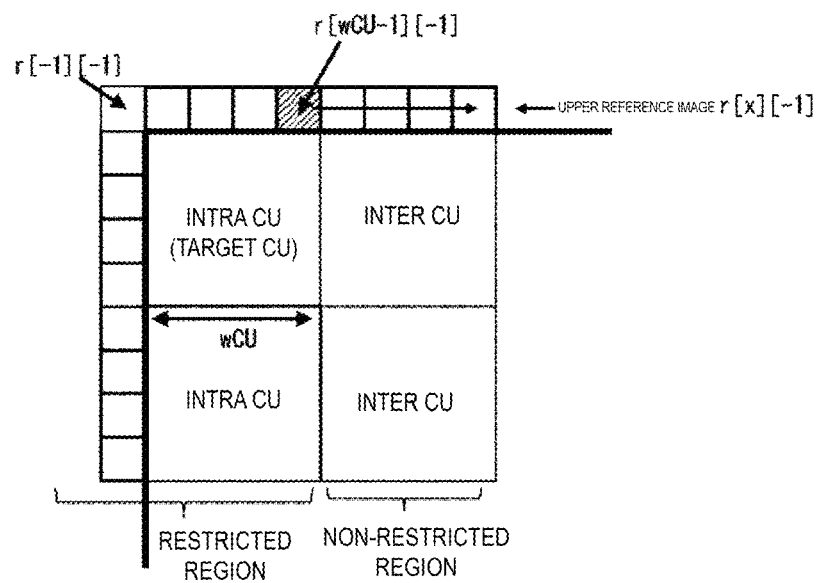
(b)
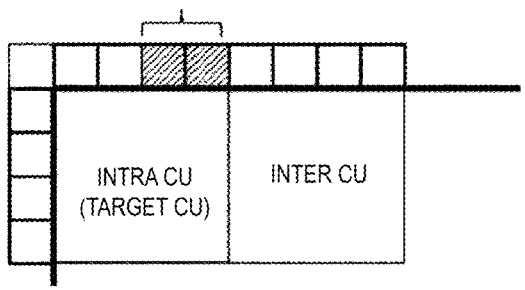
FIG. 26

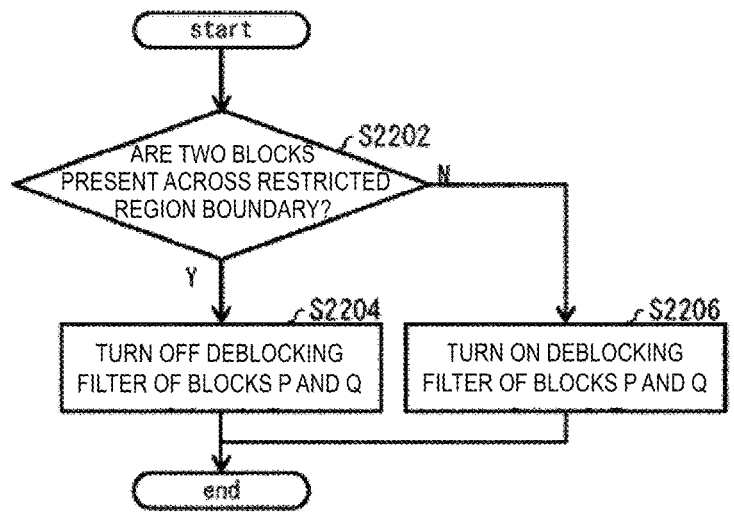
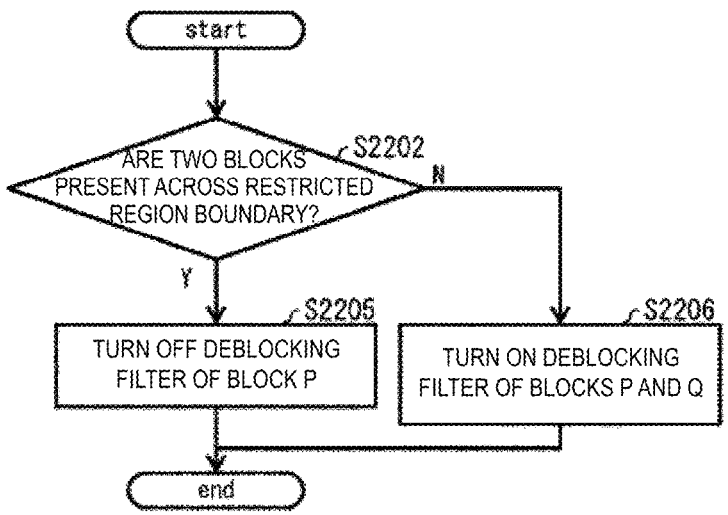
FIG. 36

VIDEO DECODING APPARATUS AND VIDEO CODING APPARATUS

TECHNICAL FIELD

One aspect of the embodiments of the present invention relates to a prediction image generation apparatus, a video decoding apparatus, and a video coding apparatus.

BACKGROUND ART

A video coding apparatus which generates coded data by coding a video, and a video decoding apparatus which generates decoded images by decoding the coded data are used for efficient transmission or recording of videos.

For example, specific video coding schemes include schemes proposed in H.264/AVC and High-Efficiency Video Coding (HEVC), and the like.

In such a video coding scheme, images (pictures) constituting a video are managed in a hierarchical structure including slices obtained by splitting an image, Coding Tree Units (CTUs) obtained by splitting a slice, Coding Units (which may be referred to as CUs) obtained by splitting a coding tree unit, and Transform Units (TUs) obtained by splitting a coding unit, and are coded/decoded for each CU.

In such a video coding scheme, usually, a prediction image is generated based on a local decoded image that is obtained by coding/decoding an input image (a source image), and prediction errors (which may be referred to also as "difference images" or "residual images") obtained by subtracting the prediction image from the input image are coded. Generation methods of prediction images include an inter-picture prediction (an inter-prediction) and an intra-picture prediction (intra prediction).

In addition, NPL 1 is exemplified as a recent technique for video coding and decoding.

CITATION LIST

Non Patent Literature

NPL 1: "Algorithm Description of Joint Exploration Test Model 7," JVET-G1001, Joint Video Exploration Team (JVET) of ITU-T SG 16 WP 3 and ISO/IEC JTC 1/SC 29/WG 11, Aug. 19, 2017

NPL 2: "Improved Cyclic Intra Refresh", JVET-K0212, Joint Video Exploration Team (JVET) of ITU-T SG 16 WP 3 and ISO/IEC JTC 1/SC 29/WG 11, Jul. 10, 2018

SUMMARY OF INVENTION

FIG. 1 is a diagram illustrating an example of a generated code amount of each picture in a case that a certain video is coded, in which the horizontal axis represents time (continuous pictures) and the vertical axis represents the generated code amount of each picture.

Technical Problem

However, ratios of the code amount are significantly different from each other between the intra prediction and the inter prediction. FIG. 1 is a diagram illustrating an example of a generated code amount of each picture in a case that a certain video is coded, in which the horizontal axis represents time (continuous pictures) and the vertical axis represents the generated code amount of each picture. As illustrated in the figure, the code amount several times as large as that of the inter picture is generated in an intra picture (I picture). Thus, a significant delay is generated in a case that the I picture is transmitted. On the other hand, there is a scheme of what is called intra refresh in which, instead of performing one entire picture to the intra prediction, only a part of one picture is intra-predicted, and the rest of the region is inter-predicted (there may be a region that is intra-predicted). In the scheme, the intra prediction is gradually performed for multiple pictures, which can thus avoid generation of a significant code amount and generation of a delay in a specific picture. However, because only a part of the picture is coded by means of the intra prediction, there is a disadvantage that coding efficiency is deteriorated as compared to an I picture in which the entire picture is coded by means of the intra prediction.

Accordingly, the present invention is made in view of the problems described above, and has an object to provide a system for implementing video coding and decoding that does not cause deterioration of functionality of random access, that prevents deterioration of coding efficiency as compared to an I picture, and that has only a small delay.

Solution to Problem

In a video decoding apparatus according to one aspect of the present invention, a picture is split into a restricted region and a non-restricted region; prediction is performed by using an intra prediction in which only a pixel of the restricted region in the picture is referred to or an inter prediction in which a restricted reference region of a reference picture of the picture is referred to for a block included in the restricted region; prediction is performed by using an intra prediction in which a decoded pixel in the picture is referred to or an inter prediction in which the reference picture of the picture is referred to for a block included in the non-restricted region; and after decoding of the picture, the restricted region of the picture is configured as the restricted reference region.

Advantageous Effects of Invention

According to one aspect of the present invention, the system of refresh can be introduced into a video, and the coded data that has only a small variation of the code amount can be generated while being capable of random access and preventing deterioration of coding efficiency. With this configuration, coding of a substantially constant bit rate can be implemented throughout the coded data, and thus a delay that has hitherto been generated in each I picture can be avoided.

BRIEF DESCRIPTION OF DRAWINGS

FIG. 4 is a conceptual diagram illustrating an example of a reference picture and a reference picture list.

FIG. 15 is a diagram illustrating syntax necessary for sequential refresh.

FIG. 20 is a schematic diagram illustrating configurations of a merge prediction parameter derivation unit and an AMVP prediction parameter derivation unit.

FIG. 24 is a diagram illustrating reference regions used for an intra prediction.

FIG. 26 is a diagram illustrating reference pixels of a reference pixel filter.

FIG. 36 is a flowchart illustrating operations of the deblocking filter.

DESCRIPTION OF EMBODIMENTS

First Embodiment

Hereinafter, embodiments of the present invention will be described with reference to the drawings.

Figure 32:
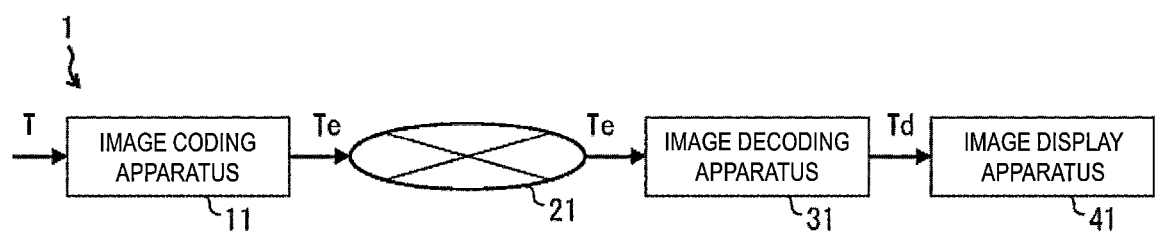
FIG. 32 is a schematic diagram illustrating a configuration of an image transmission system according to the present embodiment.

FIG. 32 is a schematic diagram illustrating a configuration of an image transmission system 1 according to the present embodiment.

The image transmission system 1 is a system in which a coding stream obtained by coding a coding target image is transmitted, the transmitted coding stream is decoded, and thus an image is displayed. The image transmission system 1 includes a video coding apparatus (image coding apparatus) 11, a network 21, a video decoding apparatus (image decoding apparatus) 31, and a video display apparatus (image display apparatus) 41.

An image T is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not necessarily limited to a bidirectional communication network, and may be a unidirectional communication network configured to transmit broadcast waves of digital terrestrial television broadcasting, satellite broadcasting of the like. The network 21 may be substituted by a storage medium in which the coding stream Te is recorded, such as a Digital Versatile Disc (DVD: trade name) or a Blu-ray (trade name)/Blu-ray Disc (trade name).

The video decoding apparatus 31 decodes each of the coding streams Te transmitted from the network 21 and generates one or multiple decoded images Td.

The video display apparatus 41 displays all or part of the one or multiple decoded images Td generated by the video decoding apparatus 31. For example, the video display apparatus 41 includes a display device such as a liquid crystal display and an organic Electro-luminescence (EL) display. Examples of types of display include a stationary type, a mobile type, and an HMD. In a case that the video decoding apparatus 31 has a high processing capability, an image having high image quality is displayed, and in a case that the video decoding apparatus 31 has only a lower processing capability, an image which does not require high processing capability and display capability is displayed.

Operator

Operators used in the present specification will be described below.

>> is a right bit shift, << is a left bit shift, & is a bitwise AND, | is a bitwise OR, |= is an OR assignment operator, and || represents a logical disjunction.

x?y: z is a ternary operator to take y in a case that x is true (other than 0) and take z in a case that x is false (0).

Clip3 (a, b, c) is a function to clip c in a value equal to or greater than a and less than or equal to b, and a function to return a in a case that c is less than a (c<a), return b in a case that c is greater than b (c>b), and return c in other cases (provided that a is less than or equal to b (a<=b)).

abs(a) is a function that returns an absolute value of a.

Int(a) is a function that returns an integer value of a.

floor(a) is a function that returns a maximum integer equal to or less than a.

ceil(a) is a function that returns a maximum integer equal to or greater than a.

a/d represents division of d by a (round to the nearest decimal point).

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 1:
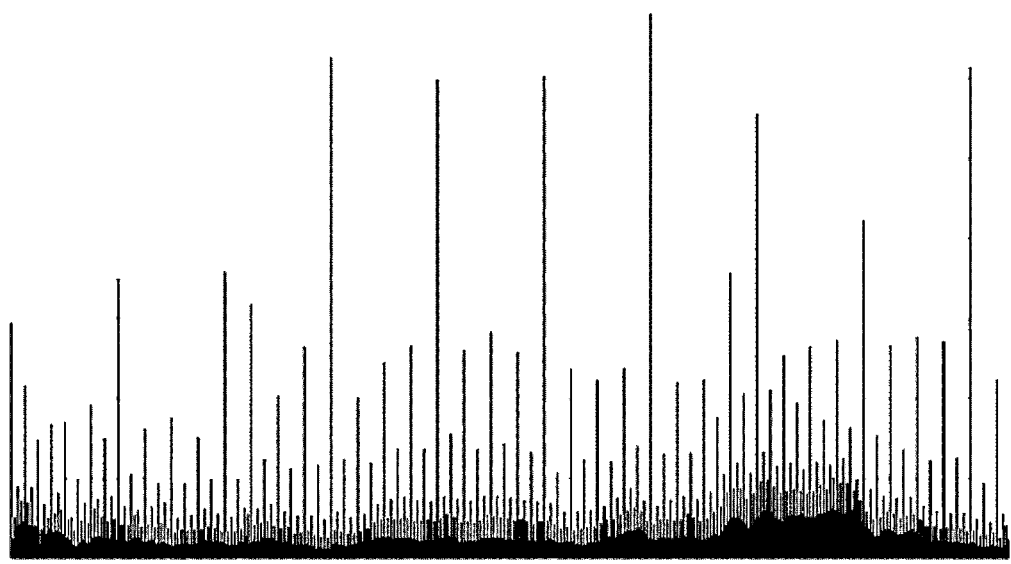
FIG. 1 is a diagram illustrating an example of a generated code amount of each picture in a case that a certain video is coded.
Figure 2:
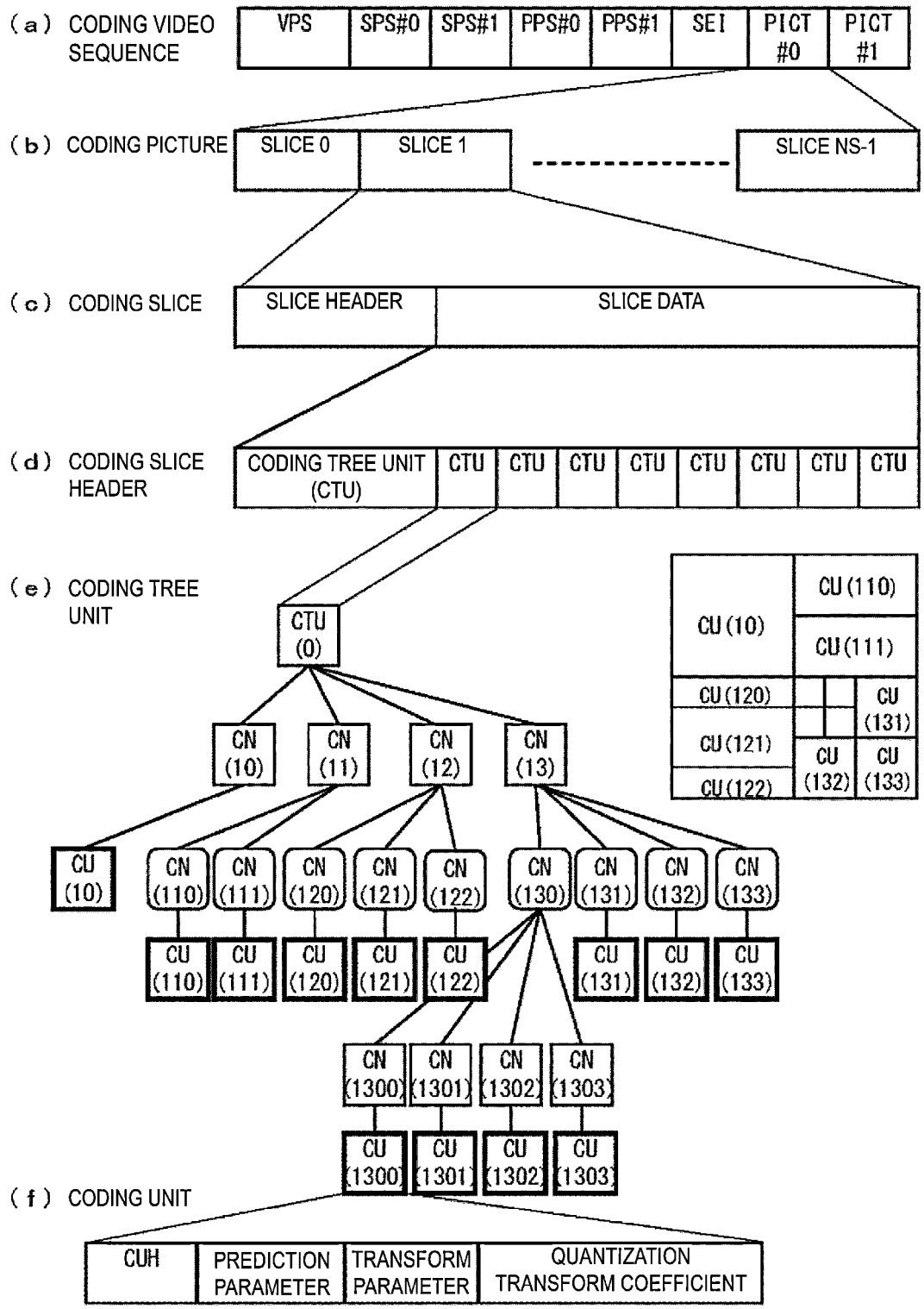
FIG. 2 is a diagram illustrating a hierarchical structure of data of a coding stream.

FIG. 2 is a diagram illustrating the hierarchy structure of data in the coding stream Te. The coding stream Te includes a sequence and multiple pictures constituting the sequence illustratively. (a) to (f) of FIG. 2 are diagrams indicating a coding video sequence prescribing a sequence SEQ, a coding picture prescribing a picture PICT, a coding slice prescribing a slice S, a coding slice data prescribing slice data, a coding tree unit CTU included in coding slice data, and a coding unit CU included in a coding tree unit, respectively.

Coding Video Sequence

In the coding video sequence, a set of data referred to by the video decoding apparatus 31 to decode the sequence SEQ to be processed is defined. As illustrated in (a) of FIG. 2, the sequence SEQ includes a Video Parameter Set, a Sequence Parameter Set SPS, a Picture Parameter Set PPS, a picture PICT, and Supplemental Enhancement Information SEI.

In the video parameter set VPS, in a video including multiple layers, a set of coding parameters common to multiple videos and a set of coding parameters associated with the multiple layers and an individual layer included in the video are defined.

In the sequence parameter set SPS, a set of coding parameters referred to by the video decoding apparatus 31 to decode a target sequence is defined. For example, a width and a height of a picture are defined. Note that multiple SPSs may exist. In that case, any of multiple SPSs is selected from the PPS.

In the picture parameter set PPS, a set of coding parameters referred to by the video decoding apparatus 31 to decode each picture in a target sequence is defined. For example, a reference value (pic_init_qp_minus26) of a quantization step size used for decoding of a picture and a flag (weighted_pred_flag) indicating an application of a weighted prediction are included. Note that multiple PPSs may exist. In that case, any of multiple PPSs is selected from each picture in a target sequence.

Coding Picture

In the coding picture, a set of data referred to by the video decoding apparatus 31 to decode the picture PICT to be processed is defined. As illustrated in FIG. 2(b), the picture PICT includes a slice 0 to a slice NS-1 (NS is a total number of slices included in the picture PICT).

Note that in a case that it is not necessary to distinguish each of the slice 0 to the slice NS-1, subscripts of reference signs may be omitted. In addition, the same applies to other data with subscripts included in the coding stream Te which will be described below.

Coding Slice

In the coding slice, a set of data referred to by the video decoding apparatus 31 to decode the slice S to be processed is defined. As illustrated in FIG. 2(c), the slice S includes a slice header and a slice data.

The slice header includes a coding parameter group referred to by the video decoding apparatus 31 to determine a decoding method for a target slice. Slice type specification information (slice_type) indicating a slice type is one example of a coding parameter included in the slice header.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like. Note that the inter prediction is not limited to uni-prediction and bi-prediction, and the prediction image may be generated by using a larger number of reference pictures. In the following, in a case that the term P or B slice is used, this indicates a slice including a block that can use the inter prediction.

Note that, the slice header may include a reference to the picture parameter set PPS (pic_parameter_set_id).

Coding Slice Data

In the coding slice data, a set of data referred to by the video decoding apparatus 31 to decode the slice data to be processed is defined. As illustrated in FIG. 2(d), the slice data includes the CTUs. A CTU is a block of a fixed size (for example, 64×64) constituting a slice, and may be called a Largest Coding Unit (LCU).

Coding Tree Unit CTU

FIG. 2(e) defines a set of data referred to by the video decoding apparatus 31 in order to decode the CTU as the processing target. The CTU is split into the coding unit CU, which is a basic unit of coding processing, by a recursive Quad Tree (QT) split, Binary Tree (BT) split, or Ternary Tree (TT) split. The BT split and the TT split are collectively referred to as a Multi Tree (MT) split. Nodes of a tree structure obtained by recursive quad tree splits are referred to as Coding Nodes. An intermediate node of the quad tree, the binary tree, and the ternary tree is a coding node, and the CTU itself is also defined as the highest coding node.

The CT includes, as CT information, a QT split flag (cu_split_flag) indicating whether or not the QT split is to be performed, an MT split mode (split_mt_mode) indicating presence or absence of the MT split, an MT split direction (split_mt_dir) indicating a split direction of the MT split, and an MT split type (split_mt_type) indicating a split type of the MT split. cu_split_flag, split_mt_flag, split_mt_dir, and split_mt_type are transmitted for each coding node.

Figure 3:
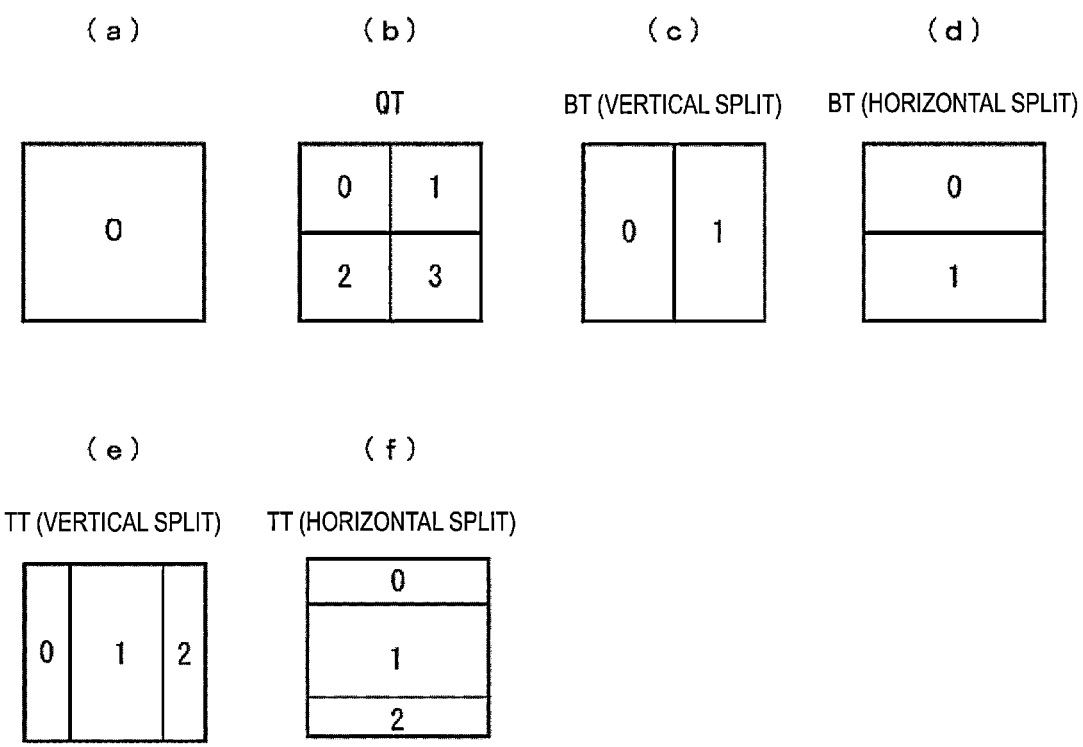
FIG. 3 is a diagram illustrating a split example of a CTU.

In a case that cu_split_flag is 1, the coding node is split into four coding nodes (FIG. 3(b)). In a case that cu_split_flag is 0, the coding node is not split and one CU is present as a node in a case that split_mt_flag is 0 (FIG. 3(a)). The CU is an end node of the coding nodes and is not split any further. The CU is a basic unit of coding processing.

In a case that split_mt_flag is 1, the coding node is split by the MT split as follows. In a case that split_mt_type is 0, the coding node is horizontally split into two coding nodes in a case that split_mt_dir is 1 (FIG. 3(d)), and the coding node is vertically split into two coding nodes in a case that split_mt_dir is 0 (FIG. 3(c)). In a case that split_mt_type is 1, the coding node is horizontally split into three coding nodes in a case that split_mt_dir is 1 (FIG. 3(f)), and the coding node is vertically split into three coding nodes in a case that split_mt_dir is 0 (FIG. 3(e)).

In a case that the size of the CTU is 64×64 pixels, the size of the CU may be any one of 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, 8×8 pixels, 64×4 pixels, 4×64 pixels, 32×4 pixels, 4×32 pixels, 16×4 pixels, 4×16 pixels, 8×4 pixels, 4×8 pixels, and 4×4 pixels.

Coding Unit CU

As illustrated in FIG. 2(*f*), a set of data referred to by the video decoding apparatus 31 to decode the CU of a processing target is prescribed. Specifically, the CU includes a CU header CUH, a prediction parameter, a transform parameter, a quantization transform coefficient, and the like. In the CU header, a prediction mode and the like are defined.

Prediction processing may be performed in the unit of a CU, or may be performed in the unit of a sub-CU, which is obtained by further splitting the CU. In a case that the size of the CU and the size of the sub-CU are the same, there is one sub-CU in the CU. In a case that the size of the CU is larger than the size of the sub-CU, the CU is split into the sub-CUs. For example, in a case that the CU has a size of 8×8 and the sub-CU has a size of 4×4, the CU is split into four sub-CUs, which include two horizontal splits and two vertical splits.

There are two types of predictions (prediction modes), namely an intra prediction and an inter prediction. The intra prediction refers to a prediction in an identical picture, and the inter prediction refers to prediction processing performed between different pictures (for example, between pictures of different display times, and between pictures of different layer images).

Transform and quantization processing is performed in the unit of a CU, but the quantization transform coefficient may be entropy coded in the unit of a subblock having a size of 4×4 or the like.

Prediction Parameter

The prediction image is derived using the prediction parameters that accompany the block. The prediction parameters include prediction parameters of the intra prediction and the inter prediction.

The prediction parameters of the inter prediction will be described below. The inter prediction parameter includes prediction list utilization flags predFlagL0 and predFlagL1, reference picture indexes refIdxL0 and refIdxL1, and motion vectors mvL0 and mvL1. The prediction list utilization flags predFlagL0 and predFlagL1 are flags to indicate whether or not reference picture lists referred to as L0 list and L1 list respectively are used, and a corresponding reference picture list is used in a case that the value is 1. Note that, in a case that the present specification mentions "a flag indicating whether or not XX", a flag being other than 0 (for example, 1) assumes a case of XX, and a flag being 0 assumes a case of not XX, and 1 is treated as true and 0 is treated as false in a logical negation, a logical product, and the like (hereinafter, the same is applied). However, other values can be used for true values and false values in real apparatuses and methods.

For example, syntax elements to derive inter prediction parameters include a merge flag merge_flag, a merge index merge_idx, an inter prediction indicator inter_pred_idc, a reference picture index refIdxLX, a prediction vector index mvp_LX_idx, and a difference vector mvdLX.

Reference Picture List

A reference picture list is a list including reference pictures stored in a reference picture memory 306. FIG. 4 is a conceptual diagram illustrating an example of a reference picture and a reference picture list in a picture structure for low delay. In (a) of the figure, a rectangle indicates a picture, an arrow indicates a reference relationship of a picture, a horizontal axis indicates time, each of I, P, and B in a rectangle indicates an intra-picture, a uni-prediction picture, a bi-prediction picture, and a number in a rectangle indicates a decoding order. As illustrated in the figure, the decoding order of the picture is I0, P1/B1, P2/B2, P3/B3, and P4/B4, and the display order is the same as well. (b) of the figure illustrates an example of the reference picture list of a picture B3 (target picture). The reference picture list is a list to represent a candidate of a reference picture, and one picture (slice) may include one or more reference picture lists. In the illustrated example, a target picture B3 includes two reference picture lists, i.e., a L0 list RefPicList0 and a L1 list RefPicList1. For an individual CU, which picture in a reference picture list RefPicListX (X=0 or 1) is actually referred to is specified with a reference picture index refIdxLX. The figure is an example of refIdxL0=2 and refIdxL1=0. In a case that the target picture is P3, the reference picture list is the L0 list only. Note that LX is a description method used in a case of not distinguishing the L0 prediction and the L1 prediction, and in the following, distinguishes parameters for the L0 list and parameters for the L1 list by replacing LX with L0 and L1.

Merge Prediction and AMVP Prediction

Decoding (coding) methods of prediction parameters include a merge prediction (merge) mode and an Adaptive Motion Vector Prediction (AMVP) mode, and the merge flag merge_flag is a flag to identify these.

The merge prediction mode is a mode to use to derive from prediction parameters of neighboring blocks already processed without including a prediction list utilization flag predFlagLX (or an inter prediction indicator inter_pred_idc), a reference picture index refIdxLX, and a motion vector mvLX in a coded data. The merge index merge_idx is an index indicating which prediction parameter is to be used as the prediction parameter of the target block, out of prediction parameter candidates (merge candidates) derived from the block on which processing is completed.

An AMVP mode is a mode in which the inter prediction indicator inter_pred_idc, the reference picture index refIdxLX, and the motion vector mvLX are included in coded data. Note that, the motion vector mvLX is coded as a prediction vector index mvp_LX_idx identifying a prediction vector mvpLX and a difference vector mvdLX. The inter prediction indicator inter_pred_idc is a value indicating types and the number of reference pictures, and takes any value of PRED_L0, PRED_L1, and PRED_BI. PRED_L0 and PRED_L1 indicate a uni-prediction, in which one reference picture managed by each of the L0 list and the L1 list is used. PRED_BI indicates a bi-prediction BiPred, in which two reference pictures managed by the L0 list and the L1 list are used.

Motion Vector

The motion vector mvLX indicates a shift quantity between blocks in two different pictures. A prediction vector and a difference vector related to the motion vector mvLX is referred to as a prediction vector mvpLX and a difference vector mvdLX respectively.

Figure 5:
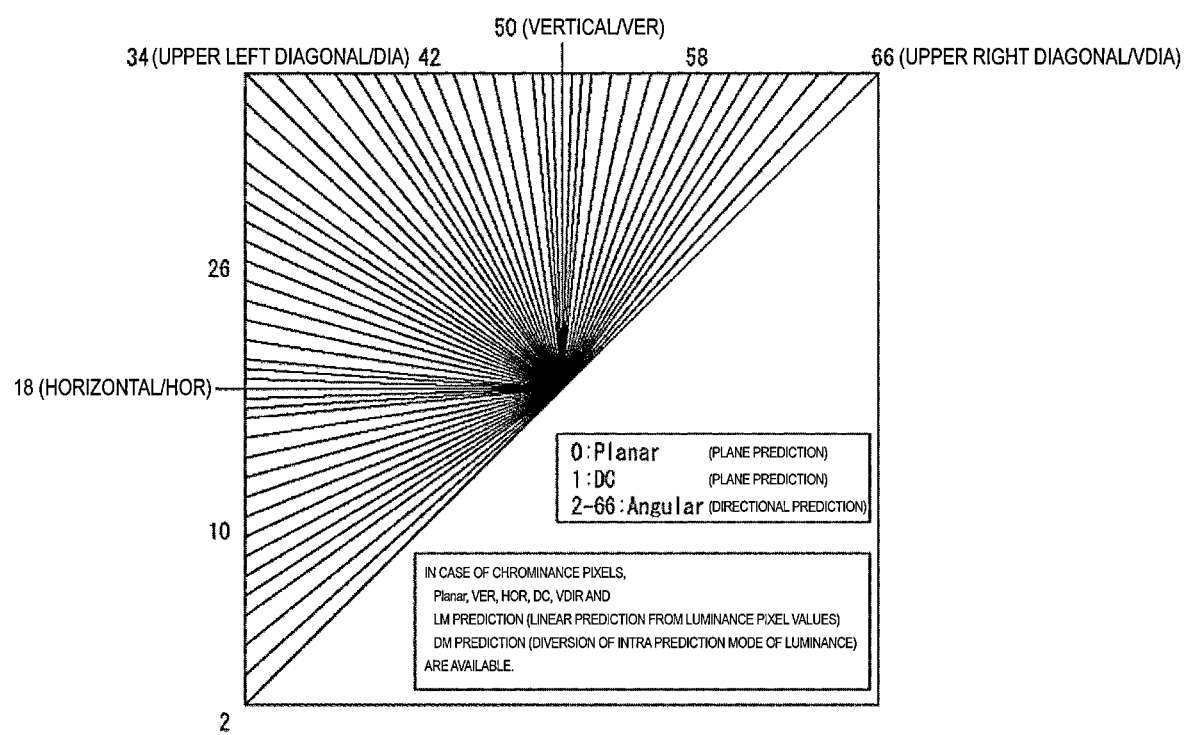
FIG. 5 is a schematic diagram illustrating types (mode numbers) of intra prediction modes.

The prediction parameters of the intra prediction will be described below. The intra prediction parameters include a luminance prediction mode IntraPredModeY and a chrominance prediction mode IntraPredModeC. FIG. 5 is a schematic diagram illustrating types (mode numbers) of intra prediction modes. For example, as illustrated in the figure, there are 67 types (0 to 66) of intra prediction modes. Examples thereof include Planar prediction (0), DC prediction (1), and Angular prediction (2 to 66). In addition, in chrominance, an LM mode (67 to 72) may be added.

Syntax elements for deriving the intra prediction parameters include, for example, prev_intra_luma_pred_flag, mpm_idx, rem_selected_mode_flag, rem_selected_mode, rem_non_selected_mode, and the like.

MPM prev_intra_luma_pred_flag is a flag indicating whether or not the luminance prediction mode IntraPredModeY of the target block and the Most Probable Mode (MPM) match each other. The MPM is a prediction mode included in an MPM candidate list mpmCandList[ ]. The MPM candidate list is a list that stores candidates that are estimated to have high probability of being applied to the target block, based on the intra prediction mode of the neighboring block and a prescribed intra prediction mode. In a case that prev_intra_luma_pred_flag is 1, the luminance prediction mode IntraPredModeY of the target block is derived by using the MPM candidate list and the index mpm_idx.

IntraPredModeY=mpmCandList[mpm_idx]

REM

In a case that prev_intra_luma_pred_flag is 0, the intra prediction mode is selected from remaining modes RemIntraPredMode, which are obtained by removing the intra prediction mode included in the MPM candidate list from the whole intra prediction mode. The intra prediction mode which is selectable as RemIntraPredMode is referred to as "non-MPM" or "REM". The flag rem_selected_mode_flag is a flag for specifying whether the intra prediction mode is selected with reference to rem_selected_mode or the intra prediction mode is selected with reference to rem_non_selected_mode. RemIntraPredMode is derived by using rem_selected_mode or rem_non_selected_mode.

Restricted Coding or Decoding Regions

The following will describe video coding and decoding methods in which a partial region is configured in one picture, the partial region is subjected to coding and decoding processing without using pixels of the rest of the region, and the rest of the region is subjected to coding and decoding processing by using the entire picture.

Figure 6:
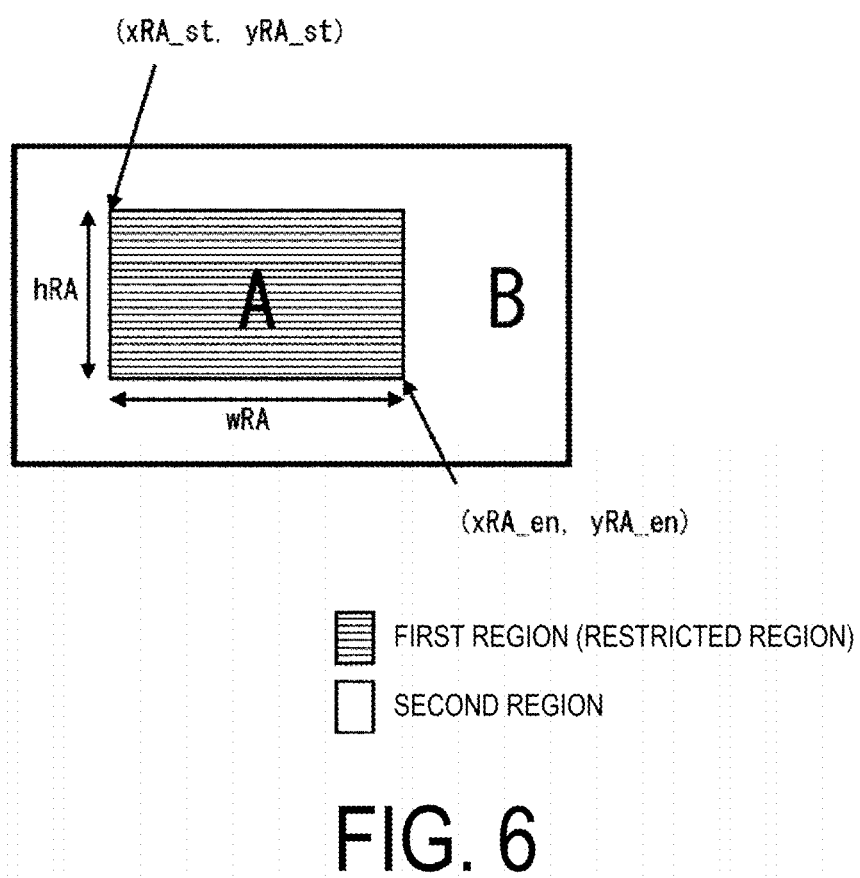
FIG. 6 is a diagram illustrating a restricted region and a non-restricted region according to the present invention.

FIG. 6 is a diagram illustrating a region A and a region B according to the present invention. In the video coding apparatus and decoding apparatus according to the present invention, a region A and a region B in the picture are configured. Regarding the region of A, the prediction processing can be performed based only on the region A, and the outside of the region is processed by padding or the like. Regarding the region of B, the prediction processing can be performed based on the entire picture including the region of A as well. Here, the prediction processing refers to intra prediction, inter prediction, loop filter processing, and the like. Regarding the region A, the coding processing or the decoding processing is closed in the region A, and the video decoding apparatus can decode pictures using only the region A.

The region A is hereinafter referred to as a restricted region (a first region, a controlled region, a clean region, a refreshed region, a region A). In contrast, a region other than the restricted region is also referred to as a non-restricted region (a second region, an uncontrolled region, a dirty region, an unrefreshed region, a region B, outside the restricted region).

For example, a region that is coded or decoded only using the intra prediction and that is already coded in the intra prediction (new refreshed region FRA to be described later) is the restricted region. A region that is coded or decoded with further reference to the restricted region configured using the intra prediction is also the restricted region. In addition, a region that is coded or decoded with reference to the restricted region in the reference picture is also the restricted region. In other words, the restricted region is a region that is coded or decoded with reference to the restricted region.

In the following, an upper left position of the restricted region is represented by (xRA_st, yRA_st), a bottom right position thereof by (xRA_en, yRA_en), and a size thereof by (wRA, hRA). Because the position and the size have the following relationship, one may be derived from the other.

$$xRA\_en=xRA\_st+wRA-1$$

$$yRA\_en=yRA\_st+hRA-1$$

Derivation can be performed as in the following.

$$wRA=xRA\_en-xRA\_st+1$$

$$hRA=yRA\_en-yRA\_st+1$$

In addition, an upper left position of a restricted reference region at time j is represented by (xRA_st[j], yRA_st[j]), a bottom right position thereof by (xRA_en[j], yRA_en[j]), and a size thereof by (wRA[j], hRA[j]). A position of the restricted reference region of a reference picture Ref may be represented by (xRA_st[Ref], yRA_st[Ref]), a bottom right position thereof by (xRA_en[Ref], yRA_en[Ref]), and a size thereof by (wRA[Ref], hRA[Ref]).

Determination of Restricted Region

For example, in a case that a certain picture is at time i and the position of a certain block is (x, y), whether or not the pixel at the position in the block is present inside the restricted region may be determined by using the following expression.

$$IsRA(x,y)=(xRA\_st[i]<=x\&\&x<=xRA\_en[i]\&\& \\ yRA\_st[i]<=y\&\&y<=yRA\_en[i])$$

Alternatively, the following determination expression may be used.

$$IsRA(x,y)=(xRA\_st[i]<=x\&\&x<xRA\_st[i]+wRA[i] \\ \&\&yRA\_st[i]<=y\&\&y<yRA\_st[i]+hRA[i])$$

$$IsRA(xRef,yRef)=(xRA\_st[Ref]<=xRef \&\& \\ xRef<=xRA\_en[Ref]\&\& yRA\_st[Ref]<= \\ yRef \&\& yRef<=yRA\_en[Ref])$$

For example, in a case that the target picture is at the time i, the upper left coordinates of a target block Pb are (xPb, yPb), and the width and the height thereof are bW and bH, an intra prediction unit, a motion compensation unit, and a loop filter of the video decoding apparatus and the video coding apparatus derive IsRA (Pb) by using the following determination expression in a case that the target block Pb is present inside the restricted region.

$$IsRA(Pb)=(xRA\_st[i]<=xPb\&\&xPb<=xRA\_en[i]\&\& \\ yRA\_st[i]<=yPb\&\&yPb<=yRA\_en[i])$$

Alternatively, the following determination expression may be used.

$$IsRA(Pb)=(xRA\_st[i]<=xPb\&\&xPb<xRA\_st[i]+wRA \\ [i]\&\& yRA\_st[i]<=yPb\&\&yPb<yRA\_st[i]+hRA \\ [i])$$

Basic Operation of Restricted Reference Region

The video coding apparatus and the video decoding apparatus of this specification perform the following operation.

Figure 7:
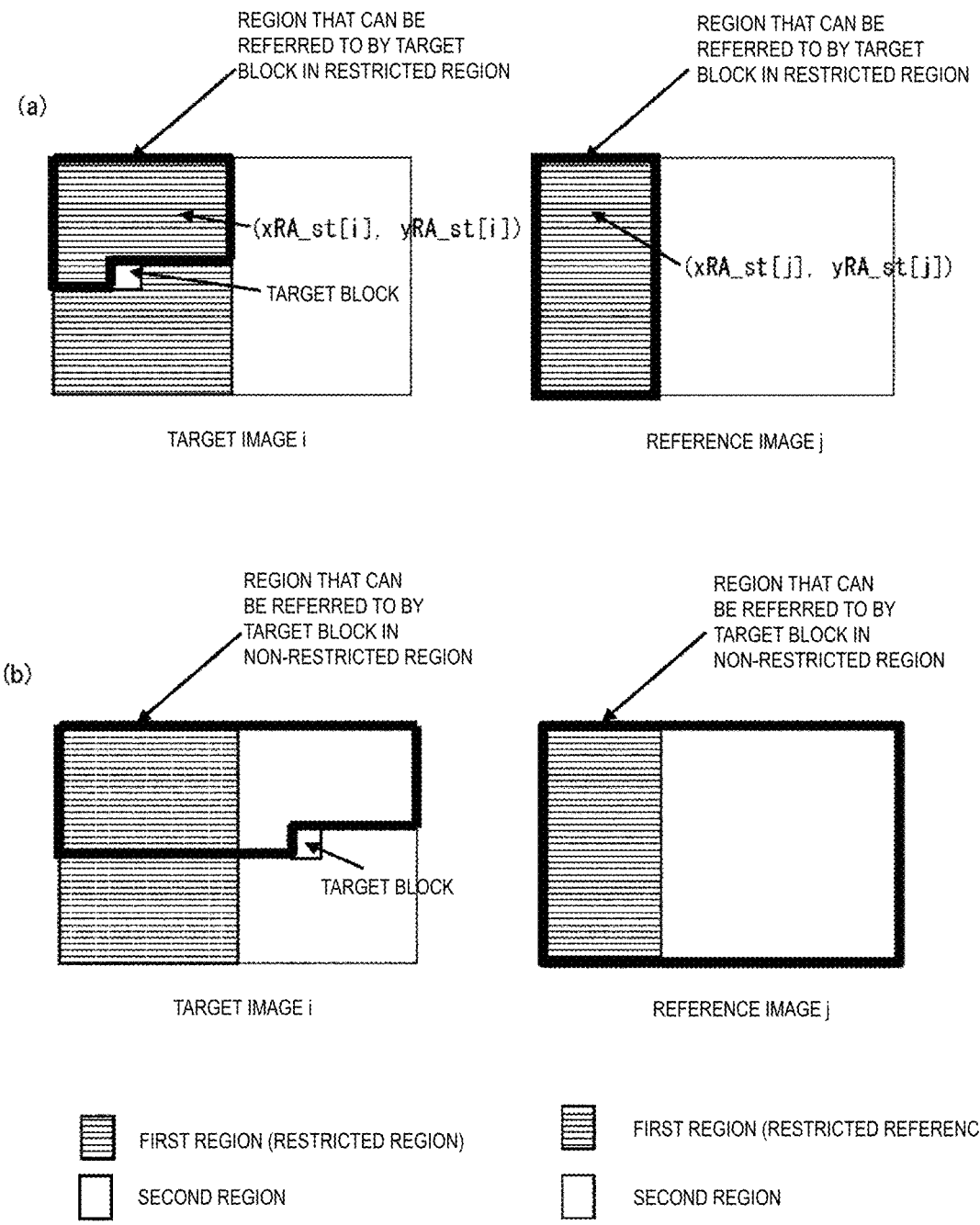
FIG. 7 is a diagram illustrating ranges that can be referred to by a target block according to the present invention.

FIG. 7 is a diagram illustrating ranges that can be referred to by the restricted region in the intra prediction, the inter prediction, and the loop filter according to the present invention. FIG. 7(a) illustrates a range that can be referred to by the target block included in the restricted region. A region that has already been coded or decoded included in the restricted region of the picture (target picture) the same as the target block is a range that can be referred to by the target block with the intra prediction, the inter prediction, and the loop filter. In a similar manner, the restricted region in the reference picture (restricted reference region) is a range that can be referred to by the target block with the inter prediction and the loop filter. FIG. 7(b) illustrates a range that can be referred to by the target block included in the non-restricted region. The region that has already been coded or decoded in the target picture is a range that can be referred to by the target block with the intra prediction and the inter prediction. In a similar manner, the entire region in the reference picture is a region that can be referred to with the inter prediction. Note that, in a case that parallel processing for a tile, a slice, wavefront, or the like and reference restriction are used, other restriction may be applied in addition to the above.

Regarding the target block included in the restricted region, the intra prediction that refers only to the pixels of the restricted region in the target picture or the inter prediction that refers to the restricted reference region of the reference picture is performed.

Regarding the target block included in the restricted region, the coding parameter of the target block is derived with reference to the coding parameter (for example, an intra prediction direction, a motion vector, and a reference picture index) of the restricted region in the target picture or with reference to the coding parameter of the restricted reference region of the reference picture.

Regarding the target block included in the restricted region, the loop filter processing is performed with reference only to the pixels of the restricted region in the target picture.

Determination and Availability of Restricted Region

In MPM derivation of the intra prediction and merge candidate derivation of the inter prediction, for example, the prediction parameter (intra prediction mode, motion vector) of the target block may be derived by using the prediction parameter of the neighboring region. In such a case, the following processing may be performed. In a case that the target block is the restricted region (IsRA (xPb, yPb) is true) and a reference position (xNbX, yNbX) of the neighboring block of the target block is the non-restricted region (IsRA (xNbX, yNbX) is false) in the intra prediction and the inter prediction, a value of the neighboring block is not used in prediction parameter derivation. Specifically, in a case that the target block is the restricted region (IsRA (xPb, yPb) is true) and the reference position (xNbX, yNbX) of the neighboring block of the target block is the restricted region (IsRA (xNbX, yNbX) is true), the prediction parameter of the position (xNbX, yNbX) is used for derivation of the prediction parameter of the target block.

Note that the above description is given by taking an example of derivation of prediction candidates, but the present invention may be applied to the loop filter processing. Determination of the restricted region may be used for the whole of determination outside the picture in a manner similar to the determination of the outside the picture and the unit of parallel processing (slice boundary, tile boundary). In other words, in a case that the target block is the restricted region (IsRA (xPb, yPb) is true) and reference position (xNbX, yNbX) of the target block is the non-restricted region (IsRA (xNbX, yNbX) is false), it is determined that the reference position (xNbX, yNbX) cannot be referred to (unavailable) (availableNbX=0). Specifically, in a case that the target block is present inside the picture, the target block and the reference position are not present in different units of parallel processing, and the target block is present in the restricted region, or the reference position (xNbX, yNbX) of the target block is the restricted region (IsRA (xNbX, yNbX) is true), it is determined that the reference position (xNbX, yNbX) can be referred to (availableNbX=1). In the intra prediction and the inter prediction, in a case that the reference position (xNbX, yNbX) can be referred to (available) (availableNbX=1), the prediction parameter of the reference position is used for derivation of the prediction parameter of the target block, and in the loop filter, in a case that the reference position (xNbX, yNbX) is available (availableNbX=1), deblocking filter processing is performed.

Determination of Restricted Reference Region and Clipping of Restricted Reference Region In a case that the reference picture is at the time j and the upper left position of the reference pixel is (xRef, yRef), the motion compensation unit derives a case that the reference pixel is present inside the restricted reference region by using the following determination expression.

$IsRA(xRef,yRef)=(xRA\_st[j]<=xRef\ \&\&$
$xRef<=xRA\_en[j]\ \&\&\ yRA\_st[j]<=yRef\ \&\&$
$yRef<=yRA\_en[j])$

Alternatively, the following determination expression may be used.

$IsRA(xRef,yRef)=(xRA\_st[j]<=xRef\ \&\&$
$xRef<xRA\_st[j]+wRA[j]\ \&\&\ yRA\_st[i]<=$
$yRef\ \&\&\ yRef<yRA\_st[j]+hRA[j])$

The motion compensation unit may clip the reference pixel to the position inside the restricted region by using the following expression.

$xRef=Clip3(xRA\_st[j],xRA\_en[j],xRef)$ $yRef=Clip3(yRA\_st[j],yRA\_en[j],yRef)$ Alternatively, the following derivation expression may be used.

$xRef=Clip3(xRA\_st[j],xRA\_st[j]+wRA[j]-1,xRef)$ $yRef=Clip3(yRA\_st[j],yRA\_st[j]+hRA[j]-1,yRef)$ Note that the position of the restricted region is transmitted from the video coding apparatus to the video decoding apparatus by using sequential refresh information to be described later. Note that, regarding the position and the size of the restricted region, the reference picture Ref in a reference memory may be configured after the target picture is decoded or at a decoding start time point of the target picture without derivation according to time (for example, POC). In this case, the position and the size of the restricted region can be derived by specifying the reference picture Ref.

Configuration and Update of Restricted Reference Region

The restricted region of the picture is configured as the restricted reference region of a case that the picture is used as the reference picture.

For example, in a case that the picture having the restricted region with the upper left coordinates (xRA_st, yRA_st), the bottom right coordinates (xRA_en, yRA_en), and the size (wRA, hRA) is referred to as the reference picture at the time j, the restricted reference region may be configured by using the following expression.

$xRA\_st[j]=xRA\_st,xRA\_en[j]=xRA\_en,wRA[j]=wRA$ $yRA\_st[j]=yRA\_st,yRA\_en[j]=xRA\_en,hRA[j]=hRA$

Figure 8:
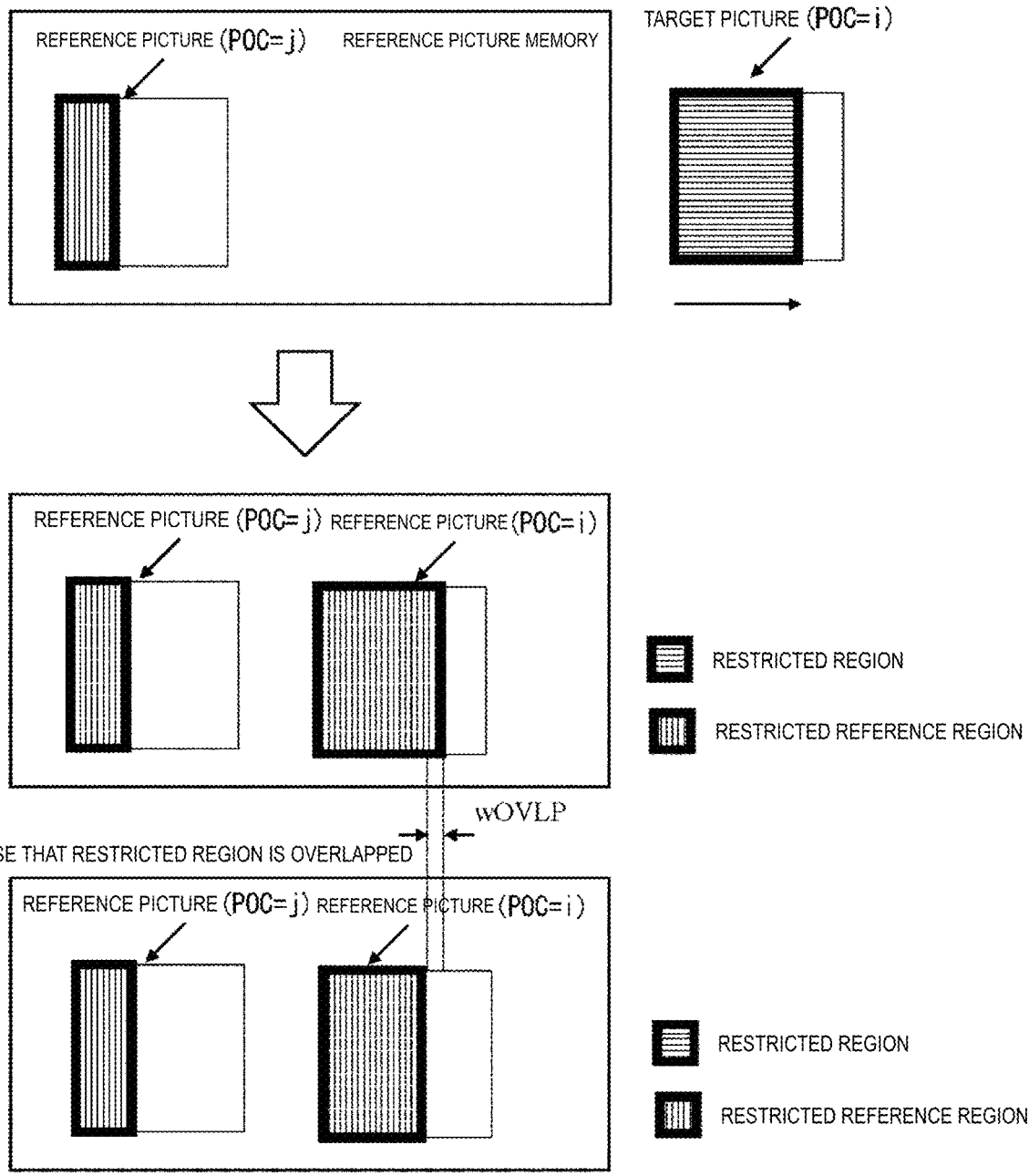
FIG. 8 is a diagram illustrating configurations of a restricted reference region.

FIG. 8 is a diagram illustrating update of the restricted reference region of the reference picture in the reference memory. For example, the restricted region of the target picture at the time i, that is, the upper left coordinates (xRA_st[i], yRA_st[i]), the bottom right coordinates (xRA_en[i], yRA_en[i]), and the size (wRA[i], hRA[i]) are decoded by using the restricted reference region of a reference picture j in the reference memory with the upper left coordinates (xRA_st[j], yRA_st[j]), the bottom right coordinates (xRA_en[j], yRA_en[j]), and the size (wRA[j], hRA [j]). The restricted reference region at the time of storage in the reference memory as a reference picture i after decoding a target picture i may be as follows.

Restricted reference region of reference picture j: Upper left coordinates (xRA_st[j], yRA_st[j]), bottom right coordinates (xRA_en[j], yRA_en[j]), and size (wRA[j], hRA[j])

Restricted reference region of reference picture i: Upper left coordinates (xRA_st[i], yRA_st[i]), bottom right coordinates (xRA_en[i], yRA_en[i]), and size (wRA[i], hRA[i])

Further, as will be described later, in a case that the restricted region is overlapped, the restricted reference region of the reference picture may be smaller than that at the time point at which the target picture is decoded.

Restricted reference region of reference picture j: Upper left coordinates (xRA_st[j], yRA_st[j]), bottom right coordinates (xRA_en[j], yRA_en[j]), and size (wRA[j], hRA[j])

Restricted reference region of reference picture i: Upper left coordinates (xRA_st[i], yRA_st[i]), bottom right coordinates (xRA_en[i]−wOVLP, yRA_en[i]), and size (wRA[i]−wOVLP, hRA[i])

In addition, as will be described later, the restricted reference region of the reference picture at the time j (=i) may be configured by using the restricted region at time i−1 and the new refreshed region FRA of the target picture.

In a sequential decoding refresh picture (Sequentially Decoder Refresh, SDR picture), all of the referable regions (restricted reference regions) are cleared from the restricted region in the reference picture to be rendered unreferable.

For example, in the reference picture at the time j, a flag indicating whether or not the restricted reference region is configured may be configured to 0, or the restricted reference region may be eliminated by using the following expression.

$$xRA\_st[j]=0, xRA\_en[j]=0, wRA[j]=0$$

$$yRA\_st[j]=0, yRA\_en[j]=0, hRA[j]=0$$

The restricted region in the reference picture is also referred to as a restricted reference region (a first reference region, an uncontrolled reference region, a clean reference region, a refreshed reference region, a reference region A), and the non-restricted region in the reference picture is also referred to as a non-restricted reference region (a second reference region, an uncontrolled reference region, a dirty reference region, an unrefreshed reference region, a reference region B).

Sequential Refresh

An overview of refresh (sequential refresh, sequential decoding refresh) according to the present invention will be described. Sequential refresh according to the present invention is a technology of sequentially refreshing the entire picture by sequentially transmitting the restricted region configured using the intra prediction and further extending the size of the restricted region to be equal to the entire picture in a subsequent picture. Note that, in the target picture, the region to be newly added as the restricted region is herein referred to as a new refreshed region (Fresh Refreshed Area).

Figure 9:
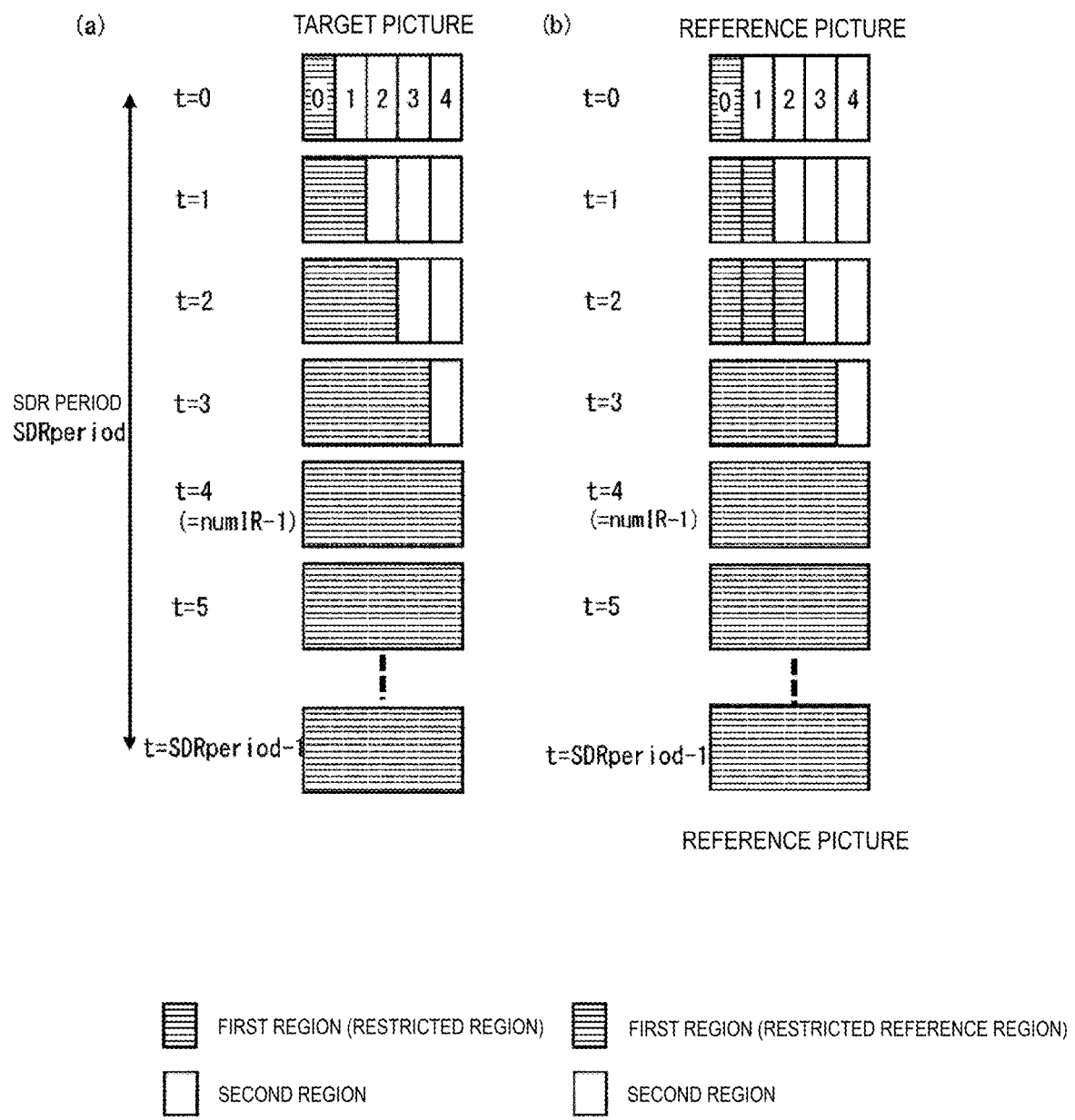
FIG. 9 is a diagram illustrating a sequential refreshed region according to the present invention.

FIG. 9 is a diagram illustrating refresh (sequential refresh) according to the present invention. In sequential refresh of this specification, the restricted region (new refreshed region FRA) configured using the intra prediction is inserted into a picture to be a starting point of refresh. The picture to be the starting point of refresh is referred to as an SDR picture (Sequentially Decoder Refresh, random access point). A region coded using only the intra prediction mode is referred to as a new refreshed region Fresh Refreshed Area (FRA).

FIG. 9(*a*) illustrates the restricted region at each time t. As in the figure, in the SDR picture (t=0), the restricted region all using the intra prediction is decoded. In the SDR picture, all of the restricted reference regions in the reference picture are cleared to be rendered unreferable. Subsequently, the restricted region is extended as the time advances from t=0 to numIR−1, and at t=numIR−1, the entire picture is refreshed. FIG. 9(*b*) illustrates the restricted reference region on the reference picture. In the figure, in a case that the picture at the time t is referred to as the reference picture, the restricted reference region is represented by a region hatched with horizontal lines. A configuration of periodically inserting the SDR picture is also possible. In this specification, the SDR picture is inserted every SDR period SDRperiod.

Figure 10:
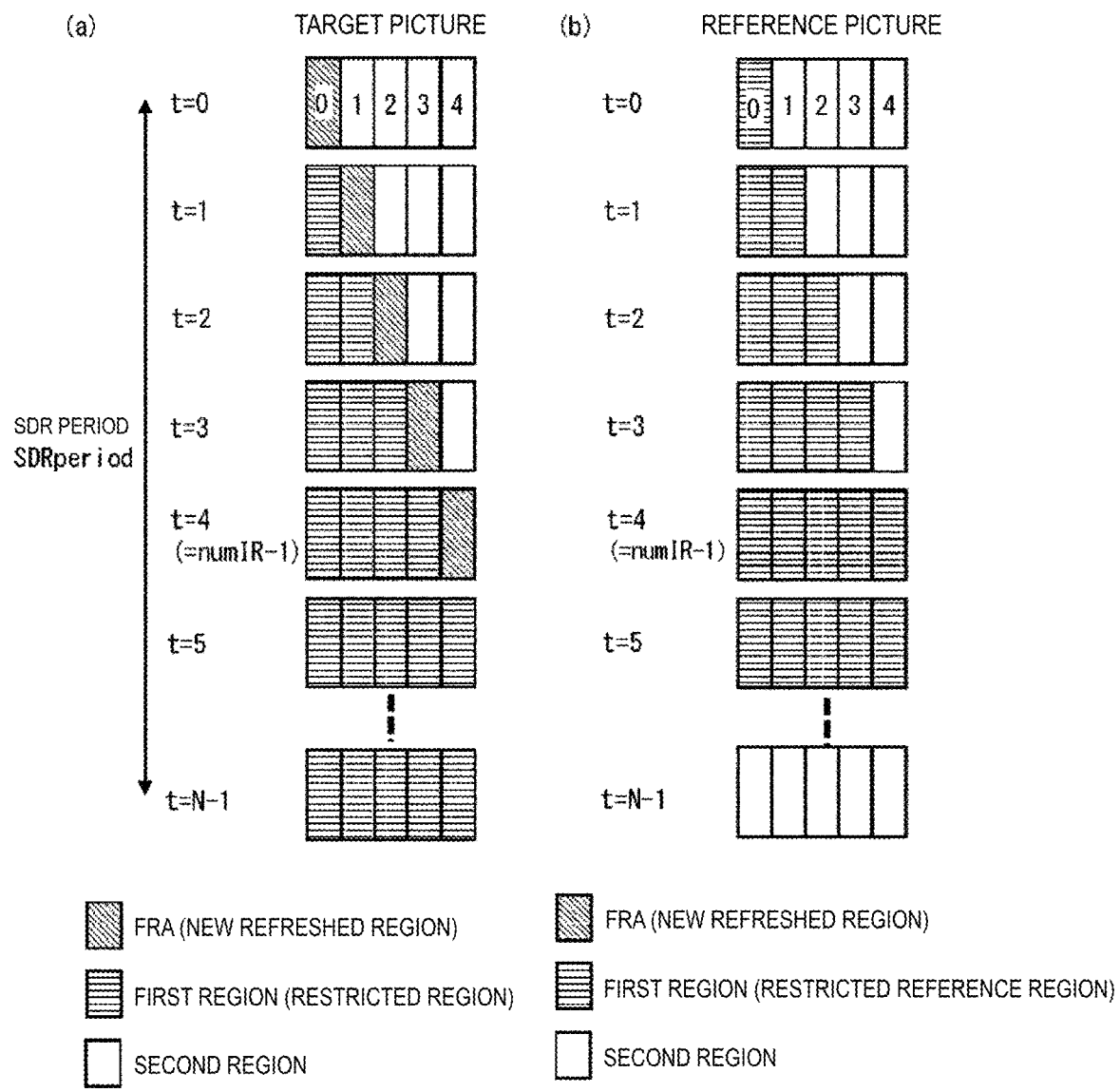
FIG. 10 is a diagram illustrating a new refreshed region, the restricted region, and the non-restricted region according to the present invention.

FIG. 10 is a diagram explicitly illustrating the region (new refreshed region) in the restricted region to be newly added in the target picture. In sequential refresh, refresh of the entire picture can be performed by sequentially adding the new refreshed region FRA and newly configuring the restricted region by including the added FRA. Note that the entire part of the new refreshed region FRA can be a region (Intra Refreshed Area, IRA) using only the intra prediction. In this manner, probability of correct decoding (error tolerance) may be further enhanced by using the intra prediction IRA for the new refreshed region FRA.

Note that, in the restricted region, a picture prior to the first picture of the SDR period must not be referred to. For example, at time t=2 of FIG. 10(*a*), the picture referred to by the region of k=0 or k=1 is the picture at time t=0 or t=1 in the reference picture memory of FIG. 10(*b*).

Configuration Example of Sequential Refresh

Figure 11:
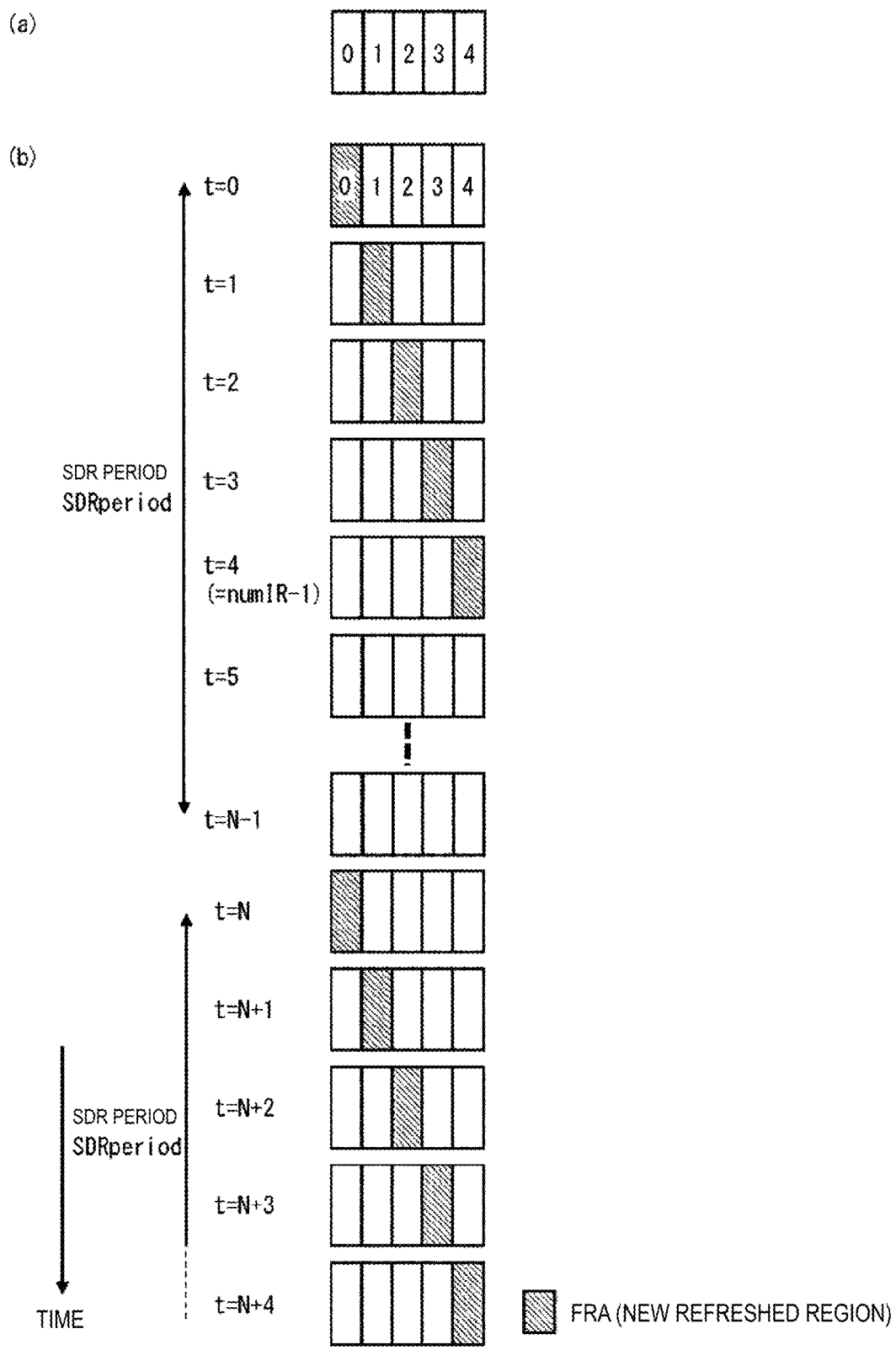
FIG. 11 is a diagram illustrating the new refreshed region according to the present invention.

FIG. 11(*a*) is an example in which one picture is split into numIR regions (refreshed unit regions). The following description is given on the assumption that numIR is 5. The number k (k=0 . . . 4) in the figure is an index indicating the refreshed unit region.

FIG. 11(*b*) is a diagram illustrating an example in which the new refreshed region FRA (region hatched with diagonal lines in the figure) to be added to the restricted region is shifted from the left to the right. At time t=0, the region of k=0 at the left edge is the FRA, and at time t=1, the region of k=1 is the FRA. As t increases, the FRA is shifted to the right, and at time t=4, the region of k=4 (=numIR−1) located at the right edge of the picture is the FRA. From t=5 to t=N−1, the picture is a normal picture not including the FRA. At t=N and later, the picture structure the same as that from t=0 to t=N−1 is repeated. "N" used above is referred to as the SDR period SDRperiod. At time t, the picture of (t % SDRperiod)=0 is the random access point, and random access can be performed with the random access point being used as the starting point.

Random Access Processing Using Sequential Refresh

In the SDR picture, the video decoding apparatus decodes the intra-predicted restricted region (FRA), and in the region other than the restricted region, the video decoding apparatus generates an appropriate image through error concealment. In pictures that follow the SDR picture as well, the video decoding apparatus decodes the restricted region that refers to the intra-predicted restricted region and the restricted reference region of the reference picture, and in the region other than the above, the video decoding apparatus generates an appropriate image through error concealment. With the operation being repeated until the new refreshed region (for example, FRA) moves from one edge to another edge of the picture and the restricted region becomes the entire picture (for numIR pictures), the entire picture can be correctly decoded.

Shape and Shift Direction of Refreshed Region

Figure 12:
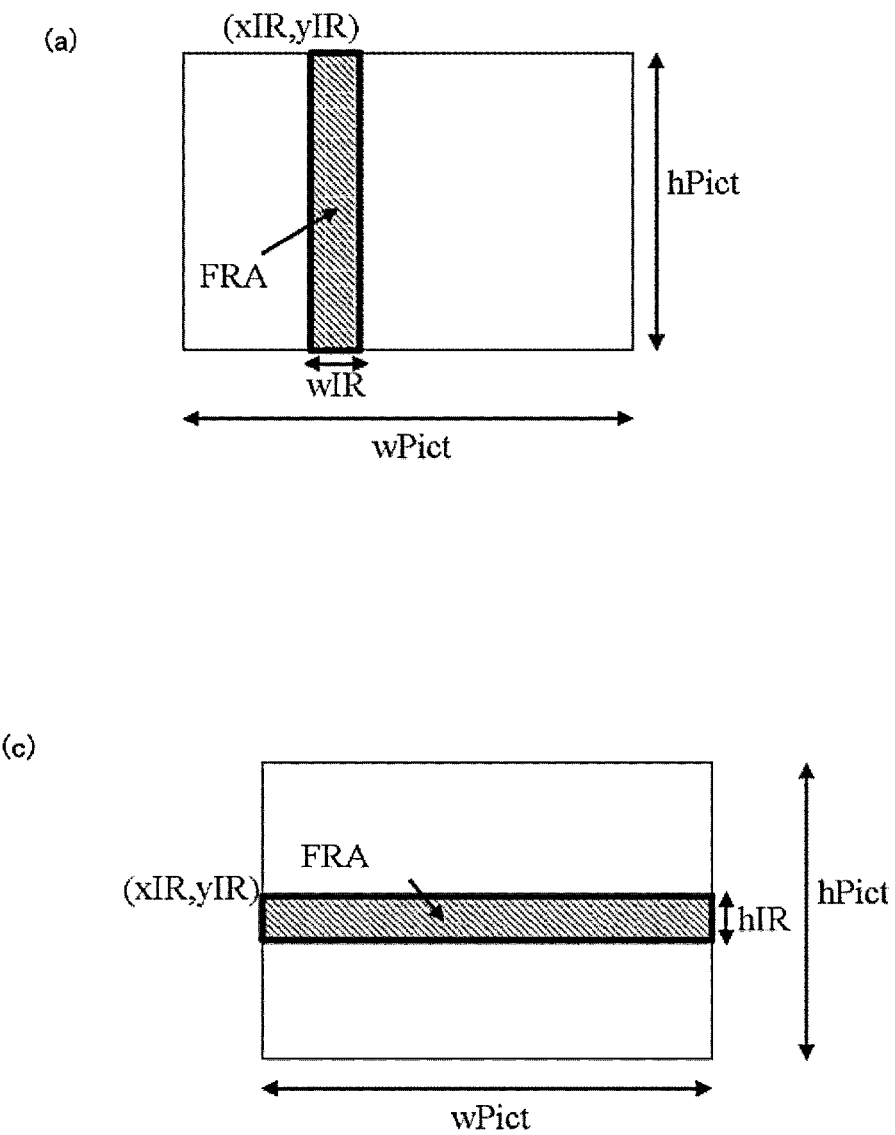
FIG. 12 is a diagram illustrating relationships between the new refreshed region and a CU.

FIG. 12 is a diagram illustrating the regions of the FRA. FIG. 12(a) illustrates a case of shift from the left to the right, and in this case, the FRA has a rectangular shape having a width wIR and a height hPict with its upper left coordinates being (xIR, yIR). The width wIR of the FRA is an integer multiple of a width of a minimum CU minCU.

$$wIR = minCU * a$$

Here, a is a positive integer.

FIG. 12(b) illustrates a case of shift from the upper side to the bottom side, and in this case, the FRA has a rectangular shape having a height hIR and a width wPict with its upper left coordinates being (xIR, yIR). Further, the height hIR of the FRA is an integer multiple of a width minCU of a minimum CU.

$$hIR = minCU * a$$

Here, a is a positive integer. In other words, granularity of the width or the height of the FRA is configured to be equal to or greater than a minimum value minCU of the width or the height of the CU, and an integer multiple of minCU.

Figure 13:
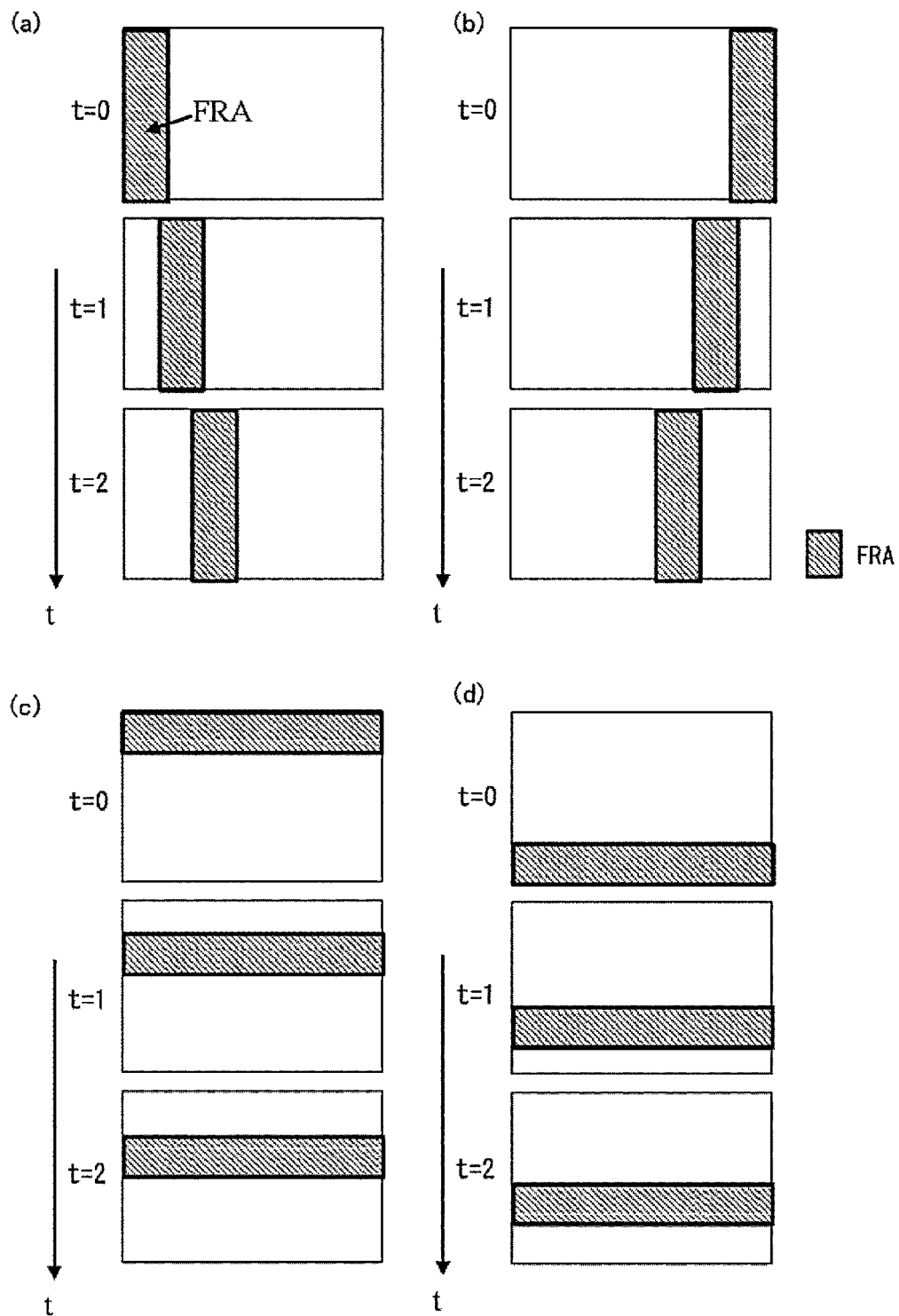
FIG. 13 is a diagram illustrating types of the new refreshed region according to the present invention.

FIG. 13 is a diagram illustrating refresh directions. In FIG. 13(a), the FRA is inserted in the vertical direction, and is shifted from the left to the right. In this case, the upper left coordinates (xIR[t], yIR[t]) and the bottom right coordinates (xRA_en[t], yRA_en[t]) of the new refreshed region of the picture at the time t can be expressed as follows.

$$(xIR[t], yIR[t]) = (wIR*t-1, hPict-1)$$

$$(xRA\_en[t], yRA\_en[t]) = (wIR*(t+1)-1, hPict-1)$$

In addition, the upper left coordinates (xRA_st[t], yRA_st[t]) and the bottom right coordinates (xRA_en[t], yRA_en[t]) of the restricted region of the picture at the time t can be expressed as in (Expression IR-1).

$$(xRA\_st[t], yRA\_st[t]) = (0,0) \quad \text{(Expression IR-1)}$$

$$(xRA\_en[t], yRA\_en[t]) = (wIR*(t+1)-1, hPict-1)$$

Here, wIR is the width of the FRA, and hPict is the height of the picture.

(Expression IR-1) may be expressed as follows, using a width wOVLP related to the pixel value other than the restricted region and the pixel derived with reference to the coding parameter.

$$(xRA\_st[t], yRA\_st[t]) = (0,0)$$

$$(xRA\_en[t], yRA\_en[t]) = (wIR*(t+1)-1-wOVLP, hPict-1)$$

FIG. 13(b) is an example (seq_refresh_direction=1) in which the FRA is inserted in the vertical direction, and is shifted from the right to the left.

FIG. 13(c) is an example (seq_refresh_direction=0) in which the FRA is inserted in the horizontal direction, and is shifted from the upper side to the bottom side. In this case, the upper left coordinates of the restricted region of the picture at the time t can be expressed as in (Expression IR-2).

$$(xRA\_st[t], yRA\_st[t]) = (0,0)$$

$$(xRA\_en[t], yRA\_en[t]) = (wPict-1, hIR*(t+1)-1) \quad \text{(Expression IR-2)}$$

Here, hIR is the height of the FRA, and wPict is the width of the picture.

(Expression IR-2) can be expressed as follows, using a height hOVLP related to the pixel value other than the restricted region and the pixel derived with reference to the coding parameter.

$$(xRA\_st[t], yRA\_st[t]) = (0,0)$$

$$(xRA\_en[t], yRA\_en[t]) = (wPict-1, hIR*(t+1)-1-hOVLP)$$

FIG. 13(d) is an example in which the FRA is inserted in the horizontal direction, and is shifted from the upper side to the bottom side.

Figure 14:
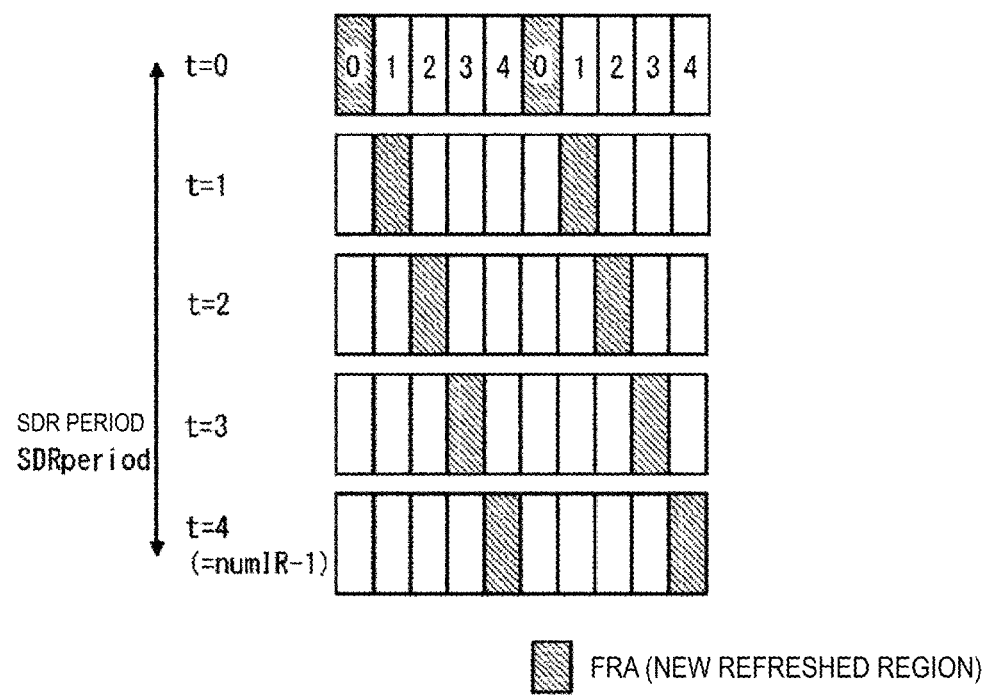
FIG. 14 is another diagram illustrating the new refreshed region according to the present invention.

FIG. 14 is an example in which the FRA includes multiple regions. In the above description, a region k has one rectangular shape on a certain picture. However, as illustrated in FIG. 14(a), the region k may have multiple rectangular shapes. In this case, as illustrated in FIG. 14(b), the restricted region includes multiple regions of the picture.

Configuration of Video Decoding Apparatus

Figure 17:
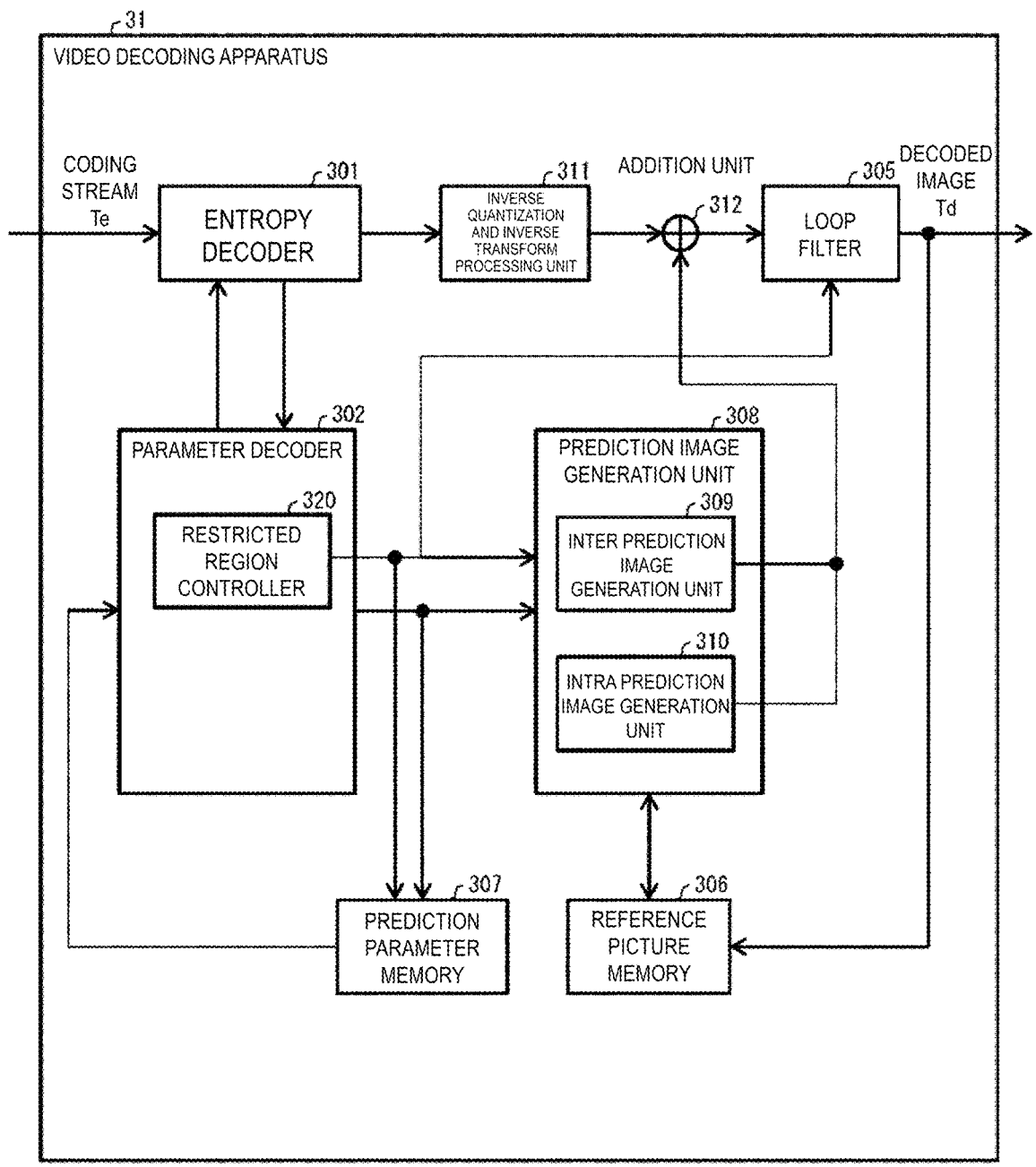
FIG. 17 is a schematic diagram illustrating a configuration of a video decoding apparatus.

A configuration of the video decoding apparatus 31 (FIG. 17) according to the present embodiment will be described.

The video decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, and an addition unit 312. Note that, in accordance with the video coding apparatus 11 to be described later, the loop filter 305 may not be included in the video decoding apparatus 31.

The parameter decoder 302 includes a restricted region controller 320, the restricted region controller 320 includes a header decoder 3020, a CT information decoder 3021, and a CU decoder 3022 (prediction mode decoder) (which are not illustrated), and the CU decoder 3022 further includes a TU decoder 3024. The header decoder 3020 decodes parameter set information, such as the VPS, SPS, and PPS, from the coded data. The header decoder 3020 decodes the slice header (slice information) from the coded data. The CT information decoder 3021 decodes the CT from the coded data. The CU decoder 3022 decodes the CU from the coded data. In a case that a prediction error is included in the TU, the TU decoder 3024 decodes QP update information (quantization correction value) and a quantization prediction error (residual_coding) from the coded data.

The parameter decoder 302 includes an inter prediction parameter decoder 303 (not illustrated) and an intra prediction parameter decoder 304. The prediction image generation unit 308 includes an inter prediction image generation unit 309 and an intra prediction image generation unit 310.

The following will give description by taking an example in which the CTU and the CU are used as the unit of processing. However, this example is not restrictive, and the processing may be performed in the unit of the sub-CU. Alternatively, the processing may be performed in the unit of the block or the subblock, with the CTU, the CU, and the TU being interpreted as the block, and the sub-CU as the subblock.

The entropy decoder 301 performs entropy decoding on the coding stream Te input from the outside and separates and decodes individual codes (syntax elements). Entropy coding includes a scheme in which the syntax element is coded by variable-length coding by using a context (probability model) that is adaptively selected according to the type and a surrounding condition of the syntax element, and a scheme in which the syntax element is coded by variable-length coding by using a predetermined table or calculation expression. One typical example of the former scheme is Context Adaptive Binary Arithmetic Coding (CABAC). The separated codes include prediction information to generate a prediction image and a prediction error to generate a difference image and the like.

The entropy decoder 301 outputs a part of the separated codes to the parameter decoder 302. For example, a part of the separated codes includes a prediction mode predMode, a merge flag merge_flag, a merge index merge_idx, an inter prediction indicator inter_pred_idc, a reference picture index refIdxLX, a prediction vector index mvp_LX_idx, a difference vector mvdLX, and the like. Which code is to be decoded is controlled based on an indication of the parameter decoder 302. The entropy decoder 301 outputs quantization transform coefficients to the inverse quantization and inverse transform processing unit 311.

Parameter Decoder 302

FIG. 15 is a diagram illustrating an example of syntax that is reported to implement sequential refresh. FIG. 15(a) illustrates syntax (sequential refresh information) that is reported in the sequence parameter set (SPS). seq_refresh_enable_flag is a flag indicating whether or not sequential refresh is to be used in the subsequent picture. The parameter decoder 302 decodes the sequential refresh information, and in a case that the seq_refresh_enable_flag flag is 1, the video decoding apparatus decodes the video by using sequential refresh, and in a case that the seq_refresh_enable_flag flag is 0, the video decoding apparatus does not use sequential refresh. In a case that seq_refresh_enable_flag is 1, the parameter decoder 302 decodes seq_refresh_mode, seq_refresh_direction, and seq_refresh_period. seq_refresh_mode is a flag indicating a type of sequential refresh illustrated in FIG. 13.

In a case that seq_refresh_mode is 0, as illustrated in FIGS. 13(a) and (b), the video decoding apparatus inserts the new refreshed region (FRA) into the picture in the vertical direction, and in a case that seq_refresh_mode is 1, as illustrated in FIGS. 13(c) and (d), the video decoding apparatus inserts the FRA into the picture in the horizontal direction.

seq_refresh_direction is a flag indicating a shift direction of sequential refresh illustrated in FIG. 13. In a case that seq_refresh_direction is 0, as illustrated in FIGS. 13(a) and (c), the video decoding apparatus makes the FRA shift from the left to the right or from the upper side to the bottom side of the picture. In a case that seq_refresh_direction is 1, as illustrated in FIGS. 13(b) and (d), the video decoding apparatus makes the FRA shift from the right to the left or from the bottom side to the upper side of the picture. seq_refresh_period is the SDR period SDRperiod, and indicates the number of pictures between random access points.

FIG. 15(b) illustrates syntax of the sequential refresh information that is reported in the picture parameter set (PPS). In a case that seq_refresh_enable_flag is 1, the parameter decoder 302 decodes seq_refresh_position, seq_refresh_size, and seq_refresh_overlap. seq_refresh_position is syntax for specifying the upper left coordinates (xIR, yIR) of the new refreshed region to be added to the restricted region. In a case that seq_refresh_mode is 0 (vertical rectangular shape restricted region), the parameter decoder 302 configures seq_refresh_position for the x coordinate xIR, and configures 0 for the y coordinate yIR. In a case that seq_refresh_mode is 1 (horizontal rectangular shape restricted region), the parameter decoder 302 configures 0 for the x coordinate xIR, and configures seq_refresh_position for the y coordinate yIR. seq_refresh_size is the size of the FRA, and in a case that seq_refresh_mode is 0, the width wIR of the FRA is configured, and in a case that seq_refresh_mode is 1, the height hIR of the FRA is configured. seq_refresh_overlap is the size of a region in which the position of the FRA of an immediately preceding picture in decoding order and the position of the FRA of the target picture overlap, and in a case that seq_refresh_mode is 0, the width wOVLP of the overlap is specified, and in a case that seq_refresh_mode is 1, the height hOVLP of the overlap is specified. Note that seq_refresh_overlap may be 0.

Overlap New Refreshed Region

Figure 16:
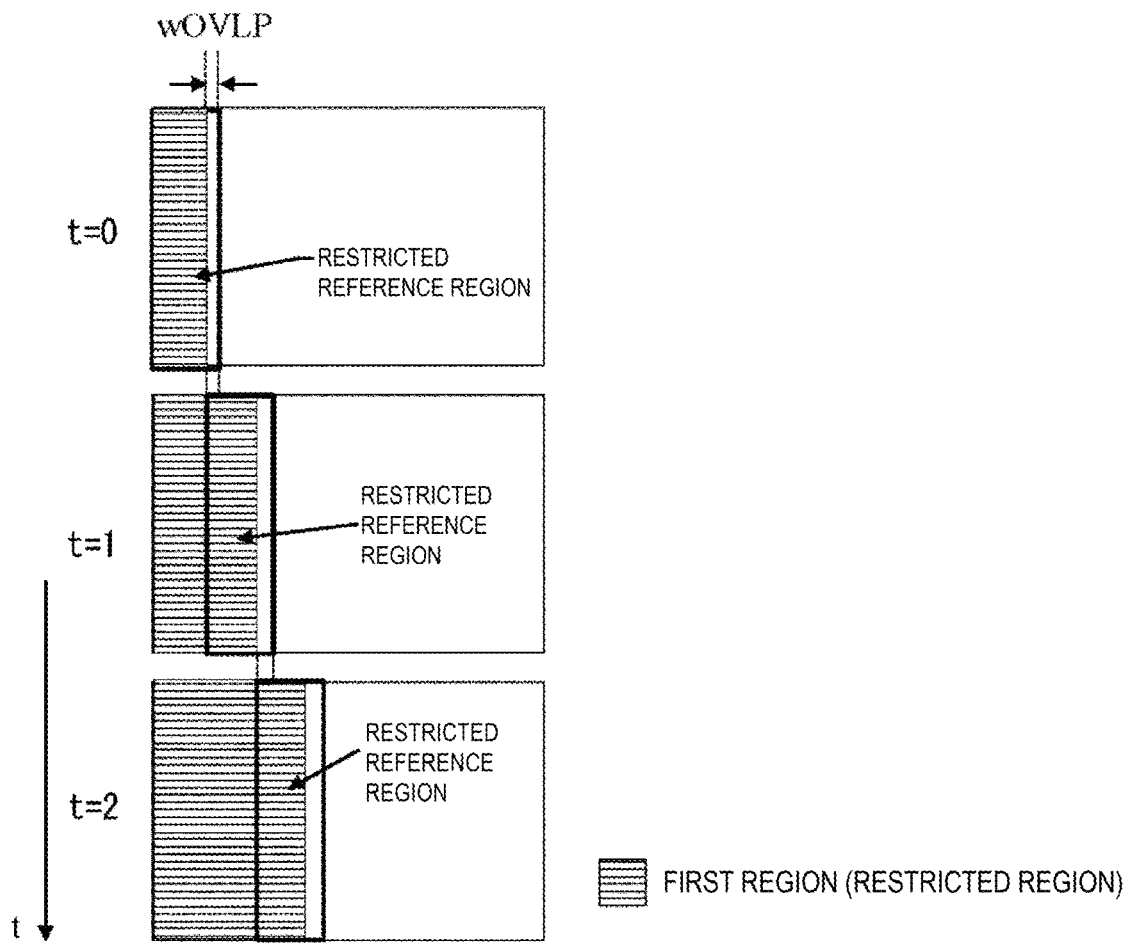
FIG. 16 is a diagram illustrating a relationship between the restricted region and an overlap region.

As illustrated in FIG. 16, the new refreshed region (FRA) to be added to the restricted region in the target picture at the time t may overlap the FRA of the picture at time t−1. FIG. 16, the width wOVLP is an overlapping region. In this case, the end point of the restricted reference region in a case that the picture at the time t is referred to as the reference picture may be derived by subtracting an amount corresponding to the overlap region as follows. The restricted region from which the overlap region is subtracted may be hereinafter referred to as a filter restricted region (or a filtered restricted region, an overlap restricted region, a restricted region for reference). The derivation expression in a case that seq_refresh_mode is 1 (horizontal rectangular shape restricted region) is as follows.

$$(xRA\_en[t], yRA\_en[t]) = (wPict, (hIR-hOVLP)*(t+1)-1)$$

The derivation expression in a case that seq_refresh_mode is 0 (vertical rectangular shape restricted region) is as follows.

$$(xRA\_en[t], yRA\_en[t]) = ((wIR-wOVLP)*(t+1)-1, hPict)$$

The derivation expression in a case that the filter restricted region is 0 (vertical rectangular shape restricted region) and in a case that the new refreshed region (for example, the intra refreshed region) is shifted from the left to the right (seq_refresh_mode=0 and seq_refresh_direction=0) is as follows.

$$(xRA\_st[t], yRA\_st[t]) = (0,0)$$

$$(xRA\_en[t], yRA\_en[t]) = ((wIR-wOVLP)*(t+1)-1, hPict-1)$$

The derivation expression of the filter restricted region in a case that the new refreshed region is shifted from the right to the left (seq_refresh_mode=0 and seq_refresh_direction=1) is as follows.

$$(xRA\_st[t], yRA\_st[t]) = (wPict-(wIR-wOVLP)*(t+1)-1, 0)$$

$$(xRA\_en[t], yRA\_en[t]) = (wPict-1, hPict-1)$$

The derivation expression of the filter restricted region in a case that the new refreshed region (for example, the intra refreshed region) is shifted from the upper side to the bottom side (seq_refresh_mode=1 and seq_refresh_direction=0) is as follows.

$$(xRA\_st[t], yRA\_st[t]) = (0,0)$$

$$(xRA\_en[t], yRA\_en[t]) = (w\text{Pict}-1, (hIR-h\text{OVLP})*(t+1)-1)$$

The derivation expression of the filter restricted region in a case of a case that the new refreshed region is shifted from the bottom side to the upper side (seq_refresh_mode=1 and seq_refresh_direction=1) is as follows.

$$(xRA\_st[t], yRA\_st[t]) = (w\text{Pict}-1, h\text{Pict}-(hIR-h\text{OVLP})*(t+1)-1)$$

$$(xRA\_en[t], yRA\_en[t]) = (w\text{Pict}-1, h\text{Pict}-1)$$

In this manner, with the video decoding apparatus decoding syntax related to sequential refresh in the SPS or the PPS, the video decoding apparatus can acquire information of sequential refresh. Therefore, in decoding of the video at the time of random access, the video decoding apparatus can appropriately decode the coded data by using sequential refresh.

The loop filter 305 is a filter provided in a coding loop, and is a filter that removes a block distortion and a ringing distortion and improves image quality. The loop filter 305 applies filters such as a deblocking filter 3051, a sample adaptive offset (SAO), and an adaptive loop filter (ALF) to the decoded image of the CU generated by the addition unit 312.

Deblocking Filter 3051

In a case that a difference of pixel values of neighboring pixels across the block (CTU/CU/TU) boundary is within a predetermined range, the deblocking filter 3051 determines that there is a block distortion. Then, the deblocking filter 3051 applies a deblocking process to the block boundary in the decoded image before the deblocking filter, and thereby smooths the image around the block boundary.

First, the deblocking filter 3051 performs on/off determination of the filter for each block. For example, in a case that (Expression DB-1) is satisfied, the deblocking filter 3051 applies the filter to the target block.

$$\text{abs}(P20-2*P10+P00)+\text{abs}(P23-2*P13+P03)+\text{abs}(Q20-2*Q10+Q00)+\text{abs}(Q23-2*Q13+Q03)<\beta \quad \text{(Expression DB-1)}$$

Figure 33:
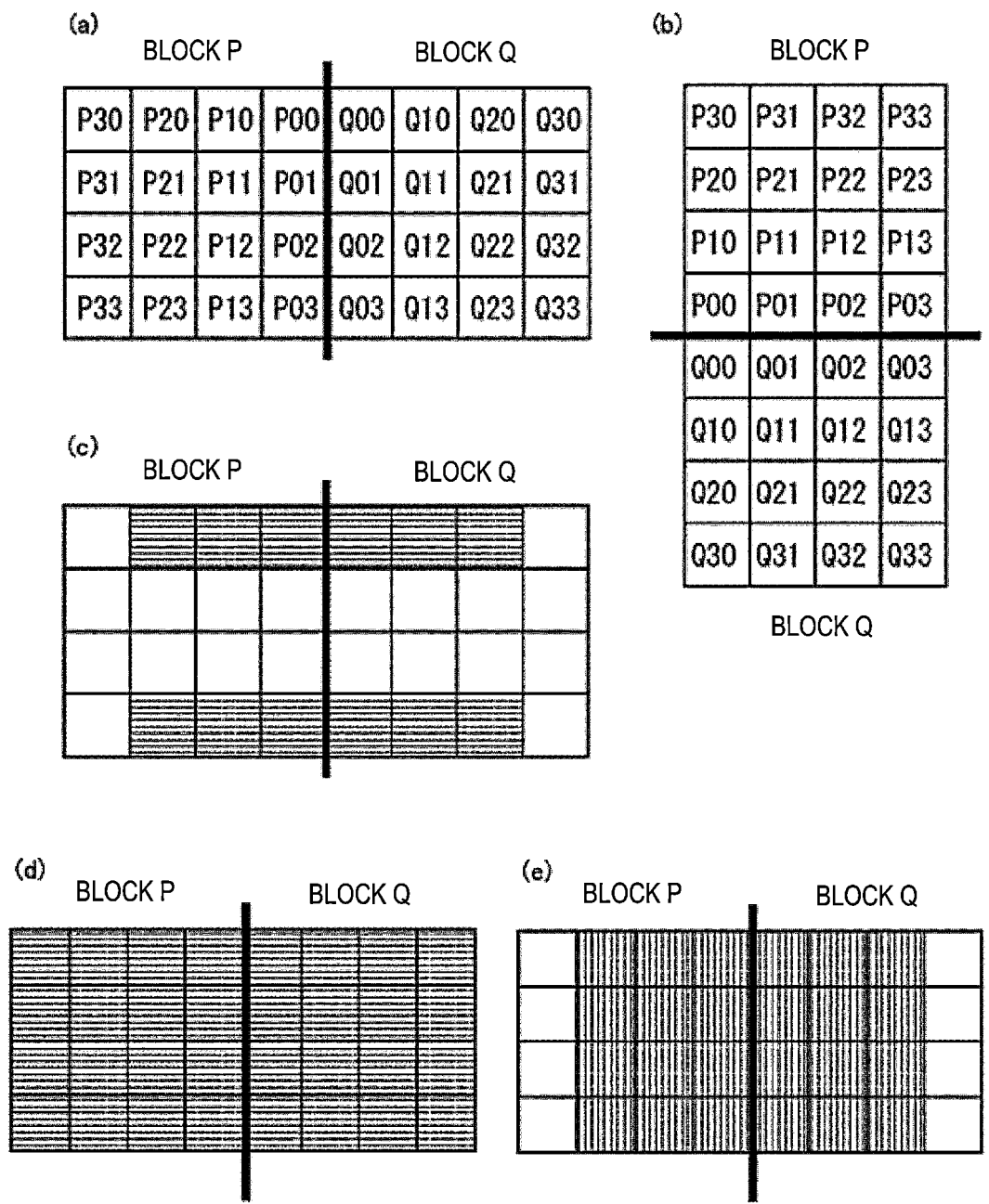
FIG. 33 is a diagram illustrating deblocking filters.

Here, as illustrated in FIG. 33(a) or FIG. 33(b), each of P2k, P1k, P0k, Q0k, Q1k, and Q2k (k=0, 3) is a column or a row of pixels whose distance from the block boundary is 2, 1, 0, 0, 1, and 2, respectively. FIG. 33(a) is an example in which a block P and a block Q are adjacent to each other in the vertical direction, and FIG. 33(b) is an example in which the block P and the block Q are adjacent to each other in the horizontal direction. P2k, P1k, and P0k are pixels included in the block P out of the block P and the block Q adjacent to each other across the boundary, and Q0k, Q1k, and Q2k are pixels included in the block Q. k represents a number of the pixel in the block boundary direction. β represents a prescribed threshold.

In a case that (Expression DB-1) is satisfied, the deblocking filter 3051 derives strength of the filter by using (Expression DB-2) with respect to the boundary between the block P and the block Q. In a case that the whole (Expression DB-2) is satisfied, the deblocking filter 3051 configures the filter strength to "high", whereas in a case that the whole (Expression DB-2) is not satisfied, the deblocking filter 3051 configures the filter strength to "low".

$$2*(\text{abs}(P20-2*P10+P00)+\text{abs}(Q20-2*Q10+Q00))<(\beta>>2)$$

$$2*(\text{abs}(P23-2*P13+P03)+\text{abs}(Q23-2*Q13+Q03))<(\beta>>2)$$

$$\text{abs}(P30-P00)+\text{abs}(Q00-Q30))<(\beta>>3)$$

$$\text{abs}(P33-P03)+\text{abs}(Q03-Q33))<(\gamma)$$

$$\text{abs}(P00-P00)+\text{abs}(Q00-Q30))<(\gamma) \quad \text{(Expression DB-2)}$$

Here, γ is a threshold depending on a quantization parameter.

In addition, in a case that the filter strength is "high", the filter processing is performed by using (Expression DB-3).

$$P2k' = \text{Clip3}(P2k-\delta, P2k+\delta, (2*P3k+3*P2k+P1k+P0k+Q0k+4)>>3)$$

$$P1k' = \text{CliP3}(P1k-\delta, P1k+\delta, (P2k+P1k+P0k+Q0k+2)>>2)$$

$$P0k' = \text{CliP3}(P0k-\delta, P0k+\delta, (P2k+2*P1k+2*P0k+2*Q0k+Q1k+4)>>3)$$

$$Q0k' = \text{CliP3}(Q0k-\delta, Q0k+\delta, (P1k+2*P0k+2*Q0k+2*Q1k+Q2k+4)>>3)$$

$$Q1k' = \text{CliP3}(Q1k-\delta, Q1k+\delta, (P0k+Q0k+Q1k+Q2k+2)>>2)$$

$$Q2k' = \text{CliP3}(Q2k-\delta, Q2k+\delta, (P0k+Q0k+Q1k+3*Q2k+2*Q3k+4)>>3) \quad \text{(Expression DB-3)}$$

Here, each of P3k, P2k, P1k, P0k, Q0k, Q1k, Q2k, and Q3k is a column or a row of pixels whose distance from the block boundary is 3, 2, 1, 0, 0, 1, 2, and 3, respectively. δ is a variable for restraining filter processing.

In the above example, the deblocking filter 3051 refers to each of three pixels from the boundary indicated by the horizontal lines in FIG. 33(c) in order to determine on/off of the filter and strength of the filter in two blocks that are adjacent to each other across the boundary. In order to perform the deblocking filter, the deblocking filter 3051 refers to each of four pixels from the boundary indicated by the horizontal lines in FIG. 33(d), and corrects a value of each of three pixels from the boundary indicated by vertical lines in FIG. 33(e). In other words, for the filter processing, pixels of neighboring different blocks are necessary.

Figure 34:
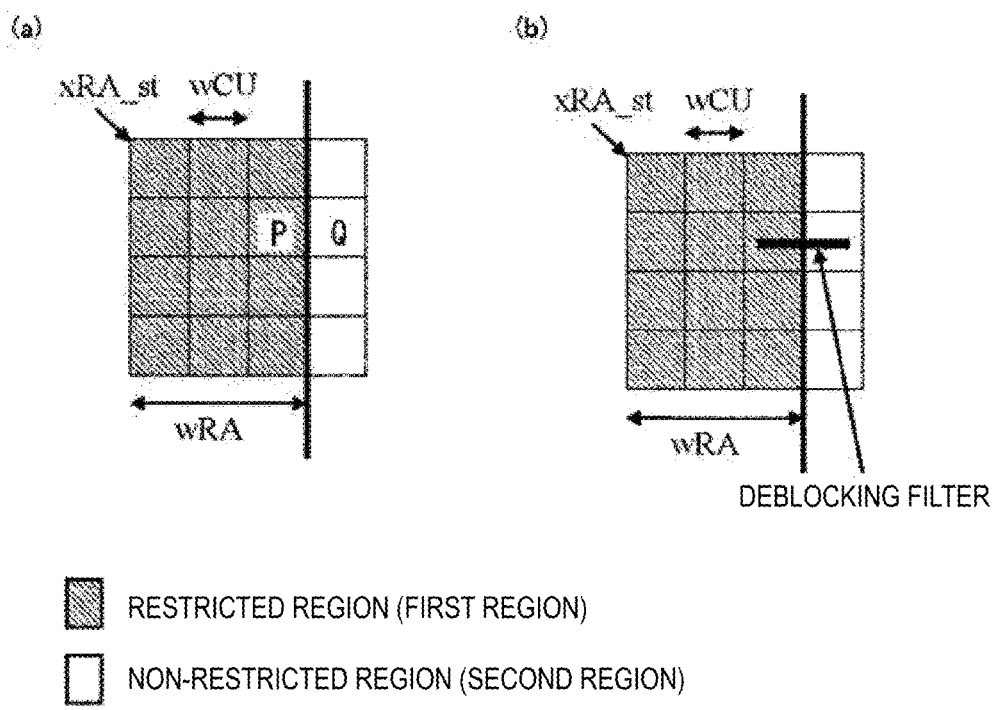
FIG. 34 is a diagram illustrating relationships between the restricted region and the deblocking filter.

However, as illustrated in FIG. 34(a), in a case that the block P is included in the restricted region and the block Q is not included in the restricted region, the region of the block P to which the filter is applied with reference to the block Q refers to an undefined pixel value (non-restricted region) at the time of random access, and thus cannot be correctly decoded.

In the present application, with the use of the following method, a method in which coded data capable of random access is generated and can be correctly decoded is provided.

Deblocking Filter Restriction of Restricted Region

Figure 35:
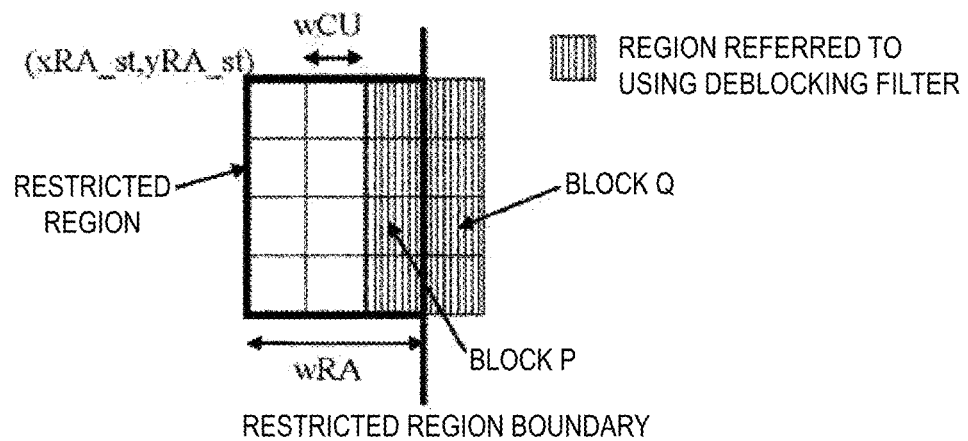
FIG. 35 is a diagram illustrating a relationship between the restricted region and a deblocking filter region.

FIG. 35 is a diagram illustrating a relationship between the restricted region and the deblocking filter.

The deblocking filter 3051 according to the present example turns off the filter in the blocks that are adjacent to each other across the boundary between the restricted region and the non-restricted region in a case that seq_refresh_enable_flag is 1.

The deblocking filter 3051 determines whether or not the block P and the block Q that are present across the boundary of the blocks (CU boundary, PU boundary, TU boundary) are present across a restricted region boundary.

For example, in a case that the upper left coordinates of the restricted region are represented by (xRA_st, yRA_st), the width of the restricted region by wRA, and the width of the CU of the block P by wCU, x coordinates xCUP and xCUQ of the block P and the block Q that are adjacent to each other across the restricted region boundary can be expressed as in (Expression DB-4).

$$xCUP = xRA\_st + wRA - wCU$$

$$xCUQ = xRA\_st + wRA \quad \text{(Expression DB-4)}$$

The deblocking filter 3051 may be hereinafter the following determination expression by using the coordinates (xP, yP) of the pixel of the block P and the coordinates (xQ, yQ) of the pixel of the block Q.

$$(IsRA(xP,yP) \,\&\&\, !IsRA(xQ,yQ)) \,||\, (!IsRA(xP,yP) \,\&\&\, IsRA(xQ,yQ))$$

In a case that a shift method of the new refreshed region is fixed, for example, in a case that seq_refresh_direction=0, the following determination expression may be used.

$$(IsRA(xP,yP) \,\&\&\, !IsRA(xQ,yQ))$$

For example, in a case that seq_refresh_direction=1, the following determination expression may be used.

$$(!IsRA(xP,yP) \,\&\&\, IsRA(xQ,yQ))$$

For example, in a case that the upper left coordinates of the new refreshed region are represented by (xIR, yIR), the width of the new refreshed region by wIR, and the width of the CU of the block P by wCU, x coordinates xCUP and xCUQ of the block P and the block Q that are adjacent to each other across the restricted region boundary can be expressed as in (Expression DB-4).

$$xCUP = xIR + wIR - wCU$$

$$xCUQ = xIR + wIR \quad \text{(Expression DB-4)}$$

In this case, the deblocking filter 3051 may turn off the filter for the block P and the block Q whose x coordinate at the upper left of the block satisfies (Expression DB-4).

FIG. 36(*a*) is a flowchart illustrating a flow of the filter processing of the deblocking filter 3051 according to the present embodiment.

S2202: Based on the upper left coordinates of the block P and the block Q being a target, the deblocking filter 3051 checks whether or not these blocks are adjacent to each other across the restricted region boundary.

Specifically, in a case that (IsRA (xP, yP) && !IsRA (xQ, yQ)) II (!IsRA (xP, yP) && IsRA (xQ, yQ)) is true, the deblocking filter 3051 may determine that the blocks are adjacent to each other across the restricted region boundary. In a case that (IsRA (xP, yP) && IsRA (xQ, yQ)) II (!IsRA (xP, yP) && !IsRA (xQ, yQ)) is true, the deblocking filter 3051 may determine that the blocks are not adjacent to each other across the restricted region boundary. The determination may be performed for the filter restricted region being a restricted region obtained by subtracting the overlap region.

S2204: In a case that the block P and the block Q are adjacent to each other across the restricted region boundary (Y in S2202), the deblocking filter 3051 configures the filter to be turned off in both of the two blocks.

S2206: In a case that the block P and the block Q are not adjacent to each other across the restricted region boundary (N in S2202), the deblocking filter 3051 configures the filter to be turned on in both of the two blocks. Specifically, the deblocking filter 3051 turns on the filter in a case that both of the block P and the block Q are present in the restricted region (IsRA (xP, yP) && IsRA (xQ, yQ)) or both of the block P and the block Q are present in the non-restricted region (!IsRA (xP, yP) && !IsRA (xQ, yQ)). The deblocking filter 3051 may turn on the filter in a case that both of the block P and the block Q are present in the restricted region IsRA (xP, yP) && IsRA (xQ, yQ) or the restricted region is turned off (seq_refresh_enable_flag=0).

Such processing is performed prior to the determination of (Expression DB-1). In a case that the filter is configured to be turned off in S2204, the deblocking filter 3051 proceeds to processing of the subsequent block without performing the processing after (Expression DB-1). In a case that the filter is configured to be turned on in S2206, the deblocking filter 3051 performs regular processing after (Expression DB-1). In a case that (Expression DB-1) is not satisfied in this case, the deblocking filter 3051 turns off the filter.

In this manner, the deblocking filter 3051 can derive the pixel value in the restricted region without using the pixel value of the non-restricted region by turning off the deblocking filter at the boundary of the restricted region. Thus, by turning off the deblocking filter only at the restricted region boundary, normal decoding can be implemented in random access, while low delay can be implemented.

Other Configuration Example

As another example, the deblocking filter 3051 turns off the filter only in the block P in the restricted region out of the blocks that are adjacent to each other across the boundary between the restricted region and the non-restricted region. In other words, in a case that the x coordinate at the upper left of the block P satisfies xCUP of (Expression DF-4), the deblocking filter 3051 turns off the filter.

FIG. 36(*b*) is a flowchart illustrating a flow of the filter processing according to the present embodiment.

S2202 and S2206 are processing the same as those of FIG. 36(*a*), and thus description thereof will be omitted.

S2205: In a case that the block P and the block Q are adjacent to each other across the restricted region boundary (Y in S2202), the deblocking filter 3051 configures the filter to be turned off in the block P.

In this case, the deblocking filter 3051 performs on/off determination of the filter according to (Expression DB-1) in the block Q, and in a case that the determination is "on", the deblocking filter 3051 derives strength of the filter by using (Expression DB-1), and applies the filter to only the pixels Q0k, Q1k, and Q2k of the block Q by using (Expression DB-3).

On the other hand, in a case that the new refreshed region is shifted in the vertical direction as in FIG. 13(*c*) (seq_refresh_mode=1 and seq_refresh_direction=0), in a case that the upper left coordinates of the restricted region are represented by (xIR, yIR), the height of the restricted region by hIR, and the height of the CU by hCU, expression can be achieved as in (Expression DB-5), using y coordinates yCUP and yCUQ of the block P and the block Q that are adjacent to each other across the restricted region boundary.

$$yCUP = yIR + hIR - hCU$$

$$yCUQ = yIR + hIR \quad \text{(Expression DB-5)}$$

In this manner, the deblocking filter 3051 turns off the deblocking filter only in the block in the restricted region that is necessary for implementing the random access function at the boundary of the restricted region, and turns on the deblocking filter in the block that is not necessary for the random access function. With this configuration, the pixel value of the region to be referred to as the restricted region in the subsequent coding and decoding processing can be derived without using the pixel value of the non-restricted region. Thus, by turning off the deblocking filter only at the restricted region boundary, normal decoding can be implemented in random access, while low delay can be implemented.

With the configuration described above, the deblocking filter 3051 forcibly turns off the filter in the filter processing between the restricted region (refreshed region, first region) and the non-restricted region (unrefreshed region, second region).

With the configuration described above, the deblocking filter 3051 forcibly turns off only the filter processing on the restricted region side in the filter processing between the restricted region and the non-restricted region.

Overlap of Refreshed Region

The present example will describe a method of coding and decoding the block P as the restricted region again in the following coding picture without the deblocking filter 3051 changing the deblocking filter processing.

As described in the above, in the deblocking filter 3051, in normal deblocking filter processing, the block P refers to information of the block Q in filter on/off derivation, filter strength derivation, and filtering. For example, as illustrated in FIG. 35, in the filter processing, both of the blocks present across the restricted region boundary refer to each other and correct the pixel value. Thus, in a case that the block P cannot acquire information of the block Q, decoding processing cannot be performed correctly.

In the deblocking filter 3051, in a case that the filter processing is performed on the pixel in the restricted region (block P side) by using the pixel of the non-restricted region (block Q side), the pixel on the block P side is not restricted in the restricted region. Thus, in the subsequent picture, such needs to be eliminated from the restricted region. In view of this, as illustrated in FIG. 16, the column of blocks P (region indicated by the width wOVLP) of the restricted region (for example, t=k) of the target picture is not used as the restricted reference region even in a case that the picture of t=k is referred to in the subsequent picture. Note that the region eliminated from the restricted reference region may also be coded as the restricted region again in the picture to be coded next time-wise.

In other words, the video coding apparatus configures the restricted region to overlap by the width wOVLP of the block P at each time, configures the block P coded in the second place as the restricted region, and refers to the restricted region in the subsequent coding processing. Then, at time t=k+1, the deblocking filter 3051 of the video decoding apparatus applies the filter to the block P to be decoded as the restricted region in the second place by referring to the block in the restricted region adjacent on the left side and the block in the same restricted region adjacent on the right side. Thus, the block P can be coded and decoded by using only the coded data after the random access point.

The deblocking filter is processed for each block, and the width wOVLP of the overlap may be the width wCU of the CU, but the pixel corrected through the filtering is a part of the block. Thus, as expressed in (Expression DB-6), the width wOVLP of the overlap region may be derived based on the number numDFPEL of pixels to be corrected through the filtering and the minimum value minC of the width of the CU.

$$wOVLP=\text{ceil}(numDFPEL/minCU)*minCU \quad \text{(Expression DB-6)}$$

For example, in a case that numDFPEL=3 and minCU is 4, wOVLP is set to 4. Note that wIR>wOVLP. At time t=k, in a case that the upper left coordinates of the restricted region are represented by (xRA_st[k], yRA_st[k]) and the width of the restricted region by wRA, the upper left coordinates (xRA_st[k+1], yRA_st[k+1]) of the restricted reference region at the time t=k+1 may be derived based on (Expression DB-7).

$$xRA\_st[k+1]=xRA\_st[k]+wRA-wOVLP$$

$$yRA\_st[k+1]=yRA\_st[k] \quad \text{(Expression DB-7)}$$

On the other hand, in a case that the new refreshed region (for example, the intra refreshed region) is shifted in the vertical direction as in FIG. 13(c), the height hOVLP of the overlap region and the upper left coordinates (xRA_st[k+1], yRA_st[k+1]) of the restricted reference region at the time t=k+1 can be expressed as in (Expression DB-8).

$$hOVLP=\text{ceil}(numDFPEL/minCU)*minCU$$

$$xRA\_st[k+1]=xRA\_st[k]$$

$$yRA\_st[k+1]=yRA\_st[k]+hRA-hOVLP \quad \text{(Expression DB-8)}$$

Note that hRA>hOVLP.

Note that, as described in Deblocking Filter Off, in a case that the deblocking filter of the block P is turned off, wOVLP and hOVLP are configured to be 0, and overlap is not performed.

The operation of the configuration described above can be summarized as below.

The sequential refresh information is decoded, and whether or not the target block is present in the restricted region is determined. In a case that sequential refresh is turned on (seq_refresh_enable_flag=1) and the target block is present in the restricted region (IsRA (xPb, yPb) is true), as has been described in the above, the prediction parameter of the intra prediction and the inter prediction is derived by using only the prediction parameter of the restricted region. In addition, the intra prediction is performed by using only the pixel of the restricted region, and the inter prediction is performed by using only the pixel of the restricted reference region of the reference image.

In the loop filter, in a case that sequential refresh is turned on (seq_refresh_enable_flag=1) and the target block is present in the restricted region (IsRA (xPb, yPb) is true), the deblocking filter is also applied to the restricted region. With this configuration, a region of the restricted region corresponding to the restricted region boundary (overlap region) is excluded from the basic operation of the restricted region, and thus the region is eliminated from the reference restricted region to be referred next. Note that, in the loop filter as well, the range obtained by eliminating the region of the restricted region corresponding to the overlap region may be used as the restricted reference region or may be subjected to the filter processing.

In this manner, the video coding apparatus codes a part of all of the blocks adjacent to the restricted region boundary as the restricted region at time t=k and time t=k+1. Further, the video decoding apparatus refers to the pixel value of the block decoded at t=k+1 as the restricted region in the subsequent picture. Thus, normal decoding can be implemented in random access, while low delay can be implemented.

With the configuration described above, the CU having the minimum CU size or the CU size including the number of pixels necessary for the filter (or the size specified by the syntax) is coded with a method the same as in the restricted region on the non-restricted region (unrefreshed region) side of the restricted region (refreshed region) or the restricted region side.

First Modification

In recent years, from the point of view of image quality enhancement, the deblocking filter with a long number of taps is used for the block having a large size. For example, in a case of the block having a size of 32×32 or larger, seven pixels from the block boundary are corrected using the filter. In other words, numDFPEL=7. However, the corrected pixels need to be coded with the intra prediction again (as the restricted region) in the subsequent picture. The coding efficiency is further deteriorated as there is more overlap region. In the present modification, by shortening the deblocking filter of the block adjacent to the restricted region boundary, the overlapping restricted region is reduced, and the deterioration of the coding efficiency is thereby reduced.

For example, in a case that the minimum value of the CU minCU is 4 and the number of pixels to be corrected using the deblocking filter numDFPEL_L is 7 (referred to as a long filter), the overlap width wOVLP is 8, based on (Expression DF-6). In contrast, in a case that the number of pixels to be corrected using the deblocking filter numDFPEL_S is short such as 3 (referred to as a short filter), the overlap width wOVLP is 4.

The deblocking filter 3051 according to the first modification switches types of the filter (long filter, short filter) depending on whether or not the block is a block adjacent to the restricted region boundary. Whether or not the block is a block adjacent to the restricted region boundary is determined using (Expression DF-9). The upper left coordinates of the restricted region are represented by (xRA_st[k], yRA_st[k]), the width of the restricted region by wRA, the upper left coordinates of the block by (xPb, yPb), and the width of the block by wPb.

if (xPb==xRA_st[k]+wRA−wPb)  (Expression DF-9)

In a case that (Expression DF-9) is true, the block is adjacent to the restricted region boundary, and thus the deblocking filter 3051 uses the short filter, or otherwise uses the long filter.

On the other hand, in a case that the new refreshed region is shifted in the vertical direction as in FIG. 13(c), whether or not the block is a block adjacent to the restricted region boundary is determined according to (Expression DF-10).

if (yPb==yRA_st[k]+hRA−hPb)  (Expression DF-10)

Note that the number of pixels corrected with the filter in the block Q bears no relation to the overlap width, and thus the processing of switching the deblocking filters need not be performed in the block Q.

In this manner, in the block adjacent to the restricted region boundary, by applying the short filter to the deblocking filter processing, the overlap width can be reduced and deterioration of the coding efficiency can be reduced. In this case, it is desirable that the number of taps of the short filter be equal to or less than the minimum size of the CU.

Configuration of Inter Prediction Parameter Decoder

The inter prediction parameter decoder 303 decodes an inter prediction parameter with reference to a prediction parameter stored in the prediction parameter memory 307, based on a code input from the entropy decoder 301. The inter prediction parameter decoder 303 outputs a decoded inter prediction parameter to the prediction image generation unit 308, and stores the decoded inter prediction parameter in the prediction parameter memory 307.

Figure 19:
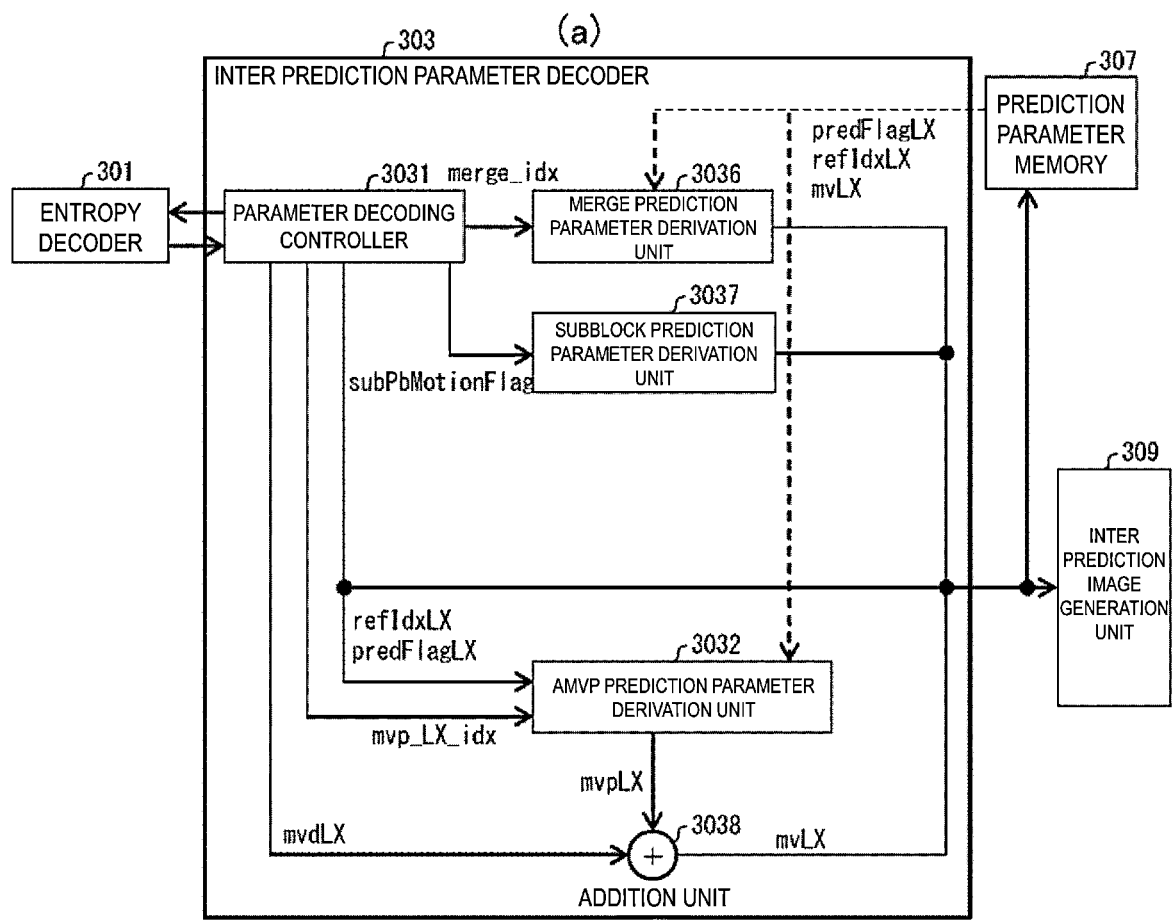
FIG. 19 is a schematic diagram illustrating a configuration of an inter prediction parameter decoder.

FIG. 19(a) is a schematic diagram illustrating a configuration of the inter prediction parameter decoder 303 according to the present embodiment. The inter prediction parameter decoder 303 includes a parameter decoding controller 3031, an AMVP prediction parameter derivation unit 3032, an addition unit 3038, a merge prediction parameter derivation unit 3036, and a subblock prediction parameter derivation unit 3037. The AMVP prediction parameter derivation unit 3032, the merge prediction parameter derivation unit 3036, and the subblock prediction parameter derivation unit 3037 may be collectively referred to as a motion vector derivation unit (motion vector derivation apparatus).

The parameter decoding controller 3031 instructs the entropy decoder 301 to decode the syntax element related to the inter prediction, and extracts the syntax element included in the coded data, for example, the merge flag merge_flag, the merge index merge_idx, the inter prediction indicator inter_pred_idc, the reference picture index refIdxLX, the prediction vector index mvp_LX_idx, and the difference vector mvdLX.

The parameter decoding controller 3031 first extracts the merge flag merge_flag. The expression that the parameter decoding controller 3031 extracts a certain syntax element indicates that the parameter decoding controller 3031 instructs the entropy decoder 301 to decode the certain syntax element and reads the syntax element from the coded data.

In a case that the merge flag merge_flag is 0, specifically, the AMVP prediction mode is indicated, the parameter decoding controller 3031 extracts the AMVP prediction parameter from the coded data by using the entropy decoder 301. Examples of the AMVP prediction parameter include the inter prediction indicator inter_pred_idc, the reference picture index refIdxLX, the prediction vector index mvp_LX_idx, and the difference vector mvdLX. The AMVP prediction parameter derivation unit 3032 derives the prediction vector mvpLX from the prediction vector index mvp_LX_idx. The parameter decoding controller 3031 outputs the difference vector mvdLX to the addition unit 3038. The addition unit 3038 adds the prediction vector mvpLX and the difference vector mvdLX, and derives the motion vector.

In a case that the merge flag merge_flag is 1, specifically, the merge prediction mode is indicated, the parameter decoding controller 3031 extracts the merge index merge_idx as the prediction parameter related to the merge prediction. The parameter decoding controller 3031 outputs the extracted merge index merge_idx to the merge prediction parameter derivation unit 3036.

FIG. 20(a) is a schematic diagram illustrating a configuration of the merge prediction parameter derivation unit 3036 according to the present embodiment. The merge prediction parameter derivation unit 3036 includes a merge candidate derivation unit 30361, a merge candidate selection unit 30362, and a merge candidate storage unit 30363. The merge candidate storage unit 30363 stores merge candidates input from the merge candidate derivation unit 30361. Note that the merge candidates include the prediction list utilization flag predFlagLX, the motion vector mvLX, and the reference picture index refIdxLX. The merge candidates stored in the merge candidate storage unit 30363 are assigned indexes according to a prescribed rule.

The merge candidate derivation unit 30361 derives the merge candidates by directly using the motion vector of the decoded neighboring block and the reference picture index refIdxLX. In addition to the above, the merge candidate derivation unit 30361 may apply affine prediction to spatial merge candidate derivation processing, time merge candidate derivation processing, merging merge candidate derivation processing, and zero merge candidate derivation processing, which will be described later.

Spatial Merge Candidate Derivation Processing

As the spatial merge candidate derivation processing, the merge candidate derivation unit 30361 reads the prediction parameter (the prediction list utilization flag predFlagLX, the motion vector mvLX, the reference picture index refIdxLX) stored in the prediction parameter memory 307, and configures for the merge candidates, according to a prescribed rule. A specification method of the reference picture is, for example, a prediction parameter related to each of the neighboring blocks present within a predetermined range from the target block (for example, blocks adjacent to each of a left end L, a bottom left edge BL, an upper left edge AL, an upper edge A, and an upper right edge AR of the target block). Respective merge candidates are referred to as L, BL, AL, A, and AR.

In a case that the target block is the restricted region (IsRA (xPb, yPb) is true) and the reference position (xNbX, yNbX) of the neighboring block of the target block is the non-restricted region (IsRA (xNbX, yNbX) is false), the merge candidate derivation unit 30361 does not use the value of the neighboring block for derivation of the merge candidates. Specifically, in a case that the target block is the restricted region (IsRA (xPb, yPb) is true) and the reference position (xNbX, yNbX) of the neighboring block of the target block is the restricted region (IsRA (xNbX, yNbX) is true), the merge candidate derivation unit 30361 uses the position (xNbX, yNbX) for derivation of the merge candidates in a case of the inter prediction.

For example, in a case that the new refreshed region is shifted from the left to the right as in FIG. 13(*a*) (seq_refresh_mode=0 and seq_refresh_direction=0), the target block is the restricted region (IsRA (xPb, yPb) is true), and a right neighboring position B0 (xPb+wPb, yPb−1) of the target block is the restricted region (IsRA (xPb+wPb, yPb−1) is true), the merge candidate derivation unit 30361 considers that B0 is available (availableB0=1) and uses the value of a right neighboring block for derivation of the merge candidates.

For example, in a case that the new refreshed region is shifted from the right to the left as in FIG. 13(*b*) (seq_refresh_mode=0 and seq_refresh_direction=1), the target block is the restricted region (IsRA (xPb, yPb) is true), left neighboring positions A0 (xPb−1, yPb+hPb), A1 (xPb−1, yPb+hPb−1), and B2 (xPb−1, yPb−1) of the target block are the restricted region, the merge candidate derivation unit 30361 merge candidate derivation unit 30361 uses the values of the left neighboring positions A0, A1, and B2 for derivation of the merge candidates.

Time Merge Candidate Derivation Processing

As the time merge derivation processing, the merge candidate derivation unit 30361 reads the prediction parameter of the bottom right CBR of the target block or the block C in the reference image including center coordinates from the prediction parameter memory 307 and uses the prediction parameter as the merge candidates, and stores the merge candidates in the merge candidate list mergeCandList[ ]. In general, the block CBR is preferentially added to the merge candidate list mergeCandList[ ], and in a case that the block CBR does not include the motion vector (for example, an intra prediction block) or the block CBR is located outside of the picture, the motion vector of the block C is added to the prediction vector candidates. A specification method of the reference image may be, for example, the reference picture index refIdxLX specified in the slice header, or specification may be performed by using a minimum index out of the reference picture indexes refIdxLX of the neighboring block.

For example, the merge candidate derivation unit 30361 may derive a position (xColCtr, yColCtr) of the block C and a position (xColCBr, yColCBr) of the block CBR by using (Expression MRG-1).

$xColCtr=xPb+(wPb>>1)$ $yColCtr=yPb+(hPb>>1)$ $xColCBr=xPb+wPb$ $yColCBr=yPb+hPb$ (Expression MRG-1)

Here, (xPb, yPb) represents the upper left coordinates of the target block, and (wPb, hPb) represents the width and the height of the target block. In a case that the block CBR is available, a merge candidate COL is derived by using the motion vector of the block CBR. In a case that the block CBR is not available, COL is derived by using the block C.

The merge candidates derived by the merge candidate derivation unit 30361 are stored in the merge candidate storage unit 30363. The order of storage in the merge candidate list mergeCandList[ ] is, for example, the spatial merge candidates and the time merge candidates, that is, {L, A, AR, BL, A, COL, COMB0, . . . }. Note that an unavailable reference block (block of the intra prediction or the like) is not stored in the merge candidate list.

The merge candidate selection unit 30362 selects, as the inter prediction parameter of the target block, a merge candidate mergeCandList[merge_idx] assigned the merge index merge_idx that is input from the parameter decoding controller 3031 out of the merge candidates included in the merge candidate list stored in the merge candidate storage unit 30363. The merge candidate selection unit 30362 stores the selected merge candidate in the prediction parameter memory 307, and outputs the merge candidate to the prediction image generation unit 308.

FIG. 20(*b*) is a schematic diagram illustrating a configuration of the AMVP prediction parameter derivation unit 3032 according to the present embodiment. The AMVP prediction parameter derivation unit 3032 includes a vector candidate derivation unit 3033, a vector candidate selection unit 3034, and a vector candidate storage unit 3035. The vector candidate derivation unit 3033 derives the prediction vector candidates from the motion vector mvLX of the decoded neighboring block stored in the prediction parameter memory 307 according to a prescribed rule, and stores in a prediction vector candidate list mvpListLX[ ] of the vector candidate storage unit 3035.

The vector candidate selection unit 3034 selects, as the prediction vector mvpLX, a motion vector mvpListLX [mvp_LX_idx] indicated by the prediction vector index mvp_LX_idx out of the prediction vector candidates of the prediction vector candidate list mvpListLX[ ]. The vector candidate selection unit 3034 outputs the selected prediction vector mvpLX to the addition unit 3038.

Note that the prediction vector candidates may be derived by scaling the motion vector of the decoded neighboring block in a predetermined range from the target block with a method to be described later. The neighboring block includes blocks spatially adjacent to the target block, for example, a left block and an upper block, as well as a region temporally adjacent to the target block, for example, the same position as the target block, and includes a region obtained from the prediction parameter of the block with different display time.

The addition unit 3038 adds the prediction vector mvpLX input from the AMVP prediction parameter derivation unit 3032 and the difference vector mvdLX input from the parameter decoding controller 3031, and calculates the motion vector mvLX. The addition unit 3038 outputs the calculated motion vector mvLX to the prediction image generation unit 308 and the prediction parameter memory 307.

$$mvLX[0]=mvpLX[0]+mvdLX[0]$$

$$mvLX[1]=mvpLX[1]+mvdLX[1]$$

Motion Vector Scaling

A derivation method of scaling of the motion vector will be described. sMv may be derived by using a derivation function MvScale(Mv, PicMv, PicMvRef, CurPic, CurPicRef) expressed by (Expression INTERP-1), where Mv (reference motion vector) represents a motion vector, PicMv represents a picture including a block having Mv, PicMvRef represents a reference picture of Mv, sMv (scaledMV) represents a scaled motion vector, CurPic represents a picture including a block having sMv, and CurPicRef represents a reference picture referred to by sMv.

$$sMv=\text{MvScale}(Mv,\text{PicMv},\text{PicMvRef},\text{CurPic},\text{CurPicRef})$$

$$=\text{Clip3}(-R1,R1-1,\text{sign}(\text{distScaleFactor}*Mv)*((\text{abs}(\text{distScaleFactor}*Mv)+\text{round1}-1)>>\text{shift1}))$$

$$\text{distScaleFactor}=\text{Clip3}(-R2,R2-1,(tb*tx+\text{round2})>>\text{shift2})$$

$$tx=(16384+\text{abs}(td)>>1)/td$$

$$td=\text{DiffPicOrderCnt}(\text{PicMv},\text{PicMvRef})$$

$$tb=\text{DiffPicOrderCnt}(\text{CurPic},\text{CurPicRef}) \quad \text{(Expression INTERP-1)}$$

Here, round1, round2, shift1, shift2 are round values and shift values for performing division by using a reciprocal, and are for example, round1=1<<(shift1−1), round2=1<<(shift2−1), shift1=8, shift2=6, or the like. DiffPicOrderCnt (Pic1, Pic2) is a function that returns a difference of time information (for example, POC) between Pic1 and Pic2. R1 and R2 are to restrict a value range for performing processing with limited accuracy, and for example, R1=32768, R2=4096, or the like.

A scaling function MvScale(Mv, PicMv, PicMvRef, CurPic, CurPicRef) may be the following expression.

$$\text{MvScale}(Mv,\text{PicMv},\text{PicMvRef},\text{CurPic},\text{CurPicRef})=Mv*\text{DiffPicOrderCnt}(\text{CurPic},\text{CurPicRef})/\text{DiffPicOrderCnt}(\text{PicMv},\text{PicMvRef})$$

Specifically, Mv may be scaled according to a ratio between a difference of the time information between CurPic and CurPicRef and a difference of the time information between PicMv and PicMvRef.

Configuration of Intra Prediction Parameter Decoder 304

The intra prediction parameter decoder 304 decodes the intra prediction parameter, for example, an intra prediction mode IntraPredMode with reference to the prediction parameter stored in the prediction parameter memory 307, based on the codes input from the entropy decoder 301. The intra prediction parameter decoder 304 outputs a decoded intra prediction parameter to the prediction image generation unit 308, and also stores the decoded intra prediction parameter in the prediction parameter memory 307. The intra prediction parameter decoder 304 may derive different intra prediction modes depending on luminance and chrominance.

Figure 21:
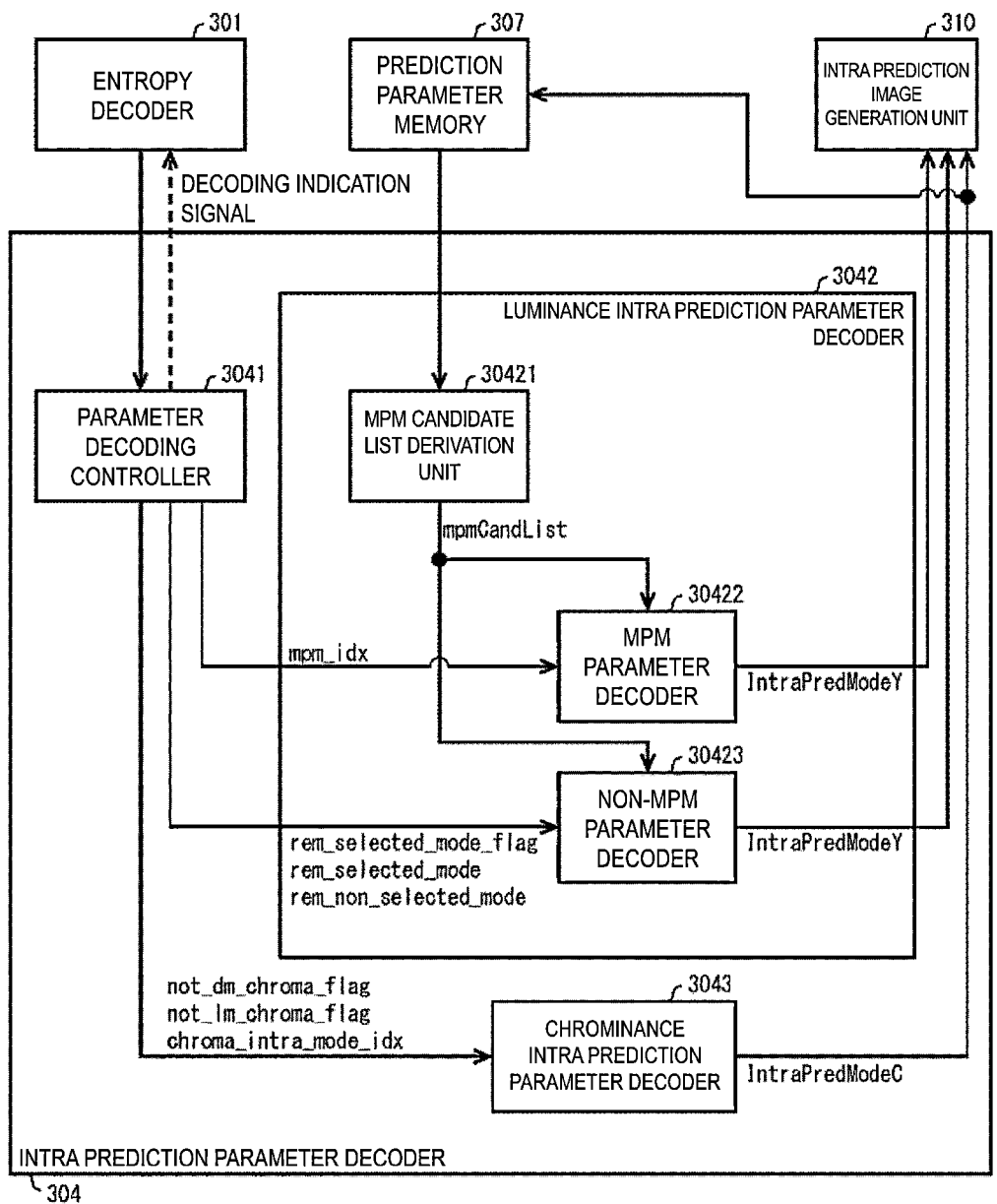
FIG. 21 is a schematic diagram illustrating a configuration of an intra prediction parameter decoder.

FIG. 21 is a schematic diagram illustrating a configuration of the intra prediction parameter decoder 304 of the parameter decoder 302. As illustrated in FIG. 21, the intra prediction parameter decoder 304 includes a parameter decoding controller 3041, a luminance intra prediction parameter decoder 3042, and a chrominance intra prediction parameter decoder 3043.

The parameter decoding controller 3041 instructs the entropy decoder 301 to decode the syntax element, and receives the syntax element from the entropy decoder 301. In a case that prev_intra_luma_pred_flag in the syntax element is 1, the parameter decoding controller 3041 outputs mpm_idx to an MPM parameter decoder 30422 in the luminance intra prediction parameter decoder 3042. In a case that prev_intra_luma_pred_flag is 0, the parameter decoding controller 3041 outputs rem_selected_mode_flag, rem_selected_mode, and rem_non_selected_mode to a non-MPM parameter decoder 30423 of the luminance intra prediction parameter decoder 3042. The parameter decoding controller 3041 outputs the syntax element of the intra prediction parameter of chrominance to the chrominance intra prediction parameter decoder 3043.

The luminance intra prediction parameter decoder 3042 includes the MPM candidate list derivation unit 30421, the MPM parameter decoder 30422, and the non-MPM parameter decoder 30423 (a decoder, a derivation unit).

The MPM parameter decoder 30422 derives the luminance prediction mode IntraPredModeY with reference to the MPM candidate list mpmCandList[ ] derived by the MPM candidate list derivation unit 30421 and mpm_idx, and outputs the luminance prediction mode IntraPredModeY to the intra prediction image generation unit 310.

The non-MPM parameter decoder 30423 derives RemIntraPredMode from the MPM candidate list mpmCandList[ ] and rem_selected_mode_flag, rem_selected_mode, and rem_non_selected_mode, and outputs the luminance prediction mode IntraPredModeY to the intra prediction image generation unit 310.

The chrominance intra prediction parameter decoder 3043 derives the chrominance prediction mode IntraPredModeC from the syntax element of the intra prediction parameter of chrominance, and outputs the chrominance prediction mode IntraPredModeC to the intra prediction image generation unit 310.

In a case that random access is implemented by using refresh, restriction is imposed on a part of the parameters described above. At the boundary between the restricted reference region and the non-restricted reference region, in a reference pixel filter and prediction image generation processing to be described later, the pixel of the non-restricted reference region may be referred to, and restriction is necessary for the reference pixel filter, the prediction mode, prediction pixel generation processing, and the like.

The reference picture memory 306 stores a decoded image of the CU generated by the addition unit 312 at a predetermined position for each target picture and target CU.

The prediction parameter memory 307 stores the prediction parameter at a predetermined position for each CTU or CU as a decoding target. Specifically, the prediction parameter memory 307 stores the parameter decoded by the parameter decoder 302, the prediction mode predMode separated by the entropy decoder 301, and the like.

The prediction image generation unit 308 receives input of the prediction mode predMode, the prediction parameter, and the like. In addition, the prediction image generation unit 308 reads a reference picture from the reference picture memory 306. The prediction image generation unit 308 generates a prediction image of the block or the subblock by using the prediction parameter and the read reference picture (reference picture block) in the prediction mode (intra prediction, inter prediction) indicated by the prediction mode predMode. Here, the reference picture block refers to a set of pixels (referred to as a block because they are normally rectangular) on a reference picture and is a region that is referred to to generate a prediction image.

Inter Prediction Image Generation Unit 309

In a case that the prediction mode predMode indicates the inter prediction mode, the inter prediction image generation unit 309 generates a prediction image of the block or the subblock by means of the inter prediction by using the inter prediction parameter input from the inter prediction parameter decoder 303 and the reference picture.

Figure 22:
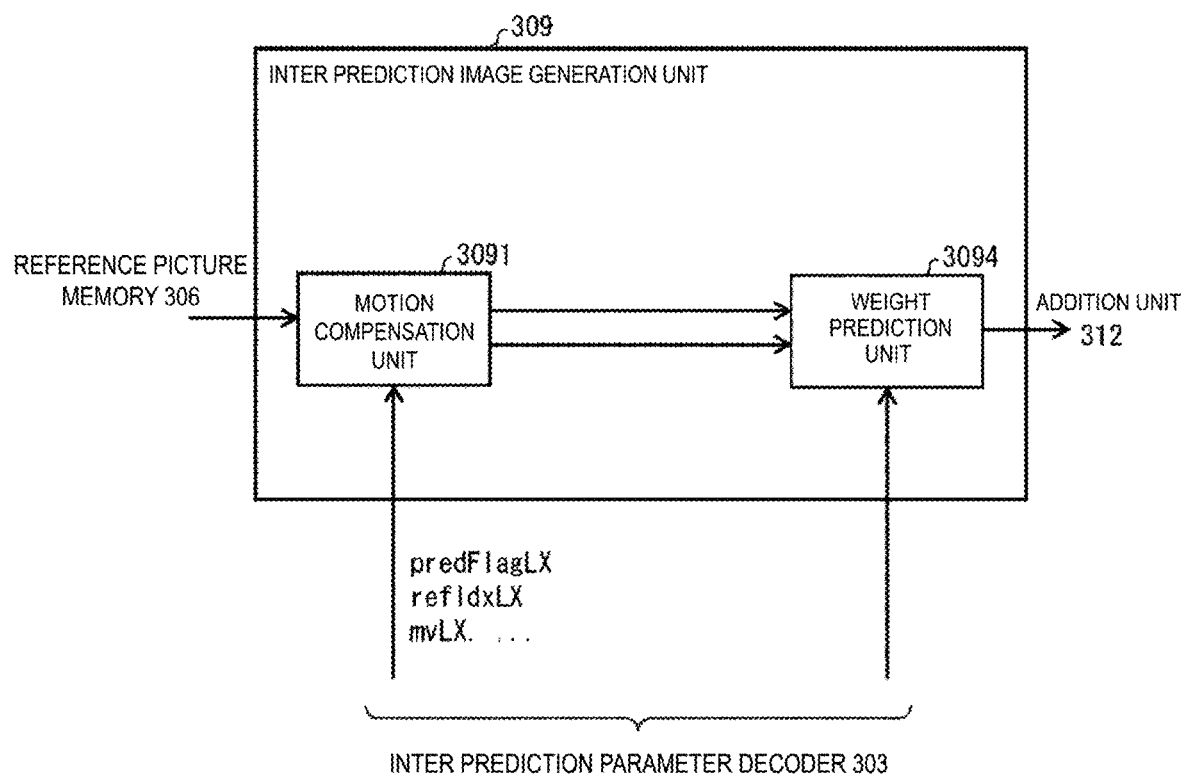
FIG. 22 is a schematic diagram illustrating a configuration of an inter prediction image generation unit.

FIG. 22 is a schematic diagram illustrating a configuration of the inter prediction image generation unit 309 included in the prediction image generation unit 308 according to the present embodiment. The inter prediction image generation unit 309 includes a motion compensation unit (prediction image generation apparatus) 3091 and a weight prediction unit 3094.

Motion Compensation

The motion compensation unit 3091 (interpolation image generation unit) generates an interpolation image (motion compensation image) by reading, from the reference picture memory 306, a block that is located at a position shifted by the motion vector mvLX with the position of the target block being a starting point in a reference picture RefLX specified by the reference picture index refIdxLX, based on the inter prediction parameter (prediction list utilization flag pred-FlagLX, reference picture index refIdxLX, motion vector mvLX) input from the inter prediction parameter decoder 303. Here, in a case that accuracy of the motion vector mvLX is not integer accuracy, the motion compensation image is generated by applying a filter for generating a pixel at the fractional position, which is referred to as a motion compensation filter.

The motion compensation unit 3091 first derives an integer position (xInt, yInt) and phase (xFrac, yFrac) corresponding to coordinates (x, y) in a prediction block by using the following expression.

$x\text{Int}=xPb+(mvLX[0]>>(\log 2(\text{MVBIT})))+x$ $x\text{Frac}=mvLX[0]\&(\text{MVBIT}-1)$ $y\text{Int}=yPb+(mvLX[1]>>(\log 2(\text{MVBIT})))+y$ $y\text{Frac}=mvLX[1]\&(\text{MVBIT}-1)$ Here, (xPb, yPb) represents upper left coordinates of the block having a size of wPb*hPb, x=0 . . . wPb−1, y=0 . . . hPb−1, and MVBIT represents accuracy (1/MVBIT pixel accuracy) of the motion vector mvLX.

The motion compensation unit 3091 derives a temporary image temp[ ][ ] by performing horizontal interpolation processing by using an interpolation filter for a reference picture refImg. In the following, Σ is a sum related to k of k=0 . . . NTAP−1, shift1 is a normalization parameter for adjusting a range of the value, and offset1=1<<(shift1−1).

$\text{temp}[x][y]=(\Sigma mc\text{Filter}[x\text{Frac}][k]*\text{refImg}[x\text{Int}+k-\text{NTAP}/2+1][y\text{Int}]+\text{offset1})>>\text{shift1}$ Subsequently, the motion compensation unit 3091 derives an interpolation image Fred[ ][ ] by performing vertical interpolation processing on the temporary image temp[ ][ ]. In the following, Σ is a sum related to k of k=0 . . . NTAP−1, shift2 is a normalization parameter for adjusting a range of the value, and offset2=1<<(shift2−1).

$\text{Pred}[x][y]=(\Sigma mc\text{Filter}[y\text{Frac}][k]*\text{temp}[x][y+k-\text{NTAP}/2+1]+\text{offset2})>>\text{shift2}$ Note that, in a case of the bi-prediction, Pred[ ][ ] described above is derived for each L0 list and L1 list (which are referred to as interpolation images PredL0[ ][ ] and PredL1[ ][ ], respectively), and the interpolation image Pred[ ][ ] is generated from an interpolation image PredL0[ ][ ] and an interpolation image PredL1[ ][ ].

Weight Prediction

The weight prediction unit 3094 generates a prediction image of the block by multiplying a motion compensation image PredLX by a weight coefficient. In a case that one of the prediction list utilization flags (predFlagL0 or predFlagL1) is 1 (uni-prediction) and the weight prediction is not used, processing of the following expression for causing the motion compensation image PredLX (LX is L0 or L1) to match the number bitDepth of pixel bits is performed.

$\text{Pred}[x][y]=\text{Clip3}(0,(1<<\text{bitDepth})-1,(\text{PredLX}[x][y]+\text{offset1})>>\text{shift1})$ Here, shift1=14−bitDepth, and offset1=1<<(shift1−1).

In a case that both of the reference list utilization flags (predFlagL0 and predFlagL1) are 1 (bi-prediction BiPred) and the weight prediction is not used, processing of the following expression for averaging the motion compensation images PredL0 and PredL1 and causing the motion compensation images PredL0 and PredL1 to match the number of pixel bits is performed.

$\text{Pred}[x][y]=\text{Clip3}(0,(1<<\text{bitDepth})-1,(\text{PredL0}[x][y]+\text{PredL1}[x][y]+\text{offset2})>>\text{shift2})$ Here, shift2=15−bitDepth, and offset2=1<<(shift2−1).

In addition, in a case of the uni-prediction and that the weight prediction is performed, the weight prediction unit 3094 derives a weight prediction coefficient w0 and an offset o0 from the coded data, and performs processing of the following expression.

$\text{Pred}[x][y]=\text{Clip3}(0,(1<<\text{bitDepth})-1,((\text{PredLX}[x][y]*w0+2^{(\log 2WD-1)})>>\log 2WD)+o0)$ Here, log 2WD is a variable indicating a prescribed shift amount.

In addition, in a case of the bi-prediction BiPred and that the weight prediction is performed, the weight prediction unit 3094 derives weight prediction coefficients w0, w1, o0, and of from the coded data, and performs processing of the following expression.

$\text{Pred}[x][y]=\text{Clip3}(0,(1<<\text{bitDepth})-1,(\text{PredL0}[x][y]*w0+\text{PredL1}[x][y]*w1+((o0+o1+1)<<\log 2WD))>>(\log 2WD+1))$ The inter prediction image generation unit 309 outputs the generated prediction image of the block to the addition unit 312.

Refresh and Inter Prediction

In refresh, at the time of random access, in order to implement correct decoding processing after the random access point, the prediction image needs to be generated with reference to only the restricted region (restricted reference region) of the reference picture also in the inter prediction of the restricted region.

Boundary Padding of Restricted Reference Region

Figure 23:
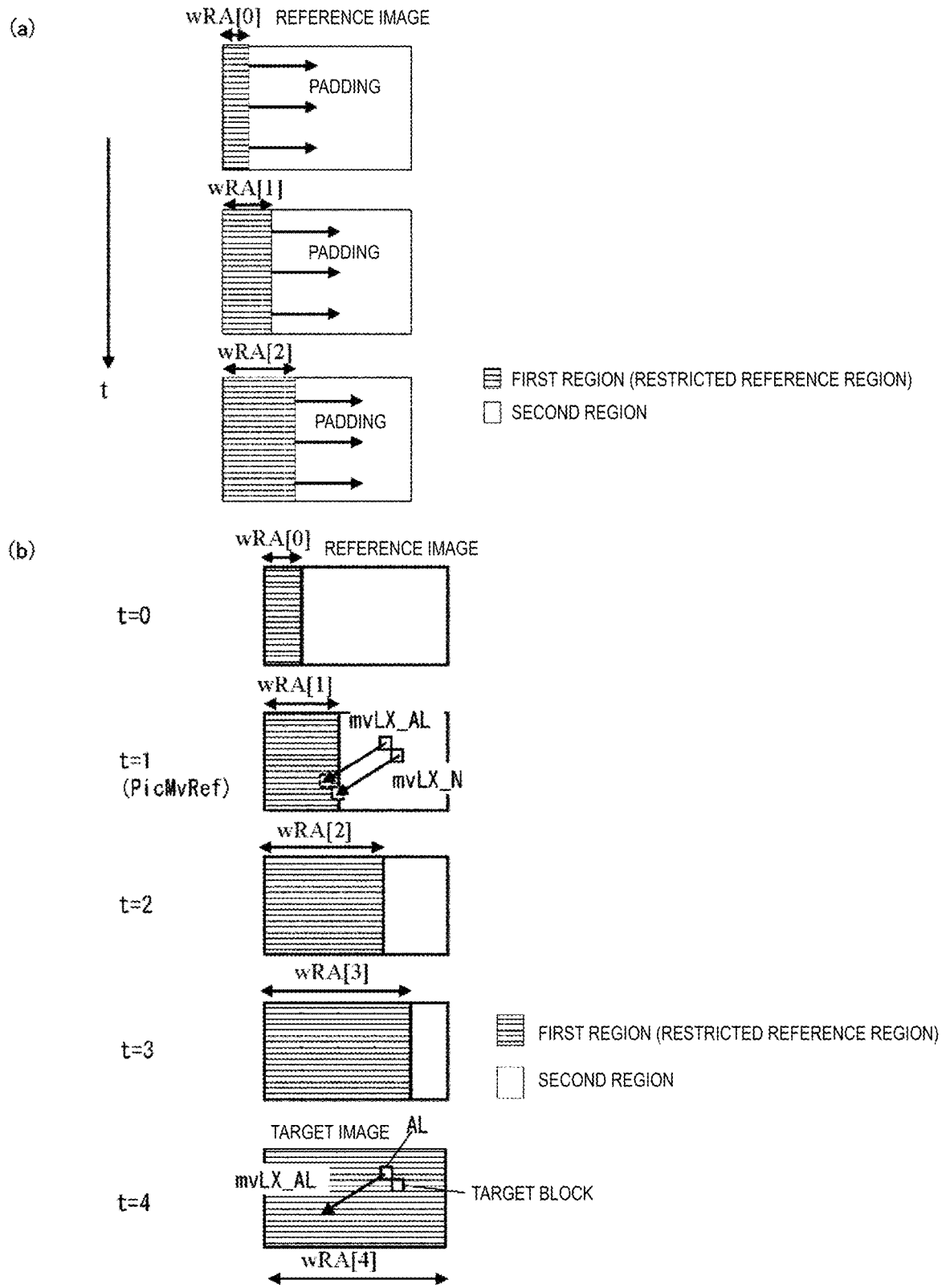
FIG. 23 is a diagram illustrating boundary padding and boundary motion vector clipping.

As illustrated in FIG. 23(a), in a case that the target block Pb is present in the restricted region, seq_refresh_enable_flag is 1 and the pixel of the reference picture is present in the non-restricted reference region, the motion compensation unit 3091 according to the present example performs padding processing of replacing the pixel value of the non-restricted reference region (second reference region) in the reference picture with the pixel value of the restricted reference region. For example, in a case that the upper left coordinates of the target block are represented by (xPb, yPb) and the width and the height by bW and bH respectively, the motion compensation unit 3091 derives whether or not the target block (Pb) is present in the restricted region with IsRA (Pb) described in the above.

The boundary padding is implemented by using a pixel value refImg[xRef+i][yRef+j] of the following position xRef+i, yRef+j as the pixel value of a position (xIntL+i, yIntL+j) of the reference pixel in the interpolation image generation (motion compensation) performed by the motion compensation unit 3091. Specifically, the boundary padding is implemented by clipping the reference position of the pixel used in the interpolation image generation at a position (for example, a position of the left edge, the upper edge, the bottom edge, or the right edge) of the boundary pixel of the restricted reference region of the reference picture.

For example, in a case that the left edge position of the restricted reference region of the reference picture is represented by xRA_st, the right edge position by xRA_en, the upper edge position by yRA_st, and the bottom edge position by yRA_en, the motion compensation unit 3091 performs the following boundary padding processing. In other words, in a case that an X coordinate xIntL+i of the reference position is smaller than that of the left edge of the restricted reference region, the position is replaced with the position xRA_st of the left edge pixel of the restricted reference region. In a similar manner, in a case that the X coordinate xIntL+i of the reference position is larger than that of the right edge of the restricted reference region, the position is replaced with the position xRA_en of the right edge pixel of the restricted reference region. In a case that a Y coordinate yIntL+j is smaller than that of the upper edge of the restricted reference region, the position is replaced with the upper edge pixel position yRA_st, and in a case that the Y coordinate yIntL+j is larger than that of the bottom edge of the restricted reference region, the position is replaced with the position yRA_en of the bottom edge pixel.

$x\text{Ref}+i=\text{Clip3}(xRA\_st,xRA\_en,x\text{IntL}+i)$ $y\text{Ref}+j=\text{Clip3}(yRA\_st,yRA\_en,y\text{IntL}+j)$ (Expression INTERP-2)

For example, in a case that the sequential refresh information is turned on (seq_refresh_enable_flag=1), and further, seq_refresh_mode=0 and seq_refresh_direction=0, that is, the restricted reference region is moved from the left to the right, $xRA\_st=0, xRA\_en=wRA[k]-1$ and $yRA\_st=0, yRA\_en=hPict-1$ where wRA[k] represents the right edge position (width) of the restricted reference region at the time t=k. Therefore, the motion compensation unit 3091 derives coordinates of the reference pixel by using (Expression INTERP-3).

$x\text{Ref}+i=\text{Clip3}(0,wRA[k]-1,x\text{IntL}+i)$ $y\text{Ref}+j=\text{Clip3}(0,h\text{Pict}-1,y\text{IntL}+j)$ (Expression INTERP-3)

Here, hPict is the height of the picture.

Note that, regarding xIntL and yIntL, in a case that the upper left coordinates of the target block with reference to the upper left coordinates of the picture are represented by (xPb, yPb) and the motion vector by (mvLX[0], mvLX[1]), the coordinates of the reference pixel may be derived according to (Expression INTERP-3').

$x\text{IntL}=xPb+(mvLX[0]>>\log 2(MVBIT))$ $y\text{IntL}=yPb+(mvLX[1]>>\log 2(MVBIT))$ (Expression INTERP-3')

Here, MVBIT denotes that accuracy of the motion vector is 1/MVBIT pel.

By reading the pixel value at the coordinates (xRef+i, yRef+j), padding of FIG. 23(a) can be implemented.

Note that, in the sequential refresh information, in a case that seq_refresh_mode=0 and seq_refresh_direction=1, that is, the restricted reference region is moved from the right to the left, the left edge coordinates xRA_st is derived with yRA_en=wRA[k], and the coordinates of the reference pixel are derived by using the following expression.

$x\text{Ref}+i=\text{Clip3}(wRA[k],w\text{Pict}-1,x\text{IntL}+i)$ $y\text{Ref}+j=\text{Clip3}(0,h\text{Pict}-1,y\text{IntL}+j)$ Here $xRA\_st=wRA[k], xRA\_en=w\text{Pict}-1$ $yRA\_st=0, yRA\_en=h\text{Pict}-1$ (Expression INTERP-2')

On the other hand, in a case that refresh is shifted in the vertical direction as in FIG. 13(c) (in a case that seq_refresh_mode=1 and seq_refresh_direction=0 in the sequential refresh information), the bottom edge coordinates are derived with yRA_en=hRA-1, where hRA represents the height of the restricted reference region, and in the boundary padding, the coordinates of the reference pixel are derived by using (Expression INTERP-4).

$x\text{Ref}+i=\text{Clip3}(0,w\text{Pict}-1,x\text{IntL}+i)$ $y\text{Ref}+j=\text{Clip3}(0,yRA\_en,y\text{IntL}+j)$ (Expression INTERP-4)

Here, wPict is the width of the picture.

In sequential refresh, by performing padding by using the boundary pixel of the restricted reference region as described above, the reference pixel is replaced by using the pixel value in the restricted reference region even in a case that the motion vector in the restricted region in the inter prediction points to the outside of the restricted reference region of the reference picture (non-restricted reference region). Therefore, even in the inter prediction, correct decoding processing after the random access point can be implemented.

Based on the above, the motion compensation unit 3091 replaces the pixel of the non-restricted reference region by using the pixel of the restricted reference region (padding) in the image generation processing using the motion vector pointing to the outside of the restricted reference region in the inter prediction of the restricted region.

Motion Vector Restriction of Restricted Reference Region

In a case that the reference picture is referred to, as another method of generating the prediction image with reference to only the pixel of the restricted reference region, there is boundary motion vector restriction. In the present example, in the motion compensation performed by the motion compensation unit 3091 to be described later, the motion vector is restricted (clipped) so that the position (xIntL+i, yIntL+j) of the reference pixel falls within the restricted reference region.

In the present example, in a case that the upper left coordinates of the target block at the time t=k are represented by (xPb, yPb), the size of the block by (wPb, hPb), the position of the restricted reference region of the reference picture at the time j by (xRA_st[j], xRA_st[j]), and the size by (wRA[j], hRA[j]), whether or not the edge of the motion vector is within the restricted range may be determined, with the motion vector mvLX of the block being an input. The determination expression is expressed by (Expression INTERP-5).

$$IsRA(Pb, mvLX) = (xRA\_st[j] <= xPb + (mvLX[0] >> \log 2(MVBIT)) - NTAP2 + 1) \text{ \&\& } (xPb + wPb - 1 + (mvLX[0] >> \log 2(MVBIT)) + NTAP2 < xRA\_st[j] + wRA[j])$$ (Expression INTERP-5)

Further, the following expression may be used.

$$IsRA(Pb, mvLX) = (yRA\_st[j] <= yPb + (mvLX[1] >> \log 2(MVBIT)) - NTAP2 + 1) \text{ \&\& } (yPb + hPb - 1 + (mvLX[1] >> \log 2(MVBIT)) + NTAP2 < yRA\_st[j] + hRA[j])$$

In the present example, in a case that the upper left coordinates of the target block at the time t=k are represented by (xPb, yPb), the size of the block by (wPb, hPb), the position of the restricted reference region of the reference picture at the time j by (xRA_st[j], xRA_st[j]), and the size by (wRA[j], hRA[j]), the restricted motion vector mvLX is output, with the motion vector mvLX of the block being an input. The restriction of the motion vector mvLX is expressed by (Expression INTERP-6).

$$mvLX[0] = ClipRA(mvLX[0]) = Clip3(xRA\_st[j] + (NTAP2 - 1 - xPb) << \log 2(MVBIT),$$

$$(xRA\_st[j] + wRA[j] - NTAP2 - xPb - wPb) << \log 2(MVBIT), mvLX[0])$$

$$mvLX[1] = ClipRA(mvLX[1]) = Clip3(yRA\_st[j] + (NTAP2 - 1 - yPb) << \log 2(MVBIT),$$

$$(yRA\_st[j] + hRA[j] - NTAP2 + 1 - yPb - hPb) << \log 2(MVBIT), mvLX[1])$$ (Expression INTERP-6)

The clipping processing is hereinafter expressed as ClipRA(mvLX).

Alternatively, in a case that the restricted region is shifted from the left to the right (in a case that seq_refresh_mode=0 and seq_refresh_direction=0 in the sequential refresh information) and the width of the restricted reference region is wRA, xRA_st=0, xRA_en=wRA-1, yRA_st=0, and yRA_en=hPict-1. Therefore, the motion vector mvLX may be derived by using the following expression.

$$mvLX[0] = Clip3((NTAP2 - 1 - xPb) << \log 2(MVBIT),$$

$$(wRA[k] - NTAP2 - xPb - wPb) << \log 2(MVBIT),$$

$$mvLX[0])$$

$$mvLX[1] = Clip3((NTAP2 - 1 - yPb) << \log 2(MVBIT),$$

$$(hPict - NTAP2 + 1 - yPb - hPb) << \log 2(MVBIT),$$

$$mvLX[1])$$ (Expression INTERP-6)

Here, NTAP is the number of taps of the filter used for interpolation image generation, and NTAP2=NTAP/2. The width wRA[k] of the restricted reference region at time t=k may be derived according to the expression of (Expression INTERP-7) by using the width wIR of the restricted region and the width wOVLP of the overlap.

$$wRA[k] = (wIR - wOVLP) * (k + 1)$$ (Expression INTERP-7)

On the other hand, in a case that the restricted region is shifted in the vertical direction as in FIG. 13(c) (in a case that seq_refresh_mode=1 and seq_refresh_direction=0 in the sequential refresh information), the restriction of the motion vector mvLX and the height hRA[k] of the restricted reference region at time t=k may be derived by using (Expression INTERP-8).

$$mvLX[0] = Clip3((NTAP2 - 1 - xPb) << \log 2(MVBIT),$$

$$(wPict - NTAP2 + 1 - xPb - wPb + 1) << \log 2(MVBIT), mvLX[0])$$

$$mvLX[1] = Clip3((NTAP2 - 1 - yPb) << \log 2(MVBIT),$$

$$(hRA[k] - NTAP2 + 1 - yPb - hPb + 1) << \log 2(MVBIT), mvLX[1])$$

$$hRA[k] = (hIR - hOVLP) * (k + 1)$$ (Expression INTERP-8)

In refresh, by restricting the motion vector as described above, the motion vector points to the inside of the restricted region of the reference picture. Therefore, correct decoding processing after the random access point can be implemented even in the inter prediction of the restricted region.

Based on the above, in a case of performing the inter prediction, the inter prediction parameter decoder 303 and the motion compensation unit 3091 clip the vector pointing to the non-restricted reference region to the inside of the restricted reference boundary.

Merge Prediction Restriction of Restricted Reference Region

The restricted region (restricted reference region) that can be referred to in the inter prediction of the restricted region in the subsequent picture, as indicated by the horizontal lines of FIG. 10(d), has different ranges depending on a reference picture (time). Thus, in a case that the motion vector of the target block is estimated from the motion vector of a surrounding block (hereinafter a neighboring block) of the target block as in the merge prediction, processing of addition is required.

FIG. 23(b) is a diagram illustrating an example of the present example. In FIG. 23(b), the target block is present in the restricted region of the picture at time t=4. Further, the reference picture index of the neighboring block AL used in the spatial merge candidate indicates the picture at time t=1 (reference picture PicMvRef), and the motion vector thereof is mvLX_AL. Even in a case that the region at time t=1 referred to by the motion vector mvLX_AL of the neighboring block AL is included in the restricted reference region, the region may point to the outside of the restricted reference region in a case that the motion vector mvLX_AL is applied to the motion vector of the target block as the merge candidates. The merge prediction parameter derivation unit 3036 according to the present example derives the merge candidates so that the merge candidates pointing to the outside of the restricted reference region are not included in the merge candidate list as described above.

Specifically, in a case that seq_refresh_enable_flag is 1, and in the derived merge candidate (for example, merge candidate N), the reference picture index and the motion vector are present in the restricted reference region, that is, IsRA (Pb, mvLX_N) is true, the merge prediction parameter derivation unit 3036 configures availability availabilityN of the merge candidate N to 1, and in a case that the reference picture index and the motion vector are present outside of the restricted reference region, the merge prediction parameter derivation unit 3036 configures the availabilityN to 0. Only the merge candidates with the availability availabilityN of 1 may be configured in the merge candidate list.

In a case that seq_refresh_enable_flag is 1, the merge prediction parameter derivation unit 3036 determines whether a reference picture index refIdxLXN and a motion vector mvLXN point to the restricted reference region in each of the L0 reference picture and the L1 reference picture of the derived merge candidate (for example, merge candidate N). In a case that the reference picture index refIdxLXN and the motion vector mvLXN point to the inside of the restricted reference region, the merge candidates for performing the bi-prediction may be configured in the merge candidate list in a case that the utilization flag predFlagLX=1 (X=0, 1). In a case that the reference picture of one of the reference picture lists of L0 and L1 is not available (!IsRA (Pb, mvLXN)), merge candidates of the uni-prediction are configured in the merge candidate list for a reference picture list LX to be predFlagLX=1. In a case of predFlagLX=0, in which the reference picture of neither of the reference picture lists of L0 and L1 is available, the availability availabilityN of the merge candidate N is configured to 0.

In a case that seq_refresh_enable_flag is 1, the merge prediction parameter derivation unit 3036 refers to the generated merge candidate list in order, and in a case that the reference picture index and the motion vector in the generated merge candidate list point to the outside of the restricted reference region, the merge prediction parameter derivation unit 3036 may eliminate the reference picture index and the motion vector from the merge candidate list.

In the sequential refresh information, in a case that seq_refresh_mode=1 and seq_refresh_direction=0, and the time t of the reference picture indicated by the reference picture index of the merge candidate is j and the motion vector of the merge candidate is mvLX_AL, it is the available merge candidate having the reference picture index and the motion vector satisfying (Expression INTERP-9).

$xPb+wPb-1+mvLX\_AL[0]<=xRA\_en[j]-1$ (Expression INTERP-9)

Alternatively, the following expression may be used for derivation.

$xPb+wPb-1+mvLX\_AL[0]<xRA\_st[j]+wRA[j]$

Alternatively, the following expression may be used for derivation.

$xPb+wPb-1+mvLX\_AL[0]<=(wIR-wOVLP)*(j'+1)$

On the other hand, in the sequential refresh information, in a case that seq_refresh_mode=1 and seq_refresh_direction=0, that is, the restricted region is shifted in the vertical direction from the upper side to the bottom side as in FIG. 13(c), the reference picture index and the motion vector of the merge candidate determine the available merge candidate by using (Expression INTERP-10).

$yPb+hPb-1+mvLX\_AL[1]<=yRA\_en[j]-1$ (Expression INTERP-10)

Alternatively, the following expression may be used for derivation.

$yPb+hPb-1+mvLX\_AL[1]<yRA\_st[j]+wRA[j]$

Alternatively, the following expression may be used for derivation.

$yPb+hPb-1+mvLX\_AL[1]<=(hIR-hOVLP)*(j'+1)$

As described above, in a case that random access is implemented by using the restricted region, correct decoding processing after the random access point can be implemented by restricting the merge candidates so that the region referred to by the target block is included in the restricted reference region.

Alternatively, as another example, in a case that seq_refresh_enable_flag is 1 and the target block Pb is present in the restricted region (IsRA (Pb) is true), the merge candidate derivation unit 30361 according to the present embodiment may clip the merge candidate N motion vector mvLX_N to the position in the restricted region by using the following expression.

$mvLX[0]=ClipRA(mvLX\_N[0])$ $mvLX[1]=ClipRA(mvLX\_N[1])$

Alternatively, as another example of a case that seq_refresh_enable_flag is 1, the following will describe a case that the region referred to by the target block is included in the non-restricted reference region in a case that the reference picture index and the motion vector of the merge candidate are applied to the target block. In this case, by correcting the reference picture index and scaling the motion vector, IsRA (Pb, scaledMV) may be determined as to whether or not the reference region of the target block is included in the restricted reference region.

In the sequential refresh information, in a case that seq_refresh_mode=0 and seq_refresh_direction=0, the reference picture index and the motion vector determine the available merge candidate by using (Expression INTERP-11).

$xPb+wPb-1+scaledMV[0]<=xRA\_en[j]-1$ (Expression INTERP-11)

Alternatively, the following expression may be used for derivation.

$xPb+wPb-1+scaledMV[0]<xRA\_st[j]+wRA[j]$

Alternatively, the following expression may be used for derivation.

$xPb+wPb-1+scaledMV[0]<=(wIR-wOVLP)*(j'+1)$ $scaledMV=MvScale(mvLX\_AL,k,j,k,j')$ Here, k is time of the target picture, and j is time of the reference picture of the neighboring block. However, these may be regarded as POC. scaledMV is a scaled motion vector of the neighboring block, and is derived by using (Expression INTERP-1). j' is time (POC) of the reference picture indicated by a corrected reference picture index.

On the other hand, in a case that the restricted region is shifted in the vertical direction as in FIG. 13(c) (in a case that seq_refresh_mode=1 and seq_refresh_direction=0 in the sequential refresh information), the reference picture index and the motion vector are derived so as to satisfy (Expression INTERP-12).

$yPb+hPb-1+scaledMV[1]<=(hIR-hOVLP)*(j'+1)$ $scaledMV=MvScale(mvLX\_AL,k,j,k,j')$ (Expression INTERP-12)

As described above, in a case that random access is implemented by using the restricted region, by correcting the reference picture index and the motion vector of the merge candidate, the reference region of the target block is included in the restricted reference region. Therefore, correct decoding processing after the random access point can be implemented.

Intra Prediction Image Generation Unit 310

In a case that the prediction mode predMode indicates an intra prediction mode, the intra prediction image generation unit 310 performs an intra prediction by using an intra prediction parameter input from the intra prediction parameter decoder 304 and a reference pixel read from the reference picture memory 306.

Specifically, the intra prediction image generation unit 310 reads, from the reference picture memory 306, the neighboring block present in a predetermined range from the target block on the target picture. The predetermined range is a neighboring block on the left, upper left, above, and upper right of the target block, and the region to be referred to is different depending on the intra prediction mode.

The intra prediction image generation unit 310 generates the prediction image of the target block with reference to a read decoded pixel value and the prediction mode indicated by the intra prediction mode IntraPredMode. The intra prediction image generation unit 310 outputs the generated prediction image to the addition unit 312.

The generation of the prediction image based on the intra prediction mode will be described below. In Planar prediction, DC prediction, and Angular prediction, a decoded surrounding region that is adjacent to the target block is configured as the reference region. Further, the prediction image is generated by extrapolating the pixel on the reference region in a specific direction. For example, the region may be configured as an L-like region (for example, the region indicated by the pixels denoted by the circles hatched with diagonal lines in FIG. 24($a$)) including the left and upper side (or, the upper left, upper right, and bottom left side as well) of the target block of the reference region.

Details of Prediction Image Generation Unit

Figure 25:
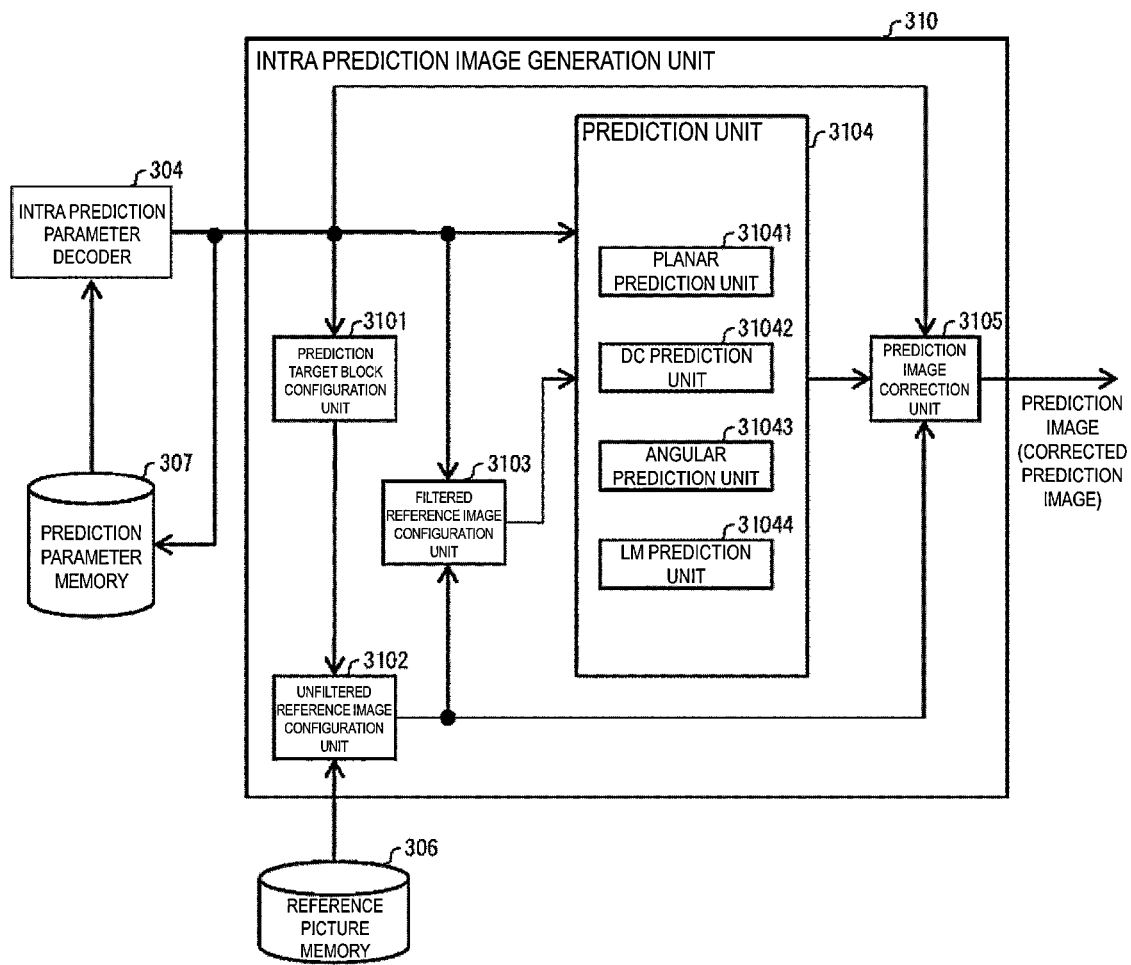
FIG. 25 is a diagram illustrating a configuration of an intra prediction image generation unit.

Next, the details of the configuration of the intra prediction image generation unit 310 will be described with reference to FIG. 25. The intra prediction image generation unit 310 includes a target block configuration unit 3101, an unfiltered reference image configuration unit 3102 (first reference image configuration unit), a filtered reference image configuration unit 3103 (second reference image configuration unit), a prediction unit 3104, and a prediction image correction unit 3105 (prediction image correction unit, filter switch unit, a weight coefficient change unit).

Based on each reference pixel (unfiltered reference image) on the reference region, a filtered reference image generated by applying a reference pixel filter (first filter), and the intra prediction mode, the prediction unit 3104 generates a provisional prediction image (prediction image before correction) of the target block, and outputs the provisional prediction image to the prediction image correction unit 3105. The prediction image correction unit 3105 corrects the provisional prediction image according to the intra prediction mode, generates a prediction image (corrected prediction image), and outputs the prediction image.

Each unit included in the intra prediction image generation unit 310 will be described below.

Target Block Configuration Unit 3101

The target block configuration unit 3101 configures the target CU for the target block, and outputs information (target block information) related to the target block. The target block information at least includes an index indicating the size, the position thereof, and luminance or chrominance of the target block.

Unfiltered Reference Image Configuration Unit 3102

Based on the size and the position of the target block, the unfiltered reference image configuration unit 3102 configures the neighboring region of the target block as the reference region. Subsequently, each decoded pixel value of a corresponding position on the reference picture memory 306 is set for each pixel value (unfiltered reference image, boundary pixel) in the reference region. A line r[x][−1] of the decoded pixels adjacent to the upper side of the target block illustrated in FIG. 24($a$) and a column r[−1][y] of the decoded pixels adjacent to the left side of the target block are the unfiltered reference images. An unfiltered reference image r[x][y] is configured with (Expression INTRAP-1) by using a decoded pixel value u[ ][ ] of the target picture expressed with reference to the upper left coordinates of the target picture.

$r[x][y]=u[xPb+x][yPb+y]$(Expression INTRAP-1)$x=-1,y=-1 \ldots$ (maxBS*2−1) and $x=0 \ldots$ (maxBS*2−1),$y=-1$ Here, (xPb, yPb) represents the upper left coordinates of the target block, maxBS represents the larger value out of the width wPb and the height hPb of the target block.

In (Expression INTRAP-1), as illustrated in FIG. 24($a$), the line r[x][−1] of the decoded pixels adjacent to the upper side of the target block and the column r[−1][y] of the decoded pixels adjacent to the left side of the target block are the unfiltered reference images. Note that, in a case that the decoded pixel value corresponding to the reference pixel position is absent or cannot be referred to, a prescribed value (for example, 1<<(bitDepth−1) in a case that the pixel bit depth is bitDepth) may be configured as the unfiltered reference image. Alternatively, the decoded pixel value that is present near the corresponding decoded pixel and that can be referred to may be configured as the unfiltered reference image. Further, "y=−1 (maxBS*2−1)" indicates that y may have (maxBS*2+1) values from −1 to (maxBS*2−1), and "x=0 (maxBS*2−1)" indicates that x may have (maxBS*2) values from 0 to (maxBS*2−1).

Pixel Value Configuration 1 of Reference Region of Restricted Region

In a case that seq_refresh_enable_flag is 1 and the target block Pb is present in the restricted region (IsRA (Pb) is true), the intra prediction image generation unit 310 according to the present embodiment does not refer to the pixel value of the non-restricted region illustrated in FIG. 26($a$) at the boundary between the restricted region (first region) and the non-restricted region (second region). In other words, in a case that seq_refresh_enable_flag is 1, the intra prediction image generation unit 310 configures the pixel of the non-restricted region to be "not available" as the reference pixel. In this case, the intra prediction image generation unit 310 configures r[wCU−1][−1] in the restricted region as the pixel value of the reference pixel r[x][−1] (x>=wCU) outside the restricted region.

$r[x][-1]=r[wCU-1][4](wCU<=x<2*maxBS)$ (Expression INTRAP-2)

On the other hand, in a case that the restricted region is shifted in the vertical direction, the intra prediction image generation unit 310 configures r[−1][hCU−1] as the pixel value of the reference pixel r[−1][y] (y>=hCU).

$r[-1][y]=r[-1][hCU-1](hCU<=y<2*maxBS)$ (Expression INTRAP-3)

By configuring the reference region as described above, the prediction image is not generated with reference to the pixel value of the non-restricted region in any of the intra prediction modes. Thus, processing of the filtered reference image configuration unit 3103, the intra prediction unit 3104, and the prediction image correction unit 3105 to be described later need not be changed.

Filtered Reference Image Configuration Unit 3103

The filtered reference image configuration unit 3103 applies the reference pixel filter (first filter) to the unfiltered reference image according to the intra prediction mode, and derives a filtered reference image s[x][y] of each position (x, y) on the reference region. Specifically, the filtered reference image configuration unit 3103 applies a low-pass filter to the position (x, y) and the unfiltered reference image around the position (x, y), and derives the filtered reference image (FIG. 24(*b*)). Note that the low-pass filter need not necessarily be applied to all of the intra prediction modes, and the low-pass filter may be applied to some of the intra prediction modes.

Next, the following will describe a case that the reference region is configured with a normal method expressed by (Expression INTRAP-1) without using the method of Pixel Value Configuration 1 of Reference Region at the boundary between the restricted region and the non-restricted region in the unfiltered reference image configuration unit 3102.

In a case that the reference pixel filter is a smoothing filter of the number NTAP of taps, as illustrated in FIG. 26(*b*), the filtered reference image configuration unit 3103 does not apply the reference pixel filter to the pixel to which the filter is applied with reference to the pixel of the non-restricted region. In other words, the pixel of the non-restricted region is configured to be "not available" as the reference pixel. In this case, the reference pixel filter need not be applied to the pixel of the non-restricted region or the entire reference region on the upper side of the target block.

Alternatively, in a case that the reference pixel filter is a linear filter that refers to the pixel value of r[maxBS*2−1][−1], the filter is not applied to the reference region on the upper side of at least the target block.

On the other hand, in a case that the restricted region is shifted in the vertical direction, the reference region to which the filter is not applied is the reference region on the left side of the target block. In a case that the reference pixel filter is the linear filter that refers to the pixel value of r[−1][maxBS*2−1], the filter is not applied to the reference region on the left side of at least the target block.

In a case that the reference region is configured with a normal method, processing different from the normal method is required also in the intra prediction unit 3104 to be described later.

Note that the filter to be applied to the unfiltered reference image on the reference region in the filtered reference pixel configuration unit 3103 is referred to as a "reference pixel filter (first filter)", whereas the filter to correct the provisional prediction image in the prediction image correction unit 3105 to be described later is referred to as a "boundary filter (second filter)".

Configuration of Intra Prediction Unit 3104

Based on the intra prediction mode, the unfiltered reference image, and the filtered reference pixel value, the intra prediction unit 3104 generates a provisional prediction image (a provisional prediction pixel value, a prediction image before correction) of the target block, and outputs the provisional prediction image to the prediction image correction unit 3105. The prediction unit 3104 internally includes a Planar prediction unit 31041, a DC prediction unit 31042, an Angular prediction unit 31043, and an LM prediction unit 31044. The prediction unit 3104 selects a specific prediction unit according to the intra prediction mode, and inputs the unfiltered reference image and the filtered reference image. The relationship between the intra prediction mode and its corresponding prediction unit is as follows.

Planar prediction . . . Planar prediction unit 31041
    DC prediction . . . DC prediction unit 31042
    Angular prediction . . . Angular prediction unit 31043
    LM prediction . . . LM prediction unit 31044

In a case that the reference pixel is not configured with the method of Pixel Value Configuration 1 of Reference Region at the boundary between the restricted region and the non-restricted region in a case of implementing random access by using the restricted region, the Planar prediction mode must not be used unless restriction to be described later is provided. Regarding an Angular intra prediction mode, the intra prediction mode (IntraPredModeY>50) that is larger than the vertical prediction mode (50) illustrated in FIG. 5 must not be used. This is because, in these modes, the pixels included in the non-restricted region are referred to.

Planar Prediction

The Planar prediction unit 31041 generates a provisional prediction image by linearly adding multiple filtered reference images according to the distance between the target pixel position and the reference pixel position, and outputs the provisional prediction image to the prediction image correction unit 3105. A pixel value q[x][y] of the provisional prediction image is derived according to (Expression INTRAP-4) by using a filtered reference pixel value s[x][y] and the width wPb and the height hPb of the target block.

$$q[x][y]=((wPb-1-x)*s[-1][y]+(x+1)*s[wPb][-1]+ \\ (hPb-1-y)*s[x][-1]+(y+1)*s[-1][hPb]+ \\ maxBS)>>(\log 2(maxBS)+1) \quad \text{(Expression INTRAP-4)}$$

Here, x=0 wPb−1, and y=0 hPb−1.

Restricted Region and Planar Prediction

At the boundary between the restricted region and the non-restricted region, in a case that s[wPb][−1] referred to in (Expression INTRAP-4) is the pixel of the non-restricted region, reference cannot be made in random access using the restricted region. In the present example, the pixel value q[x][y] of the provisional prediction image is calculated by using s[wPb−1][4] instead of s[wPb][−1].

$$q[x][y]=((wPb-1-x)*s[-1][y]+(x+1)*s[wPb-1][-1]+ \\ (hPb-1-y)*s[x][-1]+(y+1)*s[-1][hPb]+ \\ maxBS)>>(\log 2(maxBS)+1) \quad \text{(Expression INTRAP-5)}$$

In addition, the pixel value q[x][y] of the provisional prediction image may be calculated by using s[−1][hPb−1] instead of s[−1][hPb].

$$q[x][y]=((wPb-1-x)*s[-1][y]+(x+1)*s[wPb-1][-1]+ \\ (hPb-1-y)*s[x][-1]+(y+1)*s[-1][hPb-1]+ \\ maxBS)>>(\log 2(maxBS)+1) \quad \text{(Expression INTRAP-6)}$$

In this manner, by calculating the pixel value q[x][y] of the provisional prediction image with reference to only the pixel value of the restricted region, the Planar prediction can be used also in a case that random access is implemented using the restricted region.

Based on the above, in a case that the neighboring reference pixels used in the Planar prediction in the intra CU in the restricted region are located across the non-restricted region (second region), the intra prediction unit 3104 performs the prediction image generation by means of the Planar prediction by replacing the neighboring reference pixels of the non-restricted region with the pixels in the restricted region.

DC Prediction

The DC prediction unit 31042 derives a DC prediction value corresponding to an average value of the filtered reference image s[x][y], and outputs a provisional prediction image q[x][y] using the DC prediction value as the pixel value.

Angular Prediction

The Angular prediction unit 31043 generates the provisional prediction image q[x][y] by using the filtered reference image s[x][y] in the prediction direction (reference direction) indicated by the intra prediction mode, and outputs the provisional prediction image q[x][y] to the prediction image correction unit 3105.

Restricted Region and MPM Prediction

In a case that the target block is the restricted region (IsRA (xPb, yPb) is true) and the reference position (xNbX, yNbX) of the neighboring block of the target block is the non-restricted region (IsRA (xNbX, yNbX) is false), the intra prediction parameter decoder 304 (MPM candidate list derivation unit 30421) does not use the value of the neighboring block for derivation of the MPM candidate. Specifically, in a case that the target block is the restricted region (IsRA (xPb, yPb) is true) and the reference position (xNbX, yNbX) of the neighboring block of the target block is the restricted region (IsRA (xNbX, yNbX) is true), the intra prediction parameter decoder 304 uses the position (xNbX, yNbX) for an MPM candidate candIntraPredModeX.

For example, in a case that the new refreshed region is shifted from the left to the right as in FIG. 13(a) (seq_refresh_mode=0 and seq_refresh_direction=0), the target block is the restricted region (IsRA (xPb, yPb) is true), and the neighboring position (xPb+wPb, yPb−1) on the right side of the target block is the restricted region (IsRA (xPb+wPb, yPb−1) is true), the intra prediction parameter decoder 304 uses the value of the right neighboring position for derivation of the MPM candidate.

For example, in a case that the new refreshed region is shifted from the right to the left as in FIG. 13(b) (seq_refresh_mode=0 and seq_refresh_direction=1), the target block is the restricted region (IsRA (xPb, yPb) is true), and the neighboring position (xPb−1, yPb) on the left side of the target block is the restricted region (IsRA (xPb−1, yPb) is true), the intra prediction parameter decoder 304 uses the value of the left neighboring position for derivation of the MPM candidate.

Restricted Region and Angular Prediction

Figure 27:
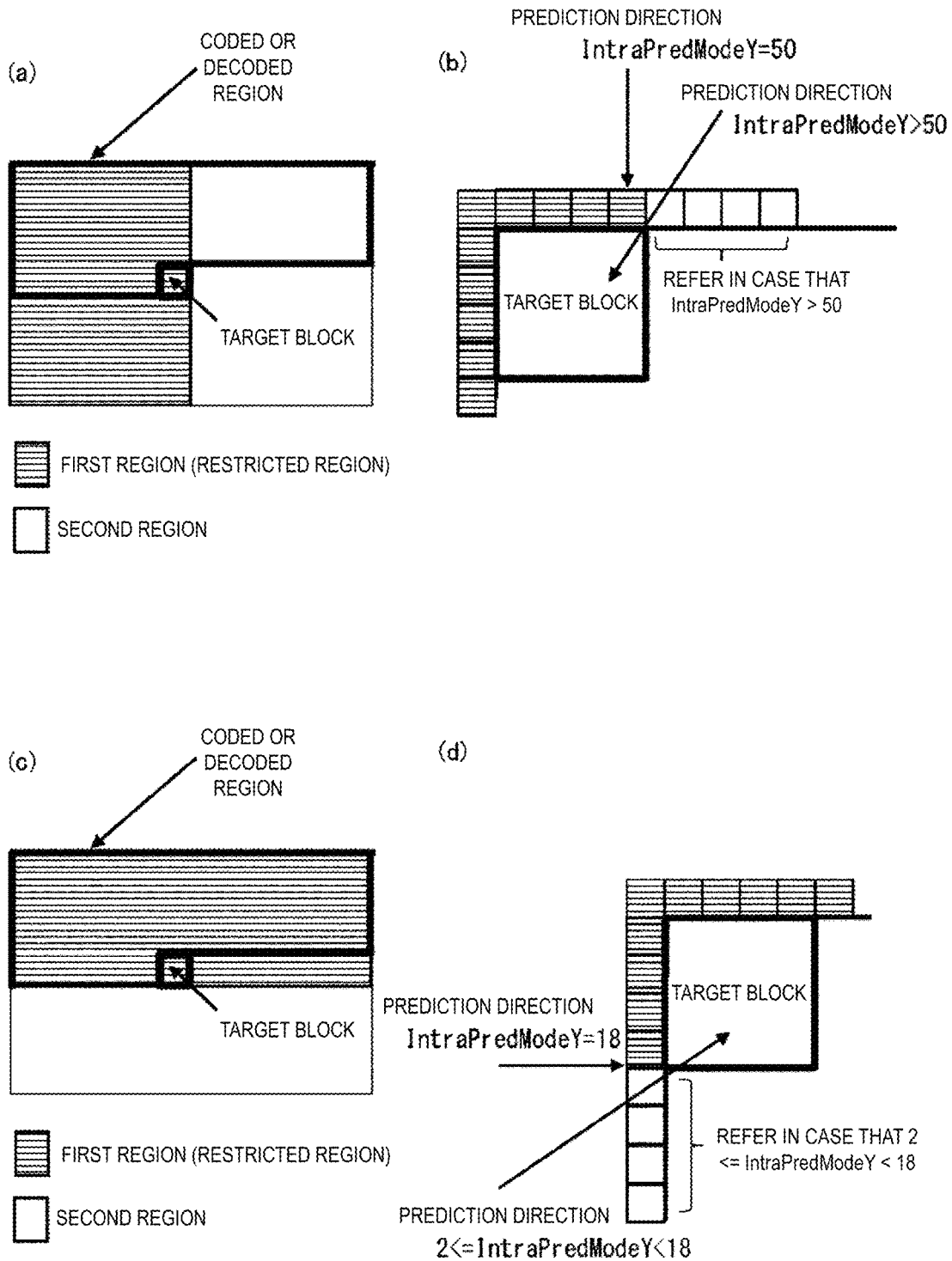
FIG. 27 is a diagram illustrating relationships between the restricted region and the intra prediction mode (mode number) in a case of the intra prediction.

In a case that the restricted region extends from the left to the right (seq_refresh_mode=0 and seq_refresh_direction=0), in the Angular prediction, the intra prediction mode (IntraPredModeY>IntraPredModeVer) that is larger than the vertical prediction mode (IntraPredModeVer=50) in FIG. 5 refers to the pixels of the non-restricted region at the boundary between the restricted region and the non-restricted region. For example, as illustrated in FIGS. 27(a) and (b), in a case that the restricted region extends from the left to the right (seq_refresh_mode=0 and seq_refresh_direction=0), the reference pixel adjacent to the upper right of the target block is included in the non-restricted region. In other words, s[x][−1] (x>=wPb) is the pixel value of the non-restricted region, where wPb represents the width of the target block. Thus, in a case that random access is implemented by using the restricted region, the intra prediction mode is restricted to IntraPredModeVer or less (IntraPredModeY<=IntraPredModeVer).

Specifically, in a case that the target block is the restricted region (IsRA (xPb, yPb) is true), a region on the right side of the target block is the non-restricted region (IsRA (xPb+wPb, yPb−1) is false), and a value larger than IntraPredModeVer is derived as the MPM candidate, the intra prediction parameter decoder 304 (MPM candidate list derivation unit 30421) considers that the MPM candidate is not available and does not insert the MPM candidate into the MPM candidate list mpmCandList[ ]. In this case, in a case that the derived intra prediction mode is larger than IntraPredModeVer, the intra prediction parameter decoder 304 may clip to IntraPredModeVer.

IntraPredMode=Min(IntraPredMode, IntraPredModeVer)

In contrast, in a case that the new refreshed region is shifted from the right to the left as in FIG. 13(b) (seq_refresh_mode=0 and seq_refresh_direction=1), that is, a region on the left side of the target block is the non-restricted region (IsRA (xPb−1, yPb) is false), and a value smaller than IntraPredModeVer is derived as the MPM candidate, the intra prediction parameter decoder 304 considers that the MPM candidate is not available and does not insert the MPM candidate into the MPM candidate list mpmCandList[ ]. In this case, in a case that the derived intra prediction mode is smaller than IntraPredModeVer, the intra prediction parameter decoder 304 may clip to IntraPredModeVer.

IntraPredMode=Max(IntraPredMode, IntraPredModeVer)

On the other hand, regarding the intra prediction parameter decoder 304, in a case that the new refreshed region is shifted in the vertical direction as in FIG. 13(c), for example, the restricted region extends from the upper side to the bottom side as illustrated in FIGS. 27(c) and (d) (seq_refresh_mode=1 and seq_refresh_direction=0), the reference pixel adjacent to the bottom left of the target block is included in the non-restricted region. In other words, s[−1][y] (y>=hPb) is the pixel value of the non-restricted region, where hPb represents the height of the target block. Thus, the intra prediction mode is restricted to IntraPredModeHor (=18) or more, which is the horizontal prediction mode (IntraPredModeY>=IntraPredModeHor).

Specifically, in a case that the neighboring region on the left side of the target block is the non-restricted region (IsRA (xPb, yPb−1) is false) and a value smaller than IntraPredModeHor is derived as the MPM candidate, the intra prediction parameter decoder 304 considers that the MPM candidate is not available and does not insert the MPM candidate into the MPM candidate list mpmCandList[ ]. In this case, in a case that the derived intra prediction mode is smaller than IntraPredModeHor, the intra prediction parameter decoder 304 may clip to IntraPredModeHor.

IntraPredMode=Max(IntraPredMode, IntraPredModeHor)

In contrast, in a case that the new refreshed region is shifted from the bottom side to the upper side as in FIG. 13(d) (seq_refresh_mode=1 and seq_refresh_direction=1), that is, the neighboring region on the upper side of the target block is the non-restricted region (IsRA (xPb−1, yPb−1) is false), and a value larger than IntraPredModeHor is derived as the MPM candidate, the intra prediction parameter decoder 304 considers that the MPM candidate is not available and does not insert the MPM candidate into the MPM candidate list mpmCandList[ ]. In this case, in a case that the derived intra prediction mode is larger than IntraPredModeHor, the intra prediction parameter decoder 304 may clip to IntraPredModeHor.

IntraPredMode=Min(IntraPredMode, IntraPredModeHor)

In this manner, by restricting the intra prediction mode, the Angular prediction can be used also in a case that random access is implemented by using the new refreshed region.

Based on the above, in a case that the neighboring reference pixels are located across the non-restricted region (second region) in the intra CU in the restricted region, the intra prediction parameter decoder 304 eliminates the Angular prediction mode that uses the region.

Based on the above, in a case that the neighboring reference pixels are located across the non-restricted region (second region) in the intra CU in the restricted region, the intra prediction parameter decoder 304 considers that the region is not available.

LM Prediction

The LM prediction unit 31044 predicts the pixel value of chrominance, based on the pixel value of luminance Specifically, this is a scheme in which a prediction image of a chrominance image (Cb, Cr) is generated based on a decoded luminance image by using a linear model. The LM prediction includes a Cross-Component Linear Model prediction (CCLM) prediction and a Multiple Model ccLM (MMLM) prediction. The CCLM prediction is a prediction scheme in which one linear model for predicting chrominance from luminance is used for one block. The MMLM prediction is a prediction scheme in which two or more linear models for predicting chrominance from luminance are used for one block.

Configuration of Prediction Image Correction Unit 3105

The prediction image correction unit 3105 corrects the provisional prediction image output from the prediction unit 3104, according to the intra prediction mode. Specifically, the prediction image correction unit 3105 derives a prediction image (corrected prediction image) Pred, which is obtained by correcting the provisional prediction image, by performing weighted addition (weighted average) on the unfiltered reference image and the provisional prediction image according to the distance between the reference region and a target prediction pixel for each pixel of the provisional prediction image. Note that, in some of the intra prediction modes, the output of the prediction unit 3104 may be directly used as the prediction image, without the prediction image correction unit 3105 correcting the provisional prediction image.

The inverse quantization and inverse transform processing unit 311 performs inverse quantization on a quantization transform coefficient input from the entropy decoder 301 to calculate a transform coefficient. These quantization transform coefficients are coefficients obtained by performing a frequency transform such as a Discrete Cosine Transform (DCT), a Discrete Sine Transform (DST), or a Karyhnen Loeve Transform (KLT) on prediction errors to quantize the prediction errors in coding processing. The inverse quantization and inverse transform processing unit 311 performs an inverse frequency transform such as an inverse DCT, an inverse DST, or an inverse KLT on the calculated transform coefficient to calculate a prediction error. The inverse quantization and inverse transform processing unit 311 outputs the prediction error to the addition unit 312.

The addition unit 312 generates the decoded image of the block by adding the prediction image of the block input from the prediction image generation unit 308 and the prediction errors input from the inverse quantization and inverse transform processing unit 311 for each pixel. The addition unit 312 stores the decoded image of the block in the reference picture memory 306, and further outputs the decoded image to the loop filter 305.

Configuration of Video Coding Apparatus

Figure 18:
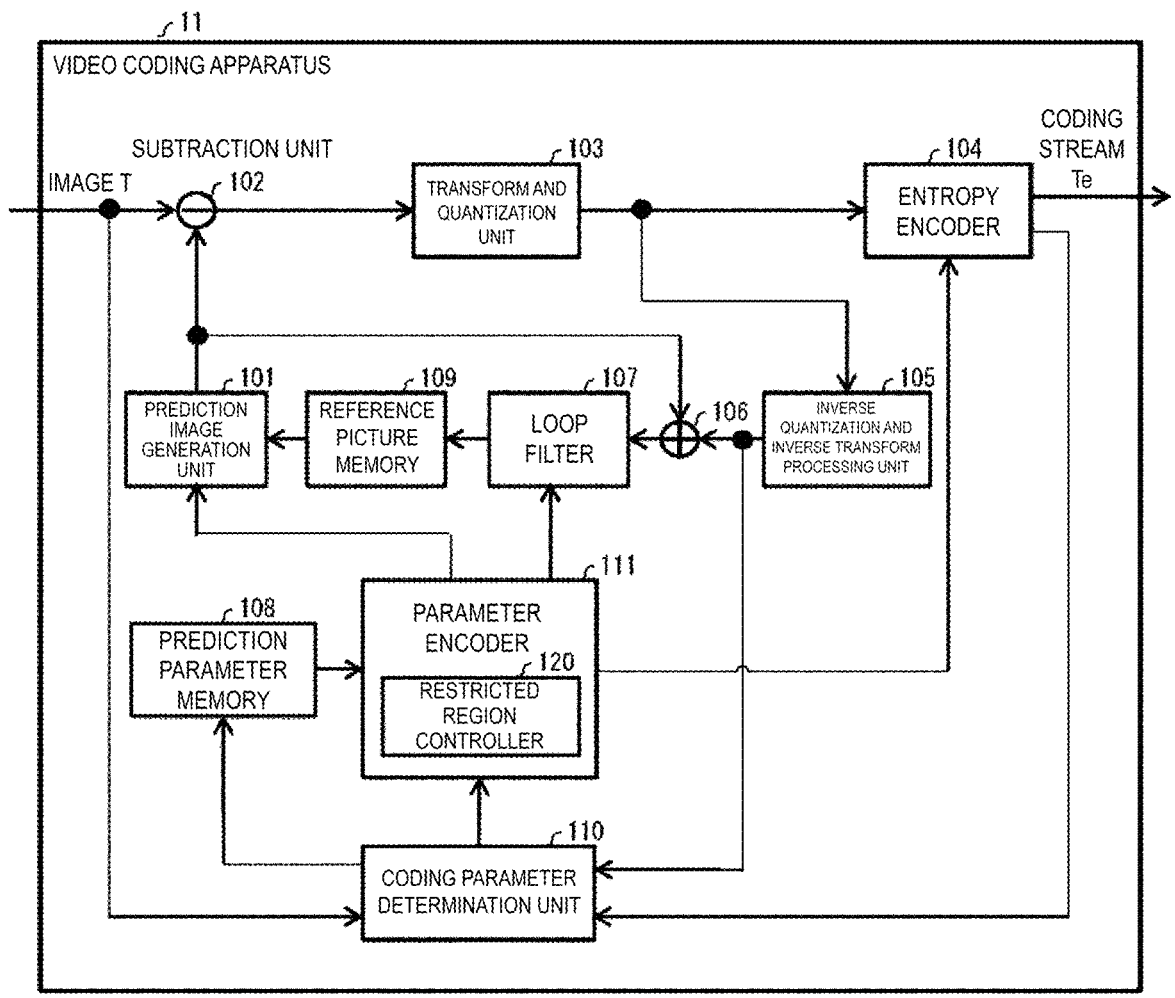
FIG. 18 is a block diagram illustrating a configuration of a video coding apparatus.

Next, a configuration of the video coding apparatus 11 according to the present embodiment will be described. FIG. 18 is a block diagram illustrating a configuration of the video coding apparatus 11 according to the present embodiment. The video coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (prediction parameter storage unit, frame memory) 108, a reference picture memory (reference image storage unit, frame memory) 109, a coding parameter determination unit 110, a parameter encoder 111, and an entropy encoder 104.

The prediction image generation unit 101 generates the prediction image for each CU being a region obtained by splitting each picture of the image T. The operation of the prediction image generation unit 101 is the same as that of the prediction image generation unit 308 already described, and thus description thereof will be omitted.

The subtraction unit 102 subtracts a pixel value of the prediction image of the block input from the prediction image generation unit 101 from a pixel value of the image T to generate a prediction error. The subtraction unit 102 outputs the prediction error to the transform and quantization unit 103.

The transform and quantization unit 103 calculates the transform coefficient by performing frequency transform on the prediction error input from the subtraction unit 102, and derives the quantization transform coefficient through quantization. The transform and quantization unit 103 outputs the quantization transform coefficient to the entropy encoder 104 and the inverse quantization and inverse transform processing unit 105.

The inverse quantization and inverse transform processing unit 105 is the same as the inverse quantization and inverse transform processing unit 311 (FIG. 17) of the video decoding apparatus 31, and thus description thereof is omitted. The calculated prediction error is output to the addition unit 106.

The parameter encoder 111 includes a restricted region controller 120, and an inter prediction parameter encoder 112 and an intra prediction parameter encoder 113 (not illustrated).

The restricted region controller 120 includes a header encoder 1110, a CT information encoder 1111, a CU encoder 1112 (prediction mode encoder), and an inter prediction parameter encoder 112 and an intra prediction parameter encoder 113 (not illustrated). The CU encoder 1112 further includes a TU encoder 1114.

General operation of each module will now be described. The parameter encoder 111 performs coding processing of parameters such as header information, split information, prediction information, and quantization transform coefficients.

The CT information encoder 1111 codes the QT or MT (BT, TT) split information or the like from the coded data.

The CU encoder 1112 codes the prediction information, a TU split flag split_transform_flag, CU residual flags cbf_cb, cbf_cr, and cbf_luma, or the like.

In a case that the prediction error is included in the TU, the TU encoder 1114 codes the QP update information (quantization correction value) and the quantization prediction error (residual_coding).

The entropy encoder 104 transforms the syntax element supplied from a supply source into binary data, generates coded data by using an entropy coding scheme such as CABAC, and outputs the coded data. The supply source of the syntax element is the CT information encoder 1111 and the CU encoder 1112. Examples of the syntax element include the inter prediction parameter (the prediction mode predMode, the merge flag merge_flag, the merge index merge_idx, the inter prediction indicator inter_pred_idc, the reference picture index refIdxLX, the prediction vector index mvp_LX_idx, the difference vector mvdLX), the intra prediction parameter (prev_intra_luma_pred_flag, mpm_idx, rem_selected_mode_flag, rem_selected_mode, rem_non_selected_mode), the quantization transform coefficient, and the like.

The entropy encoder 104 generates the coding stream Te by performing entropy coding on the split information, the prediction parameter, the quantization transform coefficient, and the like, and outputs the coding stream Te.

Configuration of Inter Prediction Parameter Encoder

The inter prediction parameter encoder 112 derives inter prediction parameters based on the prediction parameters input from the coding parameter determination unit 110. The inter prediction parameter encoder 112 includes a partly identical configuration to a configuration in which the inter prediction parameter decoder 303 derives inter prediction parameters.

Figure 28:
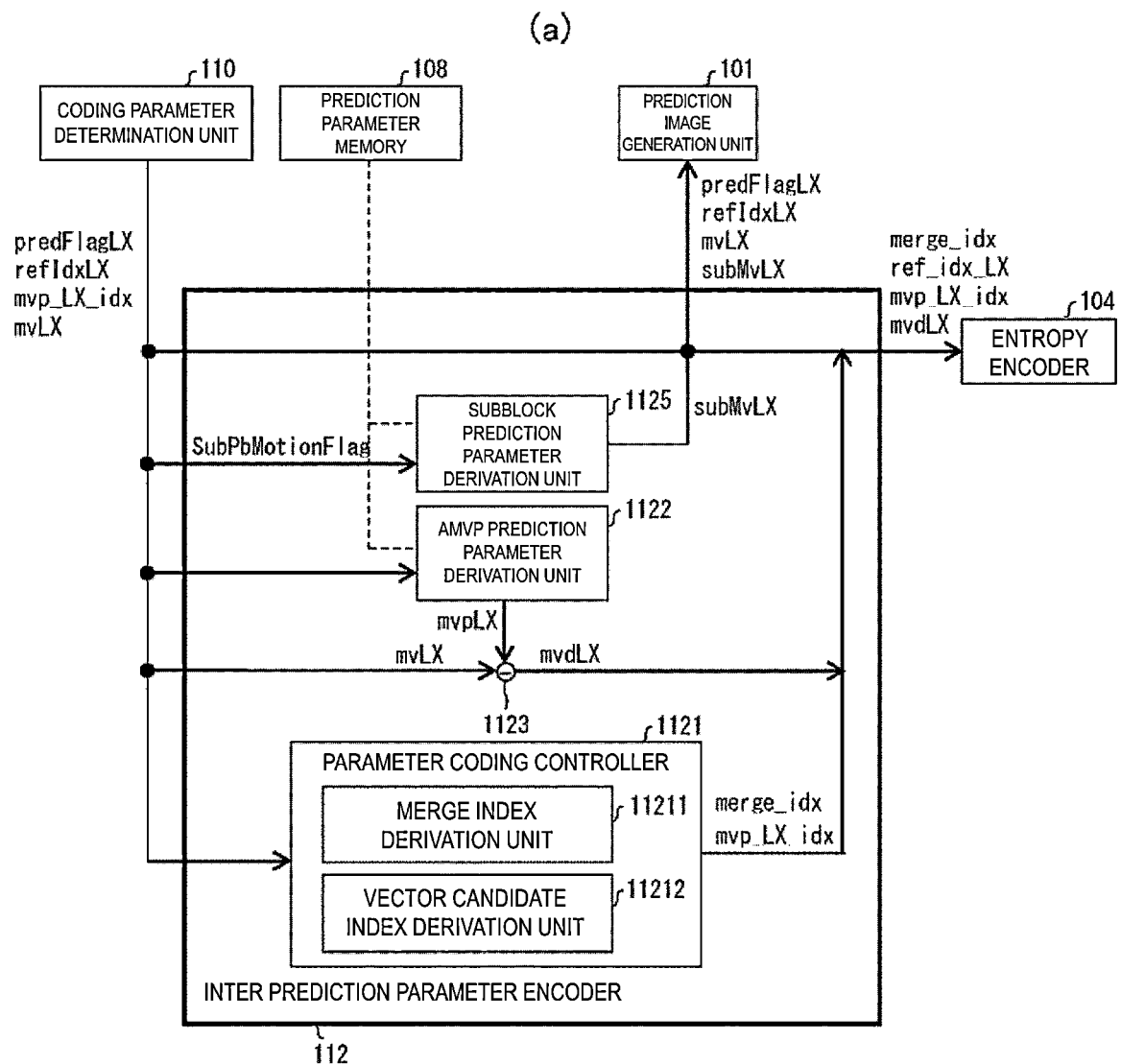
FIG. 28 is a schematic diagram illustrating a configuration of an inter prediction parameter encoder.

A configuration of the inter prediction parameter encoder 112 will be described. As illustrated in FIG. 28(a), the inter prediction parameter encoder 112 includes a parameter coding controller 1121, an AMVP prediction parameter derivation unit 1122, a subtraction unit 1123, a subblock prediction parameter derivation unit 1125, and the like. The parameter coding controller 1121 includes a merge index derivation unit 11211 and a vector candidate index derivation unit 11212. The merge index derivation unit 11211, the vector candidate index derivation unit 11212, the AMVP prediction parameter derivation unit 1122, and the subblock prediction parameter derivation unit 1125 may be collectively referred to as a motion vector derivation unit (motion vector derivation apparatus). The inter prediction parameter encoder 112 outputs the motion vector (mvLX, subMvLX), the reference picture index refIdxLX, the inter prediction indicator inter_pred_idc, or information indicating these to the prediction image generation unit 101. Further, the inter prediction parameter encoder 112 outputs the merge flag merge_flag, the merge index merge_idx, the inter prediction indicator inter_pred_idc, the reference picture index refIdxLX, a prediction vector index mvp_1X_idx, the difference vector mvdLX, and a subblock prediction mode flag subPbMotionFlag to the entropy encoder 104.

The merge index derivation unit 11211 derives the merge index merge_idx by comparing the motion vector and the reference picture index input from the coding parameter determination unit 110 with the motion vector and the reference picture index of the block of the merge candidate read from the prediction parameter memory 108, and outputs the merge index merge_idx to the entropy encoder 104. The merge candidate is a reference block present in a predetermined range from the target CU (for example, a block that is adjacent to the left edge, the bottom left edge, the upper left edge, the upper edge, or the upper right edge of the target block), and is a block on which the coding processing is completed. The vector candidate index derivation unit 11212 derives the prediction vector index mvp_1X_idx.

The AMVP prediction parameter derivation unit 1122 derives the prediction vector mvpLX, based on the motion vector mvLX. The AMVP prediction parameter derivation unit 1122 outputs the prediction vector mvpLX to the subtraction unit 1123. Note that the reference picture index refIdxLX and the prediction vector index mvp_1X_idx are output to the entropy encoder 104.

The subtraction unit 1123 generates the difference vector mvdLX by subtracting the prediction vector mvpLX which is output of the AMVP prediction parameter derivation unit 1122 from the motion vector mvLX which is input from the coding parameter determination unit 110. The difference vector mvdLX is output to the entropy encoder 104.

Configuration of Intra Prediction Parameter Encoder 113

The intra prediction parameter encoder 113 derives a format for coding (for example, mpm_idx, rem_intra_luma_pred_mode, and the like) from the intra prediction mode IntraPredMode input from the coding parameter determination unit 110. The intra prediction parameter encoder 113 partially includes the same configuration as the configuration in which the intra prediction parameter decoder 304 derives the intra prediction parameter.

Figure 29:
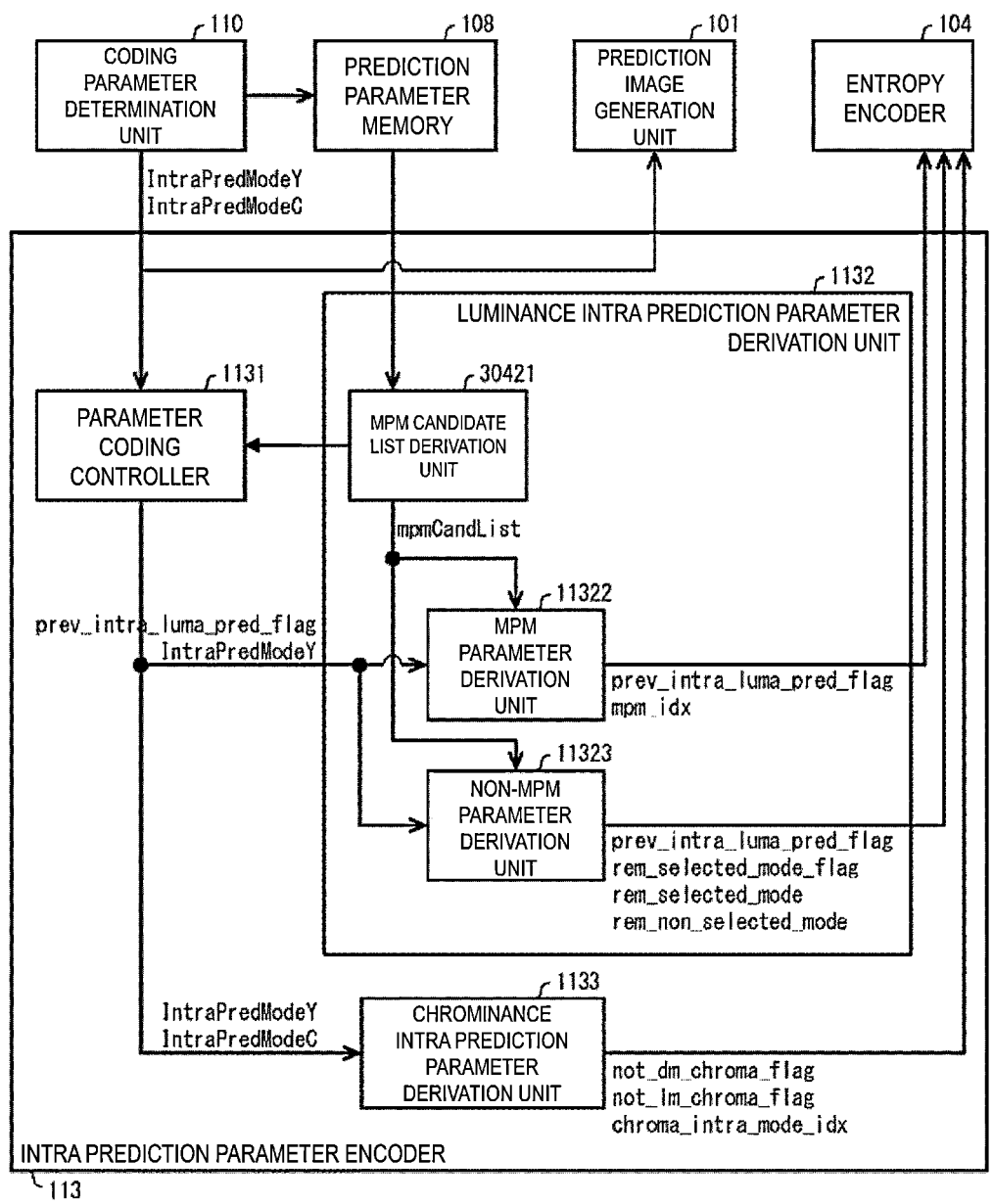
FIG. 29 is a schematic diagram illustrating a configuration of an intra prediction parameter encoder.

FIG. 29 is a schematic diagram illustrating a configuration of the intra prediction parameter encoder 113 of the parameter encoder 111. The intra prediction parameter encoder 113 includes a parameter coding controller 1131, a luminance intra prediction parameter derivation unit 1132, and a chrominance intra prediction parameter derivation unit 1133.

The parameter coding controller 1131 receives input of a luminance prediction mode IntraPredModeY and a chrominance prediction mode IntraPredModeC from the coding parameter determination unit 110. The parameter coding controller 1131 determines prev_intra_luma_pred_flag with reference to the MPM candidate list mpmCandList[ ] of the reference candidate list derivation unit 30421. Then, the parameter coding controller 1131 outputs prev_intra_luma_pred_flag and the luminance prediction mode IntraPredModeY to the luminance intra prediction parameter derivation unit 1132. The parameter coding controller 1131 outputs the chrominance prediction mode IntraPredModeC to the chrominance intra prediction parameter derivation unit 1133.

The luminance intra prediction parameter derivation unit 1132 includes an MPM candidate list derivation unit 30421 (candidate list derivation unit), an MPM parameter derivation unit 11322, and a non-MPM parameter derivation unit 11323 (encoder, derivation unit).

The MPM candidate list derivation unit 30421 derives the MPM candidate list mpmCandList[ ] with reference to the intra prediction mode of the neighboring block stored in the prediction parameter memory 108. In a case that prev_intra_luma_pred_flag is 1, the MPM parameter derivation unit 11322 derives mpm_idx from the luminance prediction mode IntraPredModeY and the MPM candidate list mpmCandList[ ], and outputs mpm_idx to the entropy encoder 104. In a case that prev_intra_luma_pred_flag is 0, the non-MPM parameter derivation unit 11323 derives RemIntraPredMode from the luminance prediction mode IntraPredModeY and the MPM candidate list mpmCandList[ ], and outputs rem_selected_mode or rem_non_selected_mode to the entropy encoder 104.

The chrominance intra prediction parameter derivation unit 1133 derives not_dm_chroma_flag, not_lm_chroma_flag, and chroma_intra_mode_idx from the luminance prediction mode IntraPredModeY and the chrominance prediction mode IntraPredModeC, and outputs not_dm_chroma_flag, not_lm_chroma_flag, and chroma_intra_mode_idx.

The addition unit 106 generates the decoded image by adding the pixel value of the prediction image of the block input from the prediction image generation unit 101 and the prediction error input from the inverse quantization and inverse transform processing unit 105 for each pixel. The addition unit 106 stores the generated decoded image in the reference picture memory 109.

The loop filter 107 applies the deblocking filter, the SAO, and the ALF to the decoded image generated by the addition unit 106. Note that the loop filter 107 need not necessarily include the three types of the filters described above, and may include, for example, only the deblocking filter.

The prediction parameter memory 108 stores the prediction parameter generated by the coding parameter determination unit 110 at a predetermined position for each target picture and CU.

The reference picture memory 109 stores the decoded image generated by the loop filter 107 at a predetermined position for each target picture and CU.

The coding parameter determination unit 110 selects one set out of multiple sets of the coding parameters. The coding parameter is the QT, BT, or TT split information described above, the prediction parameter, or a parameter to be a target of coding that is generated in relation to these. The prediction image generation unit 101 generates the prediction image by using these coding parameters.

The coding parameter determination unit 110 calculates an RD cost value indicating the size of information amount and a coding error for each of the multiple sets. The RD cost value is, for example, a sum of a code amount and a value obtained by multiplying a square error by a coefficient $\lambda$. The code amount is an information amount of the coding stream Te that is obtained by performing entropy coding on the quantization error and the coding parameter. The square error is a sum of squares of the prediction error calculated in the subtraction unit 102. The coefficient $\lambda$ is a real number that is larger than zero configured in advance. The coding parameter determination unit 110 selects a set of coding parameters whose calculated cost value has a minimum value. In this manner, the entropy encoder 104 outputs the selected coding parameter set as the coding stream Te. The coding parameter determination unit 110 stores the determined coding parameter to the prediction parameter memory 108.

Note that, some of the video coding apparatus 11 and the video decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction image generation unit 101, the subtraction unit 102, the transform and quantization unit 103, the entropy encoder 104, the inverse quantization and inverse transform processing unit 105, the loop filter 107, the coding parameter determination unit 110, and the parameter encoder 111, may be realized by a computer. In that case, this configuration may be realized by recording a program for realizing such control functions on a computer-readable recording medium and causing a computer system to read the program recorded on the recording medium for execution. Note that the "computer system" mentioned here refers to a computer system built into either the video coding apparatus 11 or the video decoding apparatus 31 and is assumed to include an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system. Moreover, the "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case. Furthermore, the above-described program may be one for realizing some of the above-described functions, and also may be one capable of realizing the above-described functions in combination with a program already recorded in a computer system.

In the video decoding apparatus according to one aspect of the present invention, a picture is split into the restricted region and the non-restricted region, and prediction is performed by using the intra prediction in which only the pixel of the restricted region in the picture is referred to or the inter prediction in which the restricted reference region of the reference picture of the picture is referred to for the block included in the restricted region, prediction is performed by using the intra prediction in which the decoded pixel in the picture is referred to or the inter prediction in which the reference picture of the picture is referred to for the block included in the non-restricted region, and after decoding of the picture, the restricted region of the picture is configured as the restricted reference region.

In the video decoding apparatus according to one aspect of the present invention, a picture is split into the new refreshed region, the restricted region, and the non-restricted region, the intra prediction in which only the pixel of the restricted region is referred to is performed for the block included in the new refreshed region, the intra prediction in which only the pixel of the new refreshed region or the restricted region is referred to or the inter prediction in which the restricted reference region of the reference picture is referred to is performed for the block included in the restricted region, prediction is performed by using the intra prediction in which the decoded pixel in the picture is referred to or the inter prediction in which the reference picture of the picture is referred to for the block included in the non-restricted region, and after decoding of the picture, the restricted region to which the new refreshed region is added is configured as the restricted reference region.

In the video decoding apparatus according to one aspect of the present invention, a picture is split into the restricted region and the non-restricted region, the intra prediction in which only the pixel of the restricted region is referred to is performed for the block included in the new refreshed region in the restricted region, the intra prediction in which only the pixel of the new refreshed region or the restricted region is referred to or the inter prediction in which the restricted reference region of the reference picture is referred to is performed for the block included in the restricted region, prediction is performed by using the intra prediction in which the decoded pixel in the picture is referred to or the inter prediction in which the reference picture of the picture is referred to for the block included in the non-restricted region, and after decoding of the picture, the restricted region is configured as the restricted reference region.

In the video decoding apparatus according to one aspect of the present invention, in the new refreshed region, the regions decoded at the time t and the time t−1 overlap each other.

In the video coding apparatus according to one aspect of the present invention, a picture is split into the restricted region and the non-restricted region, prediction is performed by using the intra prediction in which only the pixel of the restricted region in the picture is referred to or the inter prediction in which the restricted reference region of the reference picture of the picture is referred to for the block included in the restricted region, prediction is performed by using the intra prediction in which the decoded pixel in the picture is referred to or the inter prediction in which the reference picture of the picture is referred to for the block included in the non-restricted region, and after coding of the picture, the restricted region of the picture is configured as the restricted reference region.

The video decoding apparatus according to one aspect of the present invention includes the deblocking filter. In filter processing of two blocks that are present across the restricted region and the non-restricted region, the deblocking filter turns off the filter processing of the block.

The video decoding apparatus according to one aspect of the present invention includes a deblocking filter. In filter processing of two blocks that are present across the restricted region and the non-restricted region, the deblocking filter turns off the filter processing of the block included in the restricted region.

In the video decoding apparatus according to one aspect of the present invention, the width of the overlapping region is derived from the number of pixels corrected through the filter processing and the minimum value of the width of the block.

The video decoding apparatus according to one aspect of the present invention includes a prediction image generation unit. At the boundary between the restricted region and the non-restricted region, the prediction image generation unit configures the pixel of the non-restricted region to be "not available as the reference pixel", and configures the pixel value of the restricted region in the reference region of the target block.

The video decoding apparatus according to one aspect of the present invention includes a prediction image generation unit. At the boundary between the restricted region and the non-restricted region, the prediction image generation unit turns off the reference pixel filter for the pixel that refers to the pixel of the non-restricted region.

The video decoding apparatus according to one aspect of the present invention includes a prediction image generation unit. In a case that the reference pixel in the prediction direction indicated by the intra prediction mode includes the non-restricted region in the target block in the restricted region, the prediction image generation unit eliminates the intra prediction mode.

The video decoding apparatus according to one aspect of the present invention includes a prediction image generation unit. In a case that the reference pixel in the prediction direction indicated by the intra prediction mode includes the non-restricted region in the target block in the restricted region, the prediction image generation unit configures the reference pixel to be "not available".

The video decoding apparatus according to one aspect of the present invention includes a prediction image generation unit. In a case that the pixel referred to in the Planar prediction includes the non-restricted region in the target block in the restricted region, the prediction image generation unit replaces the reference pixel of the non-restricted region with the pixel of the restricted region.

The video decoding apparatus according to one aspect of the present invention includes a prediction image generation unit. In a case that the pixel referred to in the Planar prediction includes the non-restricted region in the target block in the restricted region, the prediction image generation unit eliminates the Planar prediction mode.

The video decoding apparatus according to one aspect of the present invention includes a motion compensation unit. In a case that the pixel of the picture that the target block of the restricted region refers to is present in the non-restricted reference region, the motion compensation unit performs padding processing of replacing the pixel value of the non-restricted reference region in the reference picture with the pixel value of the restricted reference region.

The video decoding apparatus according to one aspect of the present invention includes a motion compensation unit.

In a case that the pixel of the picture that the target block of the restricted region refers to is present in the non-restricted reference region, the motion compensation unit restricts (clips) the vector pointing to the non-restricted reference region to the inside of the restricted reference boundary.

The video decoding apparatus according to one aspect of the present invention includes a motion compensation unit. The motion compensation unit selects, from the merge candidate list, a neighboring block including a combination of such a reference picture index and a motion vector that the region referred to by the target block of the restricted region is included in the restricted reference region, and configures the neighboring block as the merge candidate.

The video decoding apparatus according to one aspect of the present invention includes a motion compensation unit. In a case that the reference region indicated by the reference picture index and the motion vector of the merge candidate is not included in the restricted reference region in the target block of the restricted region, the motion compensation unit configures so that the reference region of the target block is included in the restricted reference region by correcting the reference picture index and scaling the motion vector.

A part or all of the video coding apparatus 11 and the video decoding apparatus 31 in the embodiments described above may be realized as an integrated circuit such as a Large Scale Integration (LSI). Each function block of the video coding apparatus 11 and the video decoding apparatus 31 may be individually realized as processors, or part or all may be integrated into processors. The circuit integration technique is not limited to LSI, and the integrated circuits for the functional blocks may be realized as dedicated circuits or a multi-purpose processor. In a case that with advances in semiconductor technology, a circuit integration technology with which an LSI is replaced appears, an integrated circuit based on the technology may be used.

The embodiment of the present invention has been described in detail above referring to the drawings, but the specific configuration is not limited to the above embodiments and various amendments can be made to a design that fall within the scope that does not depart from the gist of the present invention.

Application Examples

The above-mentioned video coding apparatus 11 and the video decoding apparatus 31 can be utilized being installed to various apparatuses performing transmission, reception, recording, and regeneration of videos. Note that, the video may be a natural video imaged by camera or the like, or may be an artificial video (including CG and GUI) generated by computer or the like.

At first, referring to FIG. 30, it will be described that the above-mentioned video coding apparatus 11 and the video decoding apparatus 31 can be utilized for transmission and reception of videos.

Figure 30:
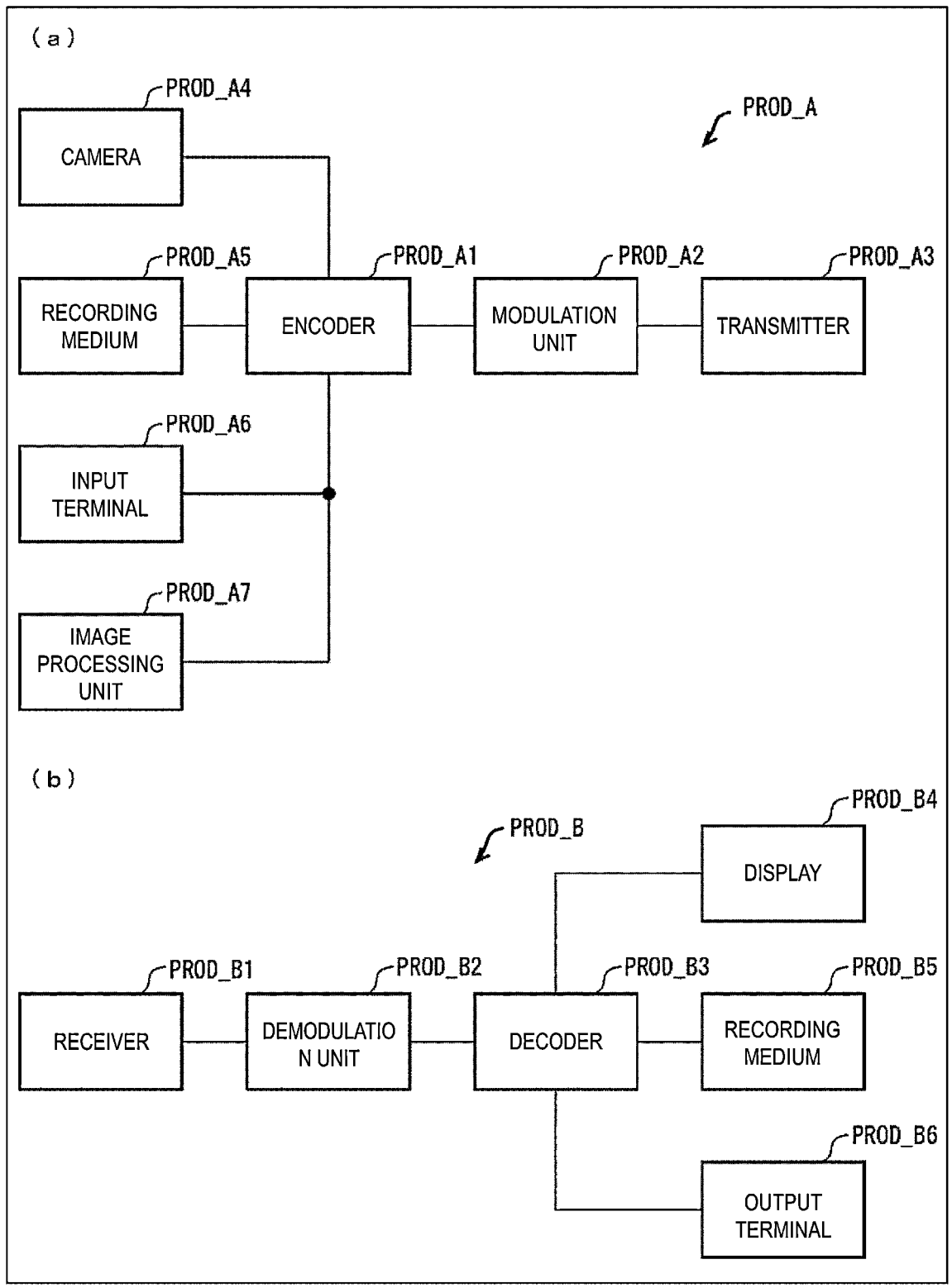
FIG. 30 is a diagram illustrating configurations of a transmitting apparatus equipped with the video coding apparatus and a receiving apparatus equipped with the video decoding apparatus according to the present embodiment. (a) thereof illustrates the transmitting apparatus equipped with the video coding apparatus, and (b) thereof illustrates the receiving apparatus equipped with the video decoding apparatus.

FIG. 30($a$) is a block diagram illustrating a configuration of a transmitting apparatus PROD_A installed with the video coding apparatus 11. As illustrated in FIG. 30($a$), the transmitting apparatus PROD_A includes an encoder PROD_A1 which obtains coded data by coding videos, a modulation unit PROD_A2 which obtains modulation signals by modulating carrier waves with the coded data obtained by the encoder PROD_A1, and a transmitter PROD_A3 which transmits the modulation signals obtained by the modulation unit PROD_A2. The above-mentioned video coding apparatus 11 is utilized as the encoder PROD_A1.

The transmitting apparatus PROD_A may further include a camera PROD_A4 that images videos, a recording medium PROD_A5 that records videos, an input terminal PROD_A6 for inputting videos from the outside, and an image processing unit A7 which generates or processes images, as supply sources of videos to be input into the encoder PROD_A1. Although an example configuration in which the transmitting apparatus PROD_A includes all of the constituents is illustrated in FIG. 30(a), some of the constituents may be omitted.

Note that the recording medium PROD_A5 may record videos which are not coded or may record videos coded in a coding scheme for recording different from a coding scheme for transmission. In the latter case, a decoder (not illustrated) to decode coded data read from the recording medium PROD_A5 according to the coding scheme for recording may be present between the recording medium PROD_A5 and the encoder PROD_A1.

FIG. 30(b) is a block diagram illustrating a configuration of a receiving apparatus PROD_B installed with the video decoding apparatus 31. As illustrated in FIG. 30(b), the receiving apparatus PROD_B includes a receiver PROD_B1 that receives modulation signals, a demodulation unit PROD_B2 that obtains coded data by demodulating the modulation signals received by the receiver PROD_B1, and a decoder PROD_B3 that obtains videos by decoding the coded data obtained by the demodulation unit PROD_B2. The above-mentioned video decoding apparatus 31 is utilized as the decoder PROD_B3.

The receiving apparatus PROD_B may further include a display PROD_B4 that displays videos, a recording medium PROD_B5 for recording the videos, and an output terminal PROD_B6 for outputting the videos to the outside, as supply destinations of the videos to be output by the decoder PROD_B3. Although an example configuration that the receiving apparatus PROD_B includes all of the constituents is illustrated in FIG. 30(b), some of the constituents may be omitted.

Note that the recording medium PROD_B5 may record videos which are not coded, or may record videos which are coded in a coding scheme for recording different from a coding scheme for transmission. In the latter case, an encoder (not illustrated) that codes videos acquired from the decoder PROD_B3 according to the coding scheme for recording may be present between the decoder PROD_B3 and the recording medium PROD_B5.

Note that a transmission medium for transmitting the modulation signals may be a wireless medium or may be a wired medium. In addition, a transmission mode in which the modulation signals are transmitted may be a broadcast (here, which indicates a transmission mode in which a transmission destination is not specified in advance) or may be a communication (here, which indicates a transmission mode in which a transmission destination is specified in advance). That is, the transmission of the modulation signals may be realized by any of a wireless broadcast, a wired broadcast, a wireless communication, and a wired communication.

For example, a broadcasting station (e.g., broadcasting equipment)/receiving station (e.g., television receiver) for digital terrestrial broadcasting is an example of the transmitting apparatus PROD_A/receiving apparatus PROD_B for transmitting and/or receiving the modulation signals in the wireless broadcast. In addition, a broadcasting station (e.g., broadcasting equipment)/receiving station (e.g., television receivers) for cable television broadcasting is an example of the transmitting apparatus PROD_A/receiving apparatus PROD_B for transmitting and/or receiving the modulation signals in the wired broadcast.

In addition, a server (e.g., workstation)/client (e.g., television receiver, personal computer, smartphone) for Video On Demand (VOD) services, video hosting services and the like using the Internet is an example of the transmitting apparatus PROD_A/receiving apparatus PROD_B for transmitting and/or receiving the modulation signals in communication (usually, any of a wireless medium or a wired medium is used as a transmission medium in LAN, and the wired medium is used as a transmission medium in WAN). Here, personal computers include a desktop PC, a laptop PC, and a tablet PC. In addition, smartphones also include a multifunctional mobile telephone terminal.

A client of a video hosting service has a function of coding a video imaged with a camera and uploading the video to a server, in addition to a function of decoding coded data downloaded from a server and displaying on a display. Thus, the client of the video hosting service functions as both the transmitting apparatus PROD_A and the receiving apparatus PROD_B.

Figure 31:
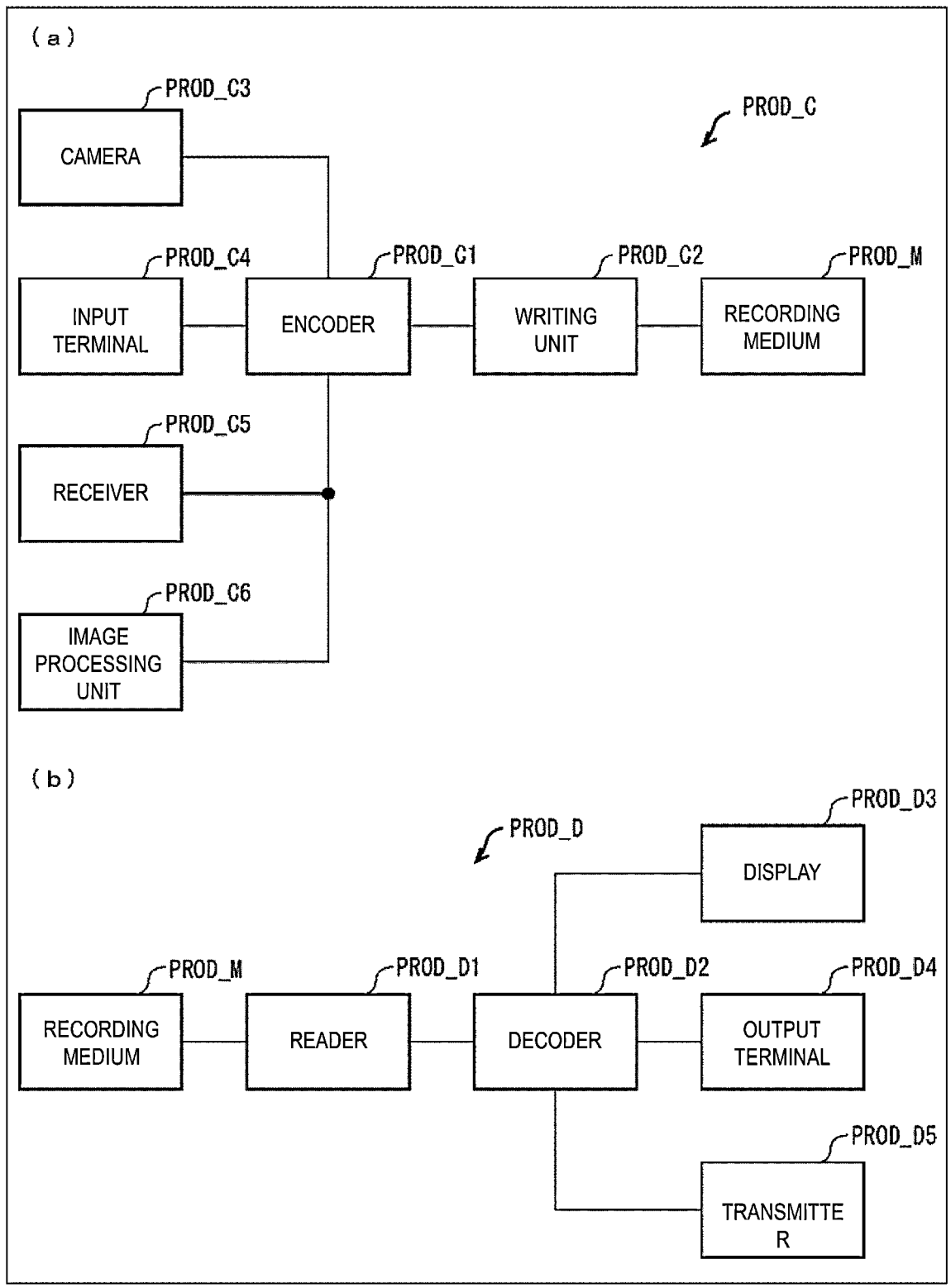
FIG. 31 is a diagram illustrating configurations of a recording apparatus equipped with the video coding apparatus and a reconstruction apparatus equipped with the video decoding apparatus according to the present embodiment. (a) thereof illustrates the recording apparatus equipped with the video coding apparatus, and (b) thereof illustrates the reconstruction apparatus equipped with the video decoding apparatus.

Next, referring to FIG. 31, it will be described that the above-mentioned video coding apparatus 11 and the video decoding apparatus 31 can be utilized for recording and regeneration of videos.

FIG. 31(a) is a block diagram illustrating a configuration of a recording apparatus PROD_C installed with the above-mentioned video coding apparatus 11. As illustrated in the figure, the recording apparatus PROD_C includes an encoder PROD_C1 that obtains coded data by coding a video, and a writing unit PROD_C2 that writes the coded data obtained by the encoder PROD_C1 in a recording medium PROD_M. The above-mentioned video coding apparatus 11 is utilized as the encoder PROD_C1.

Note that the recording medium PROD_M may be (1) a type of recording medium built in the recording apparatus PROD_C such as Hard Disk Drive (HDD) or Solid State Drive (SSD), may be (2) a type of recording medium connected to the recording apparatus PROD_C such as an SD memory card or a Universal Serial Bus (USB) flash memory, and may be (3) a type of recording medium loaded in a drive apparatus (not illustrated) built in the recording apparatus PROD_C such as Digital Versatile Disc (DVD: trade name) or Blu-ray (trade name)/Blu-ray Disc (trade name)

In addition, the recording apparatus PROD_C may further include a camera PROD_C3 that images a video, an input terminal PROD_C4 for inputting the video from the outside, a receiver PROD_C5 for receiving the video, and an image processing unit PROD_C6 that generates or processes images, as supply sources of the video input into the encoder PROD_C1. Although an example configuration that the recording apparatus PROD_C includes all of the constituents is illustrated in the figure, some of the constituents may be omitted.

Note that the receiver PROD_C5 may receive a video which is not coded, or may receive coded data coded in a coding scheme for transmission different from the coding scheme for recording. In the latter case, a decoder for transmission (not illustrated) that decodes coded data coded in the coding scheme for transmission may be present between the receiver PROD_C5 and the encoder PROD_C1.

Examples of such recording apparatus PROD_C include, for example, a DVD recorder, a BD recorder, a Hard Disk Drive (HDD) recorder, and the like (in this case, the input terminal PROD_C4 or the receiver PROD_C5 is the main supply source of videos). In addition, a camcorder (in this case, the camera PROD_C3 is the main supply source of videos), a personal computer (in this case, the receiver PROD_C5 or the image processing unit C6 is the main supply source of videos), a smartphone (in this case, the camera PROD_C3 or the receiver PROD_C5 is the main supply source of videos), or the like is an example of the recording apparatus PROD_C as well.

FIG. 31(b) is a block illustrating a configuration of a reconstruction apparatus PROD_D installed with the above-mentioned video decoding apparatus 31. As illustrated in the figure, the reconstruction apparatus PROD_D includes a reading unit PROD_D1 which reads coded data written in the recording medium PROD_M, and a decoder PROD_D2 which obtains a video by decoding the coded data read by the reader PROD_D1. The above-mentioned video decoding apparatus 31 is utilized as the decoder PROD_D2.

Note that the recording medium PROD_M may be (1) a type of recording medium built in the reconstruction apparatus PROD_D such as HDD or SSD, may be (2) a type of recording medium connected to the reconstruction apparatus PROD_D such as an SD memory card or a USB flash memory, and may be (3) a type of recording medium loaded in a drive apparatus (not illustrated) built in the reconstruction apparatus PROD_D such as a DVD or a BD.

In addition, the reconstruction apparatus PROD_D may further include a display PROD_D3 that displays a video, an output terminal PROD_D4 for outputting the video to the outside, and a transmitter PROD_D5 that transmits the video, as the supply destinations of the video to be output by the decoder PROD_D2. Although an example configuration that the reconstruction apparatus PROD_D includes all of the constituents is illustrated in the figure, some of the constituents may be omitted.

Note that the transmitter PROD_D5 may transmit a video which is not coded or may transmit coded data coded in the coding scheme for transmission different from a coding scheme for recording. In the latter case, an encoder (not illustrated) that codes a video in the coding scheme for transmission may be present between the decoder PROD_D2 and the transmitter PROD_D5.

Examples of the reconstruction apparatus PROD_D include, for example, a DVD player, a BD player, an HDD player, and the like (in this case, the output terminal PROD_D4 to which a television receiver, and the like are connected is the main supply destination of videos). In addition, a television receiver (in this case, the display PROD_D3 is the main supply destination of videos), a digital signage (also referred to as an electronic signboard or an electronic bulletin board, and the like, and the display PROD_D3 or the transmitter PROD_D5 is the main supply destination of videos), a desktop PC (in this case, the output terminal PROD_D4 or the transmitter PROD_D5 is the main supply destination of videos), a laptop or tablet PC (in this case, the display PROD_D3 or the transmitter PROD_D5 is the main supply destination of videos), a smartphone (in this case, the display PROD_D3 or the transmitter PROD_D5 is the main supply destination of videos), or the like is an example of the reconstruction apparatus PROD_D.

Realization by Hardware and Realization by Software

Each block of the above-mentioned video decoding apparatus 31 and the video coding apparatus 11 may be realized as a hardware by a logical circuit formed on an integrated circuit (IC chip), or may be realized as a software using a Central Processing Unit (CPU).

In the latter case, each of the above-described apparatuses include a CPU that executes a command of a program to implement each of functions, a Read Only Memory (ROM) that stores the program, a Random Access Memory (RAM) to which the program is loaded, and a storage apparatus (recording medium), such as a memory, that stores the program and various kinds of data. In addition, an objective of the embodiments of the present invention can be achieved by supplying, to each of the apparatuses, the recording medium that records, in a computer readable form, program codes of a control program (executable program, intermediate code program, source program) of each of the apparatuses that is software for realizing the above-described functions and by reading and executing, by the computer (or a CPU or an MPU), the program codes recorded in the recording medium.

As the recording medium, for example, tapes including a magnetic tape, a cassette tape and the like, discs including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc (DVD: trade name)/CD Recordable (CD-R)/Blu-ray (trade name)/Blu-ray Disc (trade name), cards such as an IC card (including a memory card)/an optical card, semiconductor memories such as a mask ROM/Erasable Programmable Read-Only Memory (EPROM)/Electrically Erasable and Programmable Read-Only Memory (EEPROM: trade name)/a flash ROM, logical circuits such as a Programmable logic device (PLD) and a Field Programmable Gate Array (FPGA), or the like can be used.

In addition, each of the apparatuses is configured to be connectable to a communication network, and the program codes may be supplied through the communication network. The communication network is required to be capable of transmitting the program codes, but is not limited to a particular communication network. For example, the Internet, an intranet, an extranet, a Local Area Network (LAN), an Integrated Services Digital Network (ISDN), a Value-Added Network (VAN), a Community RAntenna television/Cable Television (CATV) communication network, a Virtual Private Network, a telephone network, a mobile communication network, a satellite communication network, and the like are available. In addition, a transmission medium constituting this communication network is also required to be a medium which can transmit a program code, but is not limited to a particular configuration or type of transmission medium. For example, a wired transmission medium such as Institute of Electrical and Electronic Engineers (IEEE) 1394, a USB, a power line carrier, a cable TV line, a telephone line, an Asymmetric Digital Subscriber Line (ADSL) line, and a wireless transmission medium such as infrared ray of Infrared Data Association (IrDA) or a remote control, BlueTooth (trade name), IEEE 802.11 wireless communication, High Data Rate (HDR), Near Field Communication (NFC), Digital Living Network Alliance (trade name) (DLNA: trade name), a cellular telephone network, a satellite channel, a terrestrial digital broadcast network are available. Note that the embodiments of the present invention can be also realized in the form of computer data signals embedded in a carrier such that the transmission of the program codes is embodied in electronic transmission.

The embodiments of the present invention are not limited to the above-described embodiments, and various modifications are possible within the scope of the claims. That is, an embodiment obtained by combining technical means modified appropriately within the scope defined by claims is included in the technical scope of the present invention as well.

INDUSTRIAL APPLICABILITY

The embodiments of the present invention can be preferably applied to a video decoding apparatus that decodes coded data in which image data is coded, and a video coding apparatus that generates coded data in which image data is coded. The embodiments of the present invention can be preferably applied to a data structure of coded data generated by the video coding apparatus and referred to by the video decoding apparatus.

CROSS-REFERENCE OF RELATED APPLICATION

This application claims the benefit of priority to JP 2018-147658 filed on Aug. 6, 2018, JP 2018-148470 filed on Aug. 7, 2018, and JP 2018-148471 filed on Aug. 7, 2018, which are incorporated herein by reference in their entirety.

REFERENCE SIGNS LIST

31 Image decoding apparatus
301 Entropy decoder
302 Parameter Decoder
3020 Header decoder
303 Inter prediction parameter decoder
304 Intra prediction parameter decoder
308 Prediction image generation unit
309 Inter prediction image generation unit
310 Intra prediction image generation unit
311 Inverse quantization and inverse transform processing unit
312 Addition unit
320 Restricted region controller
11 Image coding apparatus
101 Prediction image generation unit
102 Subtraction unit
103 Transform and quantization unit
104 Entropy encoder
105 Inverse quantization and inverse transform processing unit
107 Loop filter
110 Coding parameter determination unit
111 Parameter encoder
112 Inter prediction parameter encoder
113 Intra prediction parameter encoder
120 Restricted region controller
1110 Header encoder
1111 CT information encoder
1112 CU encoder (prediction mode encoder)
1114 TU encoder

The invention claimed is:

1. An image decoding apparatus for decoding a picture, the image decoding apparatus comprising:
a parameter decoder that:
decodes a flag in a sequence parameter set, wherein the flag specifies whether a position syntax element is signaled, wherein the flag is represented by an unsigned integer using 1 bit, and wherein a value of the flag is equal to one in a case that a sequential refresh is used, and the value of the flag is equal to zero in a case that the sequential refresh is not used, decodes the position syntax element specifying a location for a region boundary in a unit of a specified region, in a case that the value of the flag is equal to one, and
derives a location of the region boundary using the position syntax element; and
a deblocking filter that adaptively performs a filtering process to a block boundary,
wherein the deblocking filter is not applied to the block boundary between two blocks, in a case that (i) the value of the flag is equal to one and (ii) the block boundary coincides with the region boundary.

2. The image decoding apparatus of claim 1, wherein
the location of the region boundary is derived in each picture, and
the region boundary includes a coding unit boundary, a prediction unit boundary, or a transform unit boundary.

3. An image encoding apparatus for encoding image data, the image encoding apparatus comprising:
a parameter encoder that:
encodes a flag in a sequence parameter set, wherein the flag specifies whether a position syntax element is signaled, wherein the flag is represented by an unsigned integer using 1 bit, and wherein a value of the flag is equal to one in a case that a sequential refresh is used, and the value of the flag is equal to zero in a case that the sequential refresh is not used,
encodes the position syntax element specifying a location for a region boundary in a unit of a specified region, in a case that the value of the flag is equal to one, and
derives a location of the region boundary using the position syntax element; and
a deblocking filter that adaptively performs a filtering process to a block boundary,
wherein the deblocking filter is not applied to the block boundary between two blocks, in a case that (i) the value of the flag is equal to one and (ii) the block boundary coincides with the region boundary.

4. A method for decoding a picture, the method including:
decoding a flag in a sequence parameter set, wherein the flag specifies whether a position syntax element is signaled, wherein the flag is represented by an unsigned integer using 1 bit, and wherein a value of the flag is equal to one in a case that a sequential refresh is used, and the value of the flag is equal to zero in a case that the sequential refresh is not used;
decoding the position syntax element specifying a location for a region boundary in a unit of a specified region, in a case that the value of the flag is equal to one;
deriving a location of the region boundary using the position syntax element; and
adaptively performing a deblocking filtering process to a block boundary,
wherein the deblocking filter process is not applied to the block boundary between two blocks, in a case that (i) the value of the flag is equal to one and (ii) the block boundary coincides with the region boundary.

5. The image decoding apparatus of claim 1, wherein the deblocking filter is applied to the block boundary, in a case that the value of the flag is equal to zero.

* * * * *